United States Patent
Leandro

(10) Patent No.: US 8,587,475 B2
(45) Date of Patent: Nov. 19, 2013

(54) POSITION ESTIMATION METHODS AND APPARATUS

(75) Inventor: Rodrigo Leandro, Ottobrunn (DE)

(73) Assignee: Trimble Navigation Limited, Sunnyvale, CA (US)

( * ) Notice: Subject to any disclaimer, the term of this patent is extended or adjusted under 35 U.S.C. 154(b) by 273 days.

(21) Appl. No.: 13/122,214

(22) PCT Filed: Oct. 5, 2009

(86) PCT No.: PCT/US2009/059552
§ 371 (c)(1),
(2), (4) Date: Apr. 1, 2011

(87) PCT Pub. No.: WO2010/042441
PCT Pub. Date: Apr. 15, 2010

(65) Prior Publication Data
US 2011/0187590 A1 Aug. 4, 2011

Related U.S. Application Data

(60) Provisional application No. 61/195,276, filed on Oct. 6, 2008.

(51) Int. Cl.
*G01S 19/44* (2010.01)
(52) U.S. Cl.
USPC .................................................. 342/357.27
(58) Field of Classification Search
USPC .................................................. 342/357.27
See application file for complete search history.

(56) References Cited

U.S. PATENT DOCUMENTS

| 6,799,116 B2 | 9/2004 | Robbins |
| 6,862,526 B2 | 3/2005 | Robbins |

(Continued)

FOREIGN PATENT DOCUMENTS

| EP | 1 835 299 A1 | 9/2007 |
| EP | 1 330 660 B1 | 1/2008 |

(Continued)

OTHER PUBLICATIONS

Leandro, R. F. (2009). Precise Point Positioning with GPS: A New Approach for Positioning, Atmospheric Studies, and Signal Analysis. Ph.D. dissertation, Department of Geodesy and Geomatics Engineering, Technical Report No. 267, University of New Brunswick, Fredericton, New Brunswick, Canada, 232 pp.

(Continued)

*Primary Examiner* — Harry Liu
(74) *Attorney, Agent, or Firm* — Bruce D Riter

(57) ABSTRACT

A method of determining the position of a GNSS receiver antenna includes steps of acquiring input data which includes observations at the GNSS receiver antenna of signals of at least clock and position information of GNSS satellites, for each of a plurality of epochs. Float parameters of a state vector from the input data of each epoch are then estimated. The float parameters include receiver antenna position, receiver clock, and at least one ambiguity per satellite. A jump in the at least one ambiguity of at least one satellite from one epoch to another epoch is detected. Then bridge parameters from the input data of at least one epoch and from the estimated float parameters are estimated. The bridge parameters include values sufficient to update the float parameters to compensate for the jump, and the bridge parameters are then used to update the float parameters.

52 Claims, 26 Drawing Sheets

(56) References Cited

U.S. PATENT DOCUMENTS

| | | | |
|---|---|---|---|
| 6,882,908 | B2 | 4/2005 | Laurichesse |
| 7,432,853 | B2 | 10/2008 | Vollath |
| 7,576,690 | B2 | 8/2009 | Vollath |
| 7,746,272 | B2 | 6/2010 | Vollath |
| 7,755,542 | B2 | 7/2010 | Chen et al. |
| 7,868,820 | B2 * | 1/2011 | Kolb .................. 342/357.27 |
| 8,018,337 | B2 | 9/2011 | Collins |
| 8,237,609 | B2 | 8/2012 | Talbot et al. |
| 8,368,590 | B2 | 2/2013 | Vollath et al. |
| 8,368,591 | B2 | 2/2013 | Talbot et al. |
| 8,400,351 | B2 | 3/2013 | Talbot et al. |
| 2006/0047413 | A1 * | 3/2006 | Lopez et al. .................. 701/200 |
| 2008/0165053 | A1 | 7/2008 | Liu et al. |
| 2010/0141515 | A1 | 6/2010 | Doucet et al. |
| 2011/0140959 | A1 | 6/2011 | Vollath |
| 2011/0148698 | A1 | 6/2011 | Vollath |
| 2011/0156949 | A1 | 6/2011 | Vollath et al. |
| 2011/0187590 | A1 | 8/2011 | Leandro |
| 2011/0285587 | A1 | 11/2011 | Vollath et al. |
| 2012/0026038 | A1 | 2/2012 | Vollath |
| 2012/0092213 | A1 | 4/2012 | Chen |
| 2012/0119944 | A1 | 5/2012 | Chen |
| 2012/0154210 | A1 | 6/2012 | Landau et al. |
| 2012/0154214 | A1 | 6/2012 | Leandro |
| 2012/0154215 | A1 | 6/2012 | Vollath et al. |
| 2012/0162007 | A1 | 6/2012 | Leandro et al. |
| 2012/0163419 | A1 | 6/2012 | Seeger |
| 2012/0286991 | A1 | 11/2012 | Chen et al. |
| 2012/0293367 | A1 | 11/2012 | Chen et al. |
| 2012/0306694 | A1 | 12/2012 | Chen et al. |
| 2013/0044026 | A1 | 2/2013 | Chen et al. |

FOREIGN PATENT DOCUMENTS

| | | |
|---|---|---|
| WO | 02/23214 A1 | 3/2002 |
| WO | 2012/128979 A2 | 9/2012 |
| WO | 2012/128980 A1 | 9/2012 |
| WO | 2012/151006 A2 | 11/2012 |

OTHER PUBLICATIONS

Banville, S., R. Santerre, M. Cocard, and R.B. Langley (2008). "Satellite and Receiver Phase Bias Calibration for Undifferenced Ambiguity Resolution". Proceedings of the Institute of Navigation National Technical Meeting, San Diego, California, Jan. 28-30.

Bisnath, S.B. and R.B. Langley (2001). "Precise Orbit Determination of Low Earth Orbiters with GPS Point Positioning". Proceedings of ION National Technical Meeting, Jan. 22-24, Long Beach, 2001.

Collins, P. (2008). "Isolating and Estimating Undifferenced GPS Integer Ambiguities," Proceedings of the Institute of Navigation National Technical Meeting, San Diego, California, Jan. 28-30.

Collins, J. P., "An Overview of GPS Inter-Frequency Carrier Phase Combinations", Geodesy and Geomatics Engineering Report, University of New Brunswick, pp. 1-15, Oct. 1999.

Delporte, J. et al., "GPS Carrier-Phase Time Transfer Using Single-Difference Integer Ambiguity Resolution," International Journal of Navigation and Observation, vol. 2008, Article ID 273785, 7 pages.

Gabor, M.J. and R.S. Nerem (2002). "Satellite-Satellite Single-Difference Phase Bias Calibration as Applied to Ambiguity Resolution". Journal of the Institute of Navigation, vol. 49, No. 4, pp. 223-242.

Gao, Y. and Chen, K. (2004). "Performance Analysis of Precise Point Positioning Using Real-Time Orbit and Clock Products". Journal of Global Positioning Systems, vol. 3 No. 1-2, pp. 95-100, 2004.

Gao Y., and X. Shen (2002). "A new method for carrier-phase-based precise point positioning". Journal of the Institute of Navigation, vol. 49, No. 2, pp. 109-116.

Ge, M., G. Gendt, M. Rothacher, C. Shi, and J. Liu, (2007). "Resolution of GPS carrier-phase ambiguities in Precise Point Positioning (PPP) with daily observations". Journal of Geodesy (2008) 82:389-399.

Geng, J., "Rapid Re-convergence in Real-time Precise Point Positioning with Ambiguity Resolution," Proceedings of the 22nd International Technical Meeting of the Satellite Division of the Institute of Navigation (ION GNSS 2009), Savannah, GA, Sep. 2009, pp. 2437-2448.

Gurtner, W. and L. Estey, "RINEX: The Receiver Independent Exchange Format Version 2.11," Dec. 10, 2007 (original), Jun. 25, 2012 (minor clarifications), IGS/RTCM RINEX Working Group, 16 pages.

Gurtner, W. and L. Estey, "RINEX The Receiver Independent Exchange Format Version 3.00," Nov. 28, 2007, 40 pages.

Heroux P. and J. Kouba, "GPS Precise Point Positioning with a Difference," paper presented at Geomatics '95, Ottawa, Ontario, Canada, Jun. 13-15, 1995.

Klobuchar, J.A., "Ionospheric effects on GPS". In Global Positioning System: Theory and applications, vol. 1 (A96-20837 04-17), Washington, DC, American Institute of Aeronautics and Astronautics, Inc. (Progress in Astronautics and Aeronautics. vol. 163), 1996, p. 485-515.

Kolb, P.F., X. Chen, and U. Vollath, "A New Method to Model the Ionosphere Across Local Area Networks". Proceedings of the 18th International Technical Meeting of the Satellite Division of the Institute of Navigation, ION GNSS 2005, Long Beach, California, Sep. 13-16 2005.

Komjathy, A., Global Ionospheric Total Electron Content Mapping Using the Global Positioning System, Ph.D. dissertation, Department of Geodesy and Geomatics Engineering Technical Report No. 188, University of New Brunswick, Fredericton, New Brunswick, Canada, 1997, 248 pp.

Komjathy, A., L. Sparks, B.D. Wilson and A.J. Mannucci, "Automated daily processing of more than 1000 ground-based GPS receivers for studying intense ionospheric storms". Radio Science, vol. 40, RS6006, DOI: 10.1029/2005RS003279, 2005.

Kouba, J., "A Guide to Using International GPS Service (IGS) Products," Publication of the IGS Central Bureau, Feb. 2003, 31 pages.

Kouba, J. and P. Héroux, "Precise Point Positioning Using IGS Orbit and Clock Products." GPS Solutions, vol. 5, No. 2 (2001), pp. 12-28.

Laurichesse, D., F. Mercier, J-P. Berthias, and J. Bijac, "Real Time Zero-difference Ambiguities Blocking and Absolute RTK". Proceedings of the Institute of Navigation National Technical Meeting 2008, San Diego, California, Jan. 28-30, 2008.

Laurichesse, D., Mercier, F., "Integer Ambiguity Resolution on Undifferenced GPS Phase Measurements and its Application to PPP," Proceedings of the 20th International Technical Meeting of the Satellite Division of the Institute of Navigation (ION GNSS 2007), Fort Worth, TX, Sep. 2007, pp. 839-848.

Leandro R.F. and M.C. Santos. "Wide Area Based Precise Point Positioning," Proceedings of ION GNSS 2006, Fort Worth, Texas, Sep. 26-29, 2006.

Leandro, R., Santos, M. C., Langley, R. B., "UNB neutral atmosphere models: Development and performance," Proceedings of the Institute of Navigation 2006, National Technical Meeting, 2, pp. 564-573.

Melbourne, W.G., "The case for ranging in GPS-based geodetic systems," Proceedings of the first International Symposium on Precise Positioning with the Global Positioning System. U.S. Department of Commerce. Rockville, Maryland, Apr. 15-19, 1985, vol. 1, pp. 373-386.

Melgard, T. et al., "First real time GPS/GLONASS orbit/clock decimetre level precise positioning service," European Navigation Conference, ENC-GNSS 2009, May 3-6, 2009, Naples, Italy, 5 pages.

Melgard, T. et al., "G2—The First Real-Time GPS and GLONASS Precise Orbit and Clock Service," ION GNSS 2009, Sep. 22-25, Savannah, 7 pages.

Mendes, V.B. and R.B. Langley, "Tropospheric Zenith Delay Prediction Accuracy for High-Precision GPS Positioning and Navigation." Navigation: Journal of the Institute of Navigation, vol. 46, No. 1, 1999, pp. 25-34.

Mireault, Y. et al., "Online Precise Point Positioning: A New, Timely Service from Natural Resources Canada," GPS World, Sep. 2008, pp. 59-64.

Niell, A.E., "Global mapping functions for the atmosphere delay at radio wavelengths," Journal of Geophysical Research, Vo. 101, No. B2, pp. 3227-3246, Feb. 10, 1996.

(56) References Cited

OTHER PUBLICATIONS

Ray, J., "RINEX Extensions to Handle Clock Information," Version 3.00, Nov. 14, 2006, 12 pages.
Rho, H., R.B. Langley and A. Komjathy, "An Enhanced UNB Ionospheric Modeling Technique for SBAS: the Quadratic Approach". Proceedings of the 17th International Technical Meeting of the Satellite Division of the Institute of Navigation ION GNSS 2004, Long Beach, California, Sep. 21-24, 2004, 12 pages.
Rothacher, M., and R. Schmid, "ANTEX: The Antenna Exchange Format Version 1.3," Sep. 20, 2006, 6 pages.
"Proposed SSR Messages for SV Orbit, Clock, Code Biases, URA," RTCM Paper 012-2009-SC104-528, Radio Technical Commission for Maritime Services, Jan. 28, 2009, 28 pages.
"Proposed SSR Messages for SV Orbit, Clock, Code Biases, URA," RTCM Paper 024-2009-SC104-533, Geo++ GmbH, RTCM Meeting Feb. 4-5, 2009, 12 pages.
Schaer, S., W. Gurtner, and J. Feltens, "IONEX: The IONosphere Map EXchange Format Version 1," Proceedings of the IGS AC Workshop, Darmstadt, Germany, Feb. 9-11, 1998, 15 pages.
Tétreault, P., J. Kouba, P. Héroux, and P. Legree, "CSRS-PPP: An Internet Service for GPS User Access to the Canadian Spatial Reference Frame." Geomatica, vol. 59, No. 1, 2005, pp. 17-28.
Wu, J. T., S. C. Wu, G. A. Hajj, w. I. Bertiger, and S. M. Lichten, "Effects on antenna orientation on GPS carrier phase.". Proceedings of the AAS/AIAA Astrodynamics Conference, Durango, CO, Aug. 19-22, 1991. pp. 1647-1660.
Wubbena, G., "Software Developments for Geodetic Positioning with GPS using TI 4100 code and carrier measurements". Proceedings of the first International Symposium on Precise Positioning with the Global Positioning System. U.S. Department of Commerce. Rockville, Maryland, Apr. 15-19, 1985, vol. 1, pp. 403-412.
Zumberge, J.F., Heflin, M.B., Jefferson, D.C., Watkins, M.M., and Webb, F.H., "Precise point positioning for the efficient and robust analysis of GPS data from large networks," Journal of Geophysical Research, vol. 102, No. B3, pp. 5005-5018, Mar. 10, 1997.
International Preliminary Report on Patentability in International Application No. PCT/US2009/059552 (7 pages).
International Search Report in International Application No. PCT/US2009/059552 (3 pages).
L. Dai et al., "Innovative Algorithms to Improve Long Range RTK Reliability and Availability," ION NTM 2007, Jan. 22-24, 2007, San Diego, CA, pp. 860-872.
D. Chen, "Development of a Fast Ambiguity Search Filtering (FASF) Method for GPS Carrier Phase Ambiguity Resolution," XP007907245, UCGE Reports No. 20071, Department of Geomatics Engineering, University of Calgary, Dec. 1, 1994, 128 pages.
Office Action dated Jan. 14, 2013 in counterpart Chinese Patent Application 2009 8013 9502.X (9 pp.) with English-language translation (16 pp.).

* cited by examiner

- Time: 1  2  3  4  5  6  7  8  9
- $X_1$  $X_2$  $X_3$  $X_4$  $X_5$  $X_6$  $d_{6\text{-}7}$  $d_{7\text{-}8}$  $d_{8\text{-}9}$
- $X_i$ -- Synchronous RTK position at epoch i
- $d_{i\text{-}j}$ -- Delta position between epoch i and j
- Low Latency Position at Epoch Time 9
- $X_9 = X_6 + (d_{6\text{-}7} + d_{7\text{-}8} + d_{8\text{-}9})$ Fig. 8A
PRIOR ART

[drawing intentionally omitted]

Fig. 9

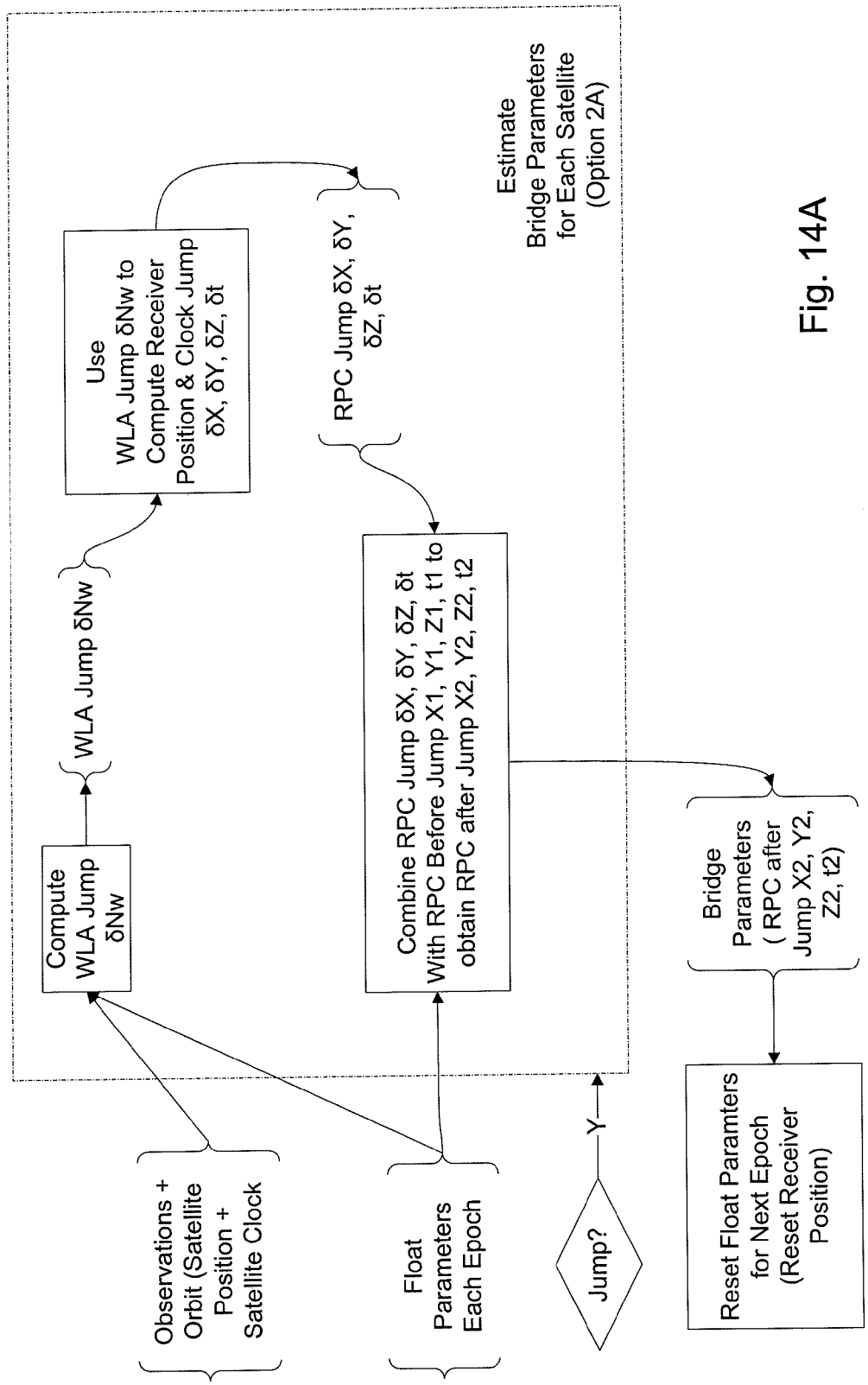

POSITION ESTIMATION METHODS AND APPARATUS

CROSS-REFERENCE TO RELATED APPLICATIONS

Priority benefit of U.S. Provisional Application for Patent No. 61/195,276 filed 6 Oct. 2008; is hereby claimed.

The following are related hereto:

U.S. patent application Ser. No. 13/117,111 filed 26 May 2012, published as US 2012/0119944 A1 on 17 May 2012;

U.S. patent application Ser. No. 13/522,384 filed 16 Jul. 2012, published as US 2012/0306694 A1 on 6 Dec. 2012;

International Patent Application PCT/US2011/024763 filed 14 Feb. 2011, published as WO 2011/100690 A9 on 18 Aug. 2011;

U.S. patent application Ser. No. 13/522,329 filed 15 Jul. 2012, published as US 2012/0286991 A1 on 15 Nov. 2012;

International Patent Application PCT/US2011/024743 filed 14 Feb. 2011, published as WO 2011/100680 A9 on 18 Aug. 2011;

International Patent Application PCT/US2012/029671 filed 11 Mar. 2012, published as WO 2012/128980 A1 on 27 Sep. 2012;

U.S. patent application Ser. No. 13/372,488 filed 13 Feb. 2012, published as US 2012/0044026 A1 on 21 Feb. 2013;

U.S. patent application Ser. No. 13/117,092 filed 26 May 2011, published as US 2012/0092213 A1 on 19 Apr. 2012;

International Patent Application PCT/US2012/029694 filed 19 Mar. 2012, published as WO 2012/151006 A2 on 8 Nov. 2012;

International Patent Application PCT/US2012/028670 filed 11 Mar. 2012, published as WO 2012/128979 A2 on 27 Sep. 2012;

U.S. patent application Ser. No. 13/393,202 filed 28 Feb. 2012, published as US 2012/0154210 A1 on 21 Jun. 2012;

International Patent Application PCT/US2010/002581 filed 19 Sep. 2010, published as WO 2011/034624 A2 on 24 Mar. 2011;

U.S. patent application Ser. No. 13/522,323 filed 14 Jul. 2012, published as US 2012/0293367 A1 on 22 Nov. 2012;

International Patent Application PCT/US2011/024733 filed 14 Feb. 2011, published as WO 2011/126605 A2 on 13 Oct. 2011;

U.S. patent application Ser. No. 13/393,140 filed 28 Feb. 2012, published as US 2012/0154215 A1 on 21 Jun. 2012;

International Patent Application PCT/US2010/002562 filed 19 Sep. 2010, published as WO 2011/034614 A2 on 24 Mar. 2011;

U.S. patent application Ser. No. 13/393,085 filed 28 Feb. 2012, published as US 2012/0154214 A1 on 21 Jun. 2012;

International Patent Application PCT/US2010/002563 filed 19 Sep. 2010, published as WO 2011/034615 A2 on 24 Mar. 2011;

U.S. patent application Ser. No. 13/393,017 filed 28 Feb. 2012, published as US 2012/0162007 A1 on 28 Jun. 2012;

International Patent Application PCT/US2010/002564 filed 19 Sep. 2010, published as WO 2011/034616 A2 on 24 Mar. 2011;

U.S. patent application Ser. No. 13/392,878 filed 28 Feb. 2012, published as US 2012/0163419 A1 on 28 Jun. 2012;

International Patent Application PCT/US2010/002565 filed 19 Sep. 2010, published as WO 2011/034617 A2 on 24 Mar. 2011;

U.S. patent application Ser. No. 13/263,072 filed 5 Oct. 2011, published as US 2012/0026038 A1 on 2 Feb. 2012;

International Patent Application PCT/US2010/001237 filed 26 Apr. 2010, published as WO 2010/029020 A2 on 11 Nov. 2010;

U.S. patent application Ser. No. 12/660,091 filed 20 Feb. 2010, now U.S. Pat. No. 8,400,351 B2;

U.S. patent application Ser. No. 12/660,080 filed 20 Feb. 2010, now U.S. Pat. No. 8,237,609 B2;

U.S. patent application Ser. No. 13/059,463 filed 5 Aug. 2009, published as US 2011/0140959 A1 on 16 Jun. 2011;

International Patent Application PCT/US2009/004471 filed 5 Aug. 2009, published as WO 2010/021656 A2 on 25 Feb. 2010;

U.S. patent application Ser. No. 13/059,428 filed 5 Aug. 2009, published as US 2011/0156949 A1 on 30 Jun. 2011;

International Patent Application PCT/US2009/004473 filed 5 Aug. 2009, published as WO 2010/021658 A2 on 25 Feb. 2010;

U.S. patent application Ser. No. 13/059,416 filed 5 Aug. 2009, now U.S. Pat. No. 8,368,591 B2 dated 5 Feb. 2013;

International Patent Application PCT/US2009/004474 filed 5 Aug. 2009, published as WO 2010/021659 on 25 Feb. 2010;

U.S. patent application Ser. No. 13/059,415 filed 5 Aug. 2009, published as US 2011/0148698 A1 on 23 Jun. 2011;

International Patent Application PCT/US2009/004472 filed 5 Aug. 2009, published as WO 2010/021657 A2 on 25 Feb. 2010;

U.S. patent application Ser. No. 13/148,305 filed 5 Aug. 2011, published as US 2011/0285587 A1 on 24 Nov. 2011;

International Patent Application PCT/US2010/000496 filed 20 Feb. 2010, published as WO 2010/096190 A2 on 26 Aug. 2010;

U.S. patent application Ser. No. 13/059,413 filed 5 Aug. 2009, now U.S. Pat. No. 8,368,590 B2 dated 5 Feb. 2013;

International Patent Application PCT/US2009/004476 filed 5 Aug. 2009 published as WO 2010/021660 A2 on 25 Feb. 2010;

U.S. patent application Ser. No. 12/451,513 filed 22 Jun. 2007, published as US 2010/0141515 on 10 Jun. 2010;

U.S. patent application Ser. No. 12/002,086 filed 30 Apr. 2009, now U.S. Pat. No. 7,576,690 B2 dated 18 Aug. 2009;

U.S. patent application Ser. No. 12/224,451 filed 7 Mar. 2007, now U.S. Pat. No. 7,755,542 B2 dated 13 Jul. 2010;

International Patent Application PCT/US2007/005874 filed 7 Mar. 2007, published as WO 2008/008099 on 17 Jan. 2008;

U.S. patent application Ser. No. 11/988,763 filed 14 Jan. 2008, now U.S. Pat. No. 7,868,820 B2 dated 11 Jan. 2011;

International Patent Application No. PCT/US2006/034433 filed 5 Sep. 2006, published as WO 2007/032947 on 22 Mar. 2007;

International Patent Application No. PCT/US2004/035263 filed 22 Oct. 2004, published as WO 2005/045463 on 19 May 2005;

U.S. patent application Ser. No. 12/286,672 filed 30 Sep. 2008, now U.S. Pat. No. 7,746,272 B2 dated 29 Jun. 2010;

U.S. patent application Ser. No. 10/696,528 filed 28 Oct. 2003, now U.S. Pat. No. 7,432,853 B2 dated 7 Oct. 2008;

U.S. patent application Ser. No. 10/821,022 filed 7 Apr. 2004, now U.S. Pat. No. 6,862,526 dated 1 Mar. 2005; and U.S. patent application Ser. No. 09/997,372 filed 29 Nov. 2001, now U.S. Pat. No. 6,799,116 B2 dated 28 Sep. 2004.

The invention relates to position estimation methods and apparatus, and especially to such methods and apparatus based on navigational satellite system signals. The fields of application of the methods and apparatuses include, but are not limited to, navigation, map-making, land surveying, civil engineering, disaster prevention and relief, and scientific research.

BACKGROUND

1. Introduction

Global navigational satellite systems (GNSS) include Global Positioning System (GPS) (United States), GLONASS (Russia), Galileo (Europe) and COMPASS (China) (systems in use or in development). A GNSS typically uses a plurality of satellites orbiting the earth. The plurality of satellites forms a constellation of satellites. A GNSS receiver detects a code modulated on an electromagnetic signal broadcasted by a satellite. The code is also called a ranging code. Code detection includes comparing the bit sequence modulated on the broadcasted signal with a receiver-side version of the code to be detected. Based on the detection of the time of arrival of the code for each of a series of the satellites, the GNSS receiver estimates its position. Positioning includes geolocation, i.e. the positioning on the surface of the Earth.

Positioning using GNSS signal codes provides a limited accuracy, notably due to the distortion the code is subject to upon transmission through the atmosphere. For instance, the GPS includes the transmission of a coarse/acquisition (C/A) code at 1575.45 MHz, the so-called L1 frequency. This code is freely available to the public, in comparison to the Precise (P) code, which is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors and multipath propagation.

An alternative to positioning based on the detection of a code is positioning based on carrier phase measurements. In this alternative approach, the carrier phase of the GNSS signal transmitted from the satellite is detected, not the code modulated on the signal transmitted from the satellite.

The approach based on carrier phase measurements has the potential to provide much greater position precision, i.e. up to centimeter-level or even millimeter-level precision, compared to the code-based approach. The reason may be intuitively understood as follows. The code, such as the GPS C/A code on the L1 band, is much longer than one cycle of the carrier on which the code is modulated. The position resolution may therefore be viewed as greater for carrier phase detection than for code detection.

Position estimation from GNSS signals can take a variety of forms, depending on the accuracy needed and availability of augmentation systems and other factors. Positioning can be characterized as autonomous, using a stand-alone receiver, or differential, using differential corrections from a source external to the receiver.

The simplest autonomous receivers (such as a GPS L1-code-only receiver typical of today's consumer products), are relatively inexpensive and have a positioning accuracy on the order of tens of meters. Multi-frequency receivers (such as GPS receivers capable of L1 and L2 carrier frequencies in addition to code) have meter-level positioning accuracy. Precise positioning techniques can achieve millimeter-level accuracy when post-processing data collected over time for applications such as geodesy which do not require answers in real time, and centimeter-level accuracy for applications such as deformation monitoring, aerial photogrammetry, and control of machines in agriculture, construction and mining.

Differential receivers use differential corrections from a reference receiver or network of reference receivers to mitigate measurement errors. Positioning accuracies on the order of meters, suitable for ship navigation in harbors and aircraft approach are typical of differential receivers using corrections from services such as Maritime DGPS of the US Coast Guard or the Wide-Area Augmentation System of the US Federal Aviation Administration. Differential receivers used for relative navigation typically have positioning accuracy on the order of several centimeters to tens of centimeters. Differential receivers for survey applications have positioning accuracy of sub-centimeter to not more than a few centimeters.

2. Basic Principles of GNSS Precise Point Positioning

Precise point positioning (PPP) is a positioning technique in which a single receiver is used to determine coordinates. It is said to be "precise" because the so called "precise products" such as orbits and clocks are used in the data processing. These products were called "precise" because they were produced by means of post-processing of GPS data from several world-wide distributed monitoring ground stations, and provided information of better quality than the broadcast ephemeris message. The term PPP was proposed for the first time by Heroux and Kouba [1995], when they proposed the use of "precise" satellite orbits and clocks for point positioning. At that time, the Geodetic Survey Division (GSD), Natural Resources Canada (NRCan) was already generating post-processed GPS satellite orbits and clocks in a standard format which were used to contribute to the International GNSS Service (IGS). They correctly claimed that these products could be included in a point positioning software interface and provide high precision to users operating a single GPS receiver. Though at that time they presented a simple approach that could only offer precision of about one meter, this was the starting point of PPP development.

Later, Zumberge et. al [1997] proposed the use of PPP for analysis of data from hundreds to thousands of sites every day, with achievable results comparable in quality to what could be obtained with the simultaneous analysis of all data. This publication became one of the most known early references on PPP.

In 2001 Kouba and Heroux [2001] detailed a post-processing approach using undifferenced dual-frequency pseudorange and carrier phase observations along with IGS precise orbit products, for stand-alone precise geodetic point positioning (static or kinematic), now with cm-level precision. At that time, they already described the earth- and space-based models that must be implemented to achieve cm-level positioning. They also discussed the capability of obtaining station neutral atmosphere zenith delays with cm precision and GPS receiver clock estimates precise to 0.1 ns.

By this time PPP was already a technique widely known by the GPS community, and several papers were published highlighting different uses for single point positioning with precise orbits and clock products. For example, Bisnath and Langley [2001] proposed a geometric approach based on a kinematic, sequential least-squares filter/smoother to be used with data from LEO's (low earth orbiters) GPS receivers and the IGS precise orbits and clock products, aiming at decimeter precision.

PPP technique established itself as a powerful positioning technique in which cm-level accuracies could be obtained. However it has always had a major drawback, which is the convergence time. The time a PPP solution takes to achieve sub-decimeter level accuracy, which might be as high as a few tens of minutes, is nowadays the greatest hurdle for using it as a real-time world-wide high-accuracy GNSS positioning tool, since the market often requires solution (re-) initialization of a few seconds. In view of that, several research centers started research projects in the direction of introducing an ambiguity fixing process inside a PPP engine, so that the solution initialization time could go down.

This was the case of Gabor and Nerem [2002], who proposed a method for calibrating satellite-dependent phase biases with a tracking network, which could later be used for eliminating these quantities present on the measurements for a stand-alone receiver, and therefore come up with ambiguities of integer nature inside the PPP engine. The method was based on the derivation of a first set of wide-lane phase-biases, based on a wide-lane phase and narrow-lane code geometry-ionosphere-free combination (also known as Melbourne-Wubbena combination [Melbourne, 1985]; [Wubbena, 1985]). If that is done successfully, then a second set of ambiguities could be fixed, which will have an effective wavelength of around 10 cm. At that time they concluded that the level of the existing orbit errors would not allow fixing this second set of ambiguities.

Gao and Shen [2002] introduced a different method, which was not based on satellite bias calibration, but on a PPP engine built-in technique which tried to exploit integer nature of phase ambiguity. However, as time elapsed, it has become common sense within the PPP research community that it is necessary to calibrate satellite-dependent phase biases in order to fix ambiguities in PPP. This can be noticed by the increasing number of papers in that direction during the last years, such as Leandro et al. [2006], Ge et al. [2007], Banville et al. [2008], Collins [2008], and Laurichesse et al. [2008], all of them proposing the calibration of satellite phase biases. The later four publications use the same concept as proposed by Garbor and Nerem (fixing at first wide-lane ambiguities and later the other integer ambiguities needed to form the carrier-phase iono-free combination, with an effective wavelength of around 10 cm), but with some reformulation and/or additional analysis.

GAPS started to be developed in 2006, with the objective of being a tool for satellite phase-bias calibration and use. The technique which was described in the 2006 publication was based on a de-correlation of L1 and L2 ambiguities and biases, by means of PPP-based ionospheric modeling (whose procedure is described in chapter 3). The reason for looking for a different technique is the fact that in order to reliably fix the second set of ambiguities as used in Garbor and Nerem approach, it is necessary to have all geometry-related effects (neutral atmosphere, receiver coordinates and receiver clock) modeled with uncertainties reasonably lower than a decimeter, and this is something which takes a long time to be achieved—and in fact when the PPP solution has already converged to that level of accuracy ambiguity fixing will bring only little improvement.

3. Problems to be Solved

FIG. 1 schematically illustrates a typical prior-art two-carrier-frequency scenario for an autonomous receiver 100. Receiver 100 receives GNSS signals from any number of satellites in view, such as SV1, SV2 and SVm, shown respectively at 110, 120 and 130, as well as satellite orbit and clock data 105. The signals pass through the earth's atmosphere (ionosphere and troposphere), shown schematically at 140. Each signal has two frequencies, L1 and L2. Receiver 100 determines from the signals a respective pseudo-range, PR1, PR2, PRm, to each of the satellites. Atmospheric and multipath effects cause variations in the signal path, as indicated schematically at 150, which distort the pseudo-range determinations. As the C/A code can be measured with an error of about one meter, a civil receiver not using the military-only P/Y code determines position with an error in the range of meters. However, the phase of the L1 and L2 carriers can be measured with an accuracy of 0.01-0.05 cycle (2 mm-1 cm), so relative positions can be more precisely estimated with errors in the range of millimeters to centimeters. Techniques for precise positioning employ L1 and L2 carrier phase and integer ambiguity resolution, a widely researched area of precise satellite positioning.

Many techniques have been developed to reliably and rapidly determine the cycle ambiguity in carrier phase signals observed by satellite positioning equipment. Ambiguity resolution techniques normally involve the use of unambiguous code observations, and observations on multiple satellites to reduce the potential carrier phase ambiguities until a decision can be made to accept a single candidate. Observations of coherently-generated carrier phase signals further enhances the speed and reliability of ambiguity resolution.

FIG. 2 schematically shows a typical prior-art processing method. Raw GNSS data 200 for two frequencies (F1 & F2) is prepared at 210 to provide observation data for each epoch. Satellite orbit and clock data 205 is prepared at 215 to provide satellite and clock data for each epoch. The prepared data set 220 for each epoch is supplied to a global Kalman filter having a state vector with states for receiver antenna position, receiver clock, and ambiguities. The filter computes a float solution to update the states with each new epoch of data.

FIG. 3 schematically shows two problems encountered with prior-art processing techniques. First, the float solution takes too long to converge on a solution for the state vector so as to give a receiver antenna position estimate with acceptable position error. It is desired to accelerate the convergence of the solution. Second, a jump in one or more estimated ambiguity values (which can occur when the receiver loses phase-lock on one or more satellite signals) obliges a reset of the filter and a corresponding delay while the float solution again converges so as to give a receiver antenna position estimate with acceptable position error. It would be preferable to reduce the initial float solution convergence time (at receiver startup) and to reduce or eliminate the reconvergence time (following a jump).

There is a need for improving the implementation of positioning systems based on GNSS carrier phase measurements, to obtain a precise estimation of the receiver position in quick, stable and user-friendly manner.

SUMMARY

The present invention aims at meeting the above-mentioned needs. In particular, the invention aims at improving the implementation of the methods of the prior art with in mind the goals of obtaining rapidly a stable and precise solution, while improving usability.

The invention includes methods, apparatuses, rovers, network stations, computer programs and computer-readable media, as defined in the claims.

BRIEF DESCRIPTION OF THE DRAWINGS

Embodiments of the present invention shall now be described, in conjunction with the appended Figures in which:

FIG. 8A illustrates a principle of operation of a prior-art real-time kinematic delta-position processing technique;

FIG. 9 this figure is intentionally omitted;

FIG. 14A schematically illustrates the operation of a third ART-K bridge estimator in accordance with embodiments of the invention;

DETAILED DESCRIPTION

Figure 1:
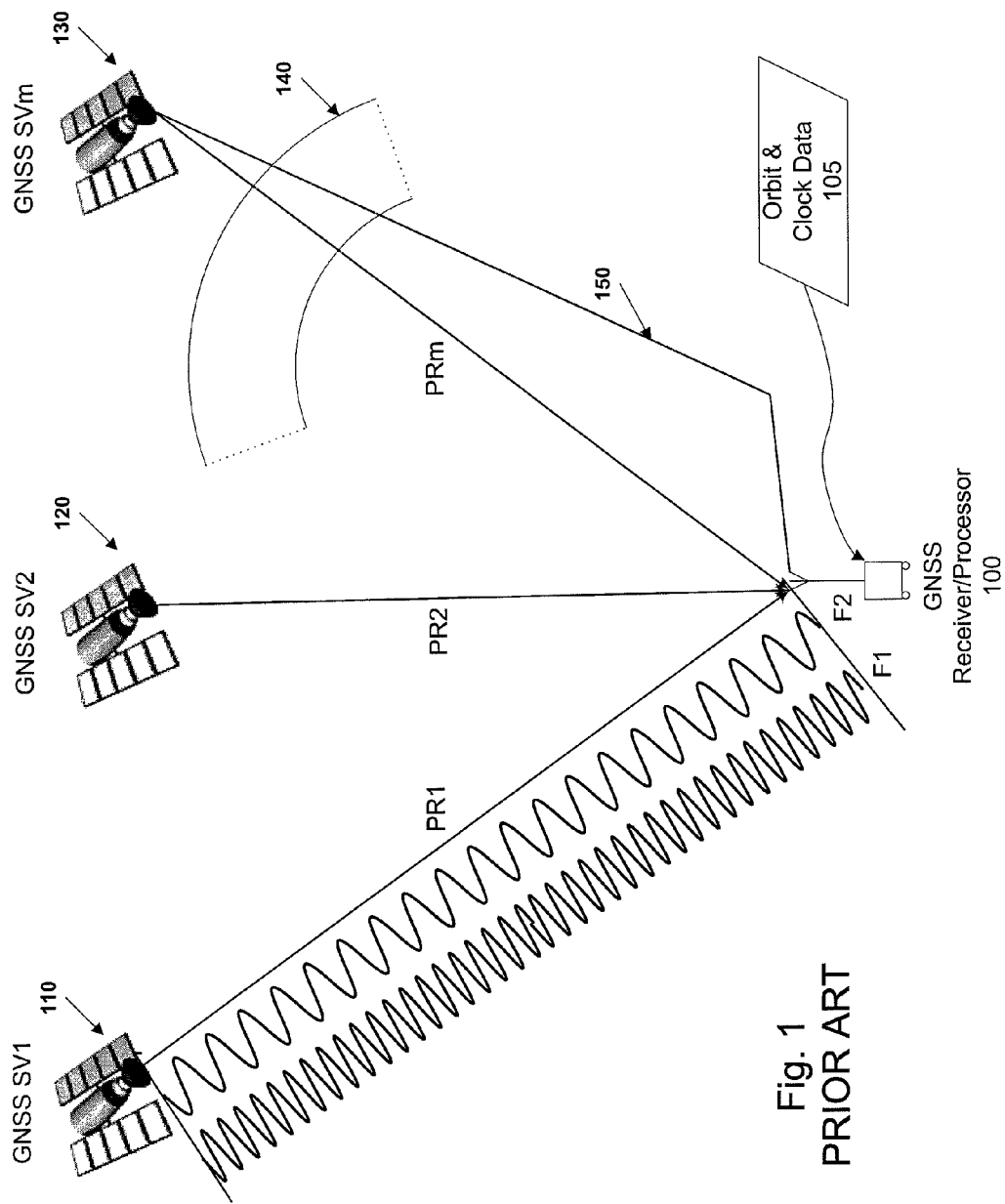
FIG. 1 schematically shows a GNSS with three satellites and one receiver, for illustrating the background of the invention.

Embodiments of the present invention will now be described in conjunction with the drawing figures. The specific embodiments serve to provide the skilled person with a better understanding, but are not intended to in any way restrict the scope of the invention, which is defined by appended claims. In particular, the embodiments described independently throughout the description and elements thereof can be combined to form further embodiments to the extent that they are not mutually exclusive.

1.1 Precise Point Positioning

Precise Point Positioning (PPP) is one of the existing techniques to determine point coordinates using a GNSS receiver such as a GPS receiver. In this technique observations collected by a single receiver are used in order to determine the three components of the coordinates of the receiver's antenna position (such as x, y and z in a Cartesian coordinate system), and other parameters, such as the receiver's clock error (t) and total neutral atmosphere delay.

PPP can be used for a variety of positioning applications. The PPP observation model takes into consideration most of the several effects present on GPS signals. Unlike differential processing in which observations are differenced between receivers or between satellites to remove common mode errors, PPP observations are undifferenced. When the observation model is designed for positioning, most of these parameters (e.g., satellite clocks) are used as known quantities for determining position, receiver clock error and neutral atmosphere delay.

Other parameters can also be modelled, including ionospheric delay, code biases, satellite clock errors, and code multipath plus noise. In all cases the procedures are also suitable for real time, what makes the package a potential tool for wide area receiver networks control and management. Depending on the type of the estimated parameters, they might simply serve as quantification in terms of data analysis and quality control, or they can be later used for positioning again (as known values).

One parameter used for positioning is the neutral atmosphere delay, also known as tropospheric delay. This delay is caused by the refraction suffered by GPS signals at the neutral part of the atmosphere. Neutral atmosphere delay models are known in the art for use in positioning such as PPP.

Embodiments of the present invention offer precise point positioning enhancements such as improved position accuracy, faster convergence of the position solution, and/or faster recovery from signal outages.

Ionospheric delays are not well resolved unless there is a good determination of biases involved in the measurements at different signal frequencies, which usually requires a network of tracking receivers to solve for satellite and receiver instrumental biases. In some embodiments of the invention, bias-free ionospheric delays are determined from dual-frequency carrier-phase measurements of a single receiver;

In some embodiments of the invention, pseudorange multipath values are estimated using pseudorange and carrier-phase measurements inside a PPP engine. A difference with respect to other multipath estimation techniques is that usually only the higher frequency components of multipath are determined. In some embodiments, issues such as ionospheric delays and carrier-phase ambiguities are addressed to recover multipath values.

Satellite code biases are a factor to be taken into account when processing data of a network with mixed receiver types, or using clock corrections for positioning with receiver types different from the ones used to generate the corrections. Usually these biases are estimated as a by-product of the clock estimation process, using a network of receivers. In some embodiments of the present invention, these biases are estimated using a single station positioning model rather than a network clock adjustment model, making this approach useful for PPP.

When dealing with single receiver positioning, satellite clock corrections play a significant role in the data processing. Satellite clock errors are usually estimated using pseudorange and carrier-phase measurements from a network of receivers. In some embodiments of the present invention, carrier-phase quality clock corrections are estimated using a single station which are suitable for real time applications, and which enable integration between PPP and relative satellite positioning.

Neutral atmosphere delay is usually handled with a-priori information from prediction models, and sometimes also a residual delay parameter in the observation model. In some embodiments of the present invention, models suitable for wide-area satellite-based augmentation systems are based on a surface meteorological dataset, resulting in a more reliable model which is keeps the simplicity and the practical usage procedure from earlier developments.

The concern Garbor and Nerem raised back in 2001 (that the level of orbit errors would not allow fixing a second set of ambiguities with an effective wavelength of around 10 cm after fixing a first set of wide-lane phase biases) is still a problem to be solved, looking at the error budget of PPP. This means that longer wavelengths are needed to allow the use of a geometry-dependent ambiguity fixing procedure (and that might be the reality with upcoming GPS L5 signal); or the PPP float solution convergence time needs to be improved. Some embodiments of the present invention make use of an enhanced PPP observation model or have additional components which improve the positioning solution.

1.2. The Positioning Observation Model

PPP is a positioning technique in which a single receiver is used to determine coordinates, using the so called "precise products" such as satellite orbits and clocks in the data processing. More than that, if one wants to have the ultimate achievable accuracy with PPP, all necessary observation corrections should be taken into account to achieve the best possible accuracy. Such corrections include tides, relativistic effects, and receiver and satellite antenna phase center variation among others. Depending on the type of receiver being used (e.g. code only or code and phase; single or dual frequency), some of those corrections can be disregarded, or alternatively further precise products might be needed, such as ionospheric grids in case of single frequency receivers. If the higher possible accuracy is targeted, a "geodetic" receiver must be used, with dual frequency measurements of pseudorange and carrier-phase. In this case, other aspects are also important, such as treating the carrier-phase as an independent measurement (rather than using carrier-phase measurement to simply filter the pseudoranges), which leads to an ambiguity parameter estimation for each satellite, and also the estimation of residual neutral atmosphere delays (NAD), since NAD prediction models are not accurate enough for this type of positioning.

Many PPP packages nowadays use a similar model with an ionospheric-free combination of pseudorange and carrier-phase, such as CSRS-PPP [Tétreault et al. 2005], P3 [Gao and Chen, 2004] and GIPSY [Zumberge et al. 1997]. A few differences can be found between them, such as the estimation process of NAD (e.g., as random walk, or fixed values for given time intervals).

To understand the positioning procedure we can start with the equations for carrier-phase:

$$\Phi_1 = R + c(dT - dt) + T - I + \lambda_1 N_1 + hd_{r,1} - hd_{s,1} + pb_{r,1} - pb_{s,1} + m_1 + e_1, \quad (2.1)$$

and $$\Phi_2 = R + c(dT - dt) + T - \gamma I + \lambda_2 N_2 + hd_{r,2} - hd_{s,2} + pb_{r,2} - pb_{s,2} + m_2 + e_2, \quad (2.2)$$

where: $\Phi_1$ and $\Phi_2$ are carrier-phase measurements on L1 and L2 frequencies, respectively, in metric units; R is the geometric distance between satellite and receiver antennas, in meters; c is the speed of light, in meters per second; dT and dt are receiver and satellite clock errors, respectively, in seconds; T is the neutral atmosphere delay, in meters; I is the L1 frequency ionosphere delay, in meters; $\gamma$ is the factor to convert the ionospheric delay from L1 to L2 frequency, unit less; $\lambda_1$ and $\lambda_2$ are carrier-phase wavelengths on L1 and L2 frequencies, respectively, in meters; $N_1$ and $N_2$ are carrier-phase integer ambiguities on L1 and L2 frequencies, respectively, in cycles; $hd_{r,i}$ and $hd_{s,i}$ are receiver and satellite carrier-phase hardware delays, respectively, in metric units, where i represents the carrier frequency (L1 or L2); $pb_{r,i}$ and $pb_{s,i}$ are receiver and satellite carrier-phase initial phase bias, respectively, in metric units, where i represents the carrier frequency (L1 or L2); $m_1$ and $m_2$ are carrier-phase multipath on L1 and L2 frequencies, respectively, in meters; and $e_1$ and $e_2$ are other un-modeled errors of carrier-phase measurements on L1 and L2 frequencies, respectively, in meters.

Similar equations can be formed for pseudoranges, as follows:

$$P_1 = R + c(dT - dt) + T + I + HD_{r,1} - HD_{s,1} + M_1 + E_1, \quad (2.3)$$

and $$P_2 = R + c(dT - dt) + T + \gamma I + HD_{r,2} - HD_{s,2} + M_2 + E_2, \quad (2.4)$$

where: $P_1$ and $P_2$ are pseudorange measurements on L1 and L2 frequencies, respectively, in metric units; $HD_{r,i}$ and $HD_{s,i}$ are receiver and satellite pseudorange hardware delays, respectively, in metric units, where i represents the carrier frequency (L1 or L2); $M_1$ and $M_2$ are pseudorange multipath on L1 and L2 frequencies, respectively, in meters; and $E_1$ and $E_2$ are other un-modeled errors of pseudorange measurements on L1 and L2 frequencies, respectively, in meters. The other symbols have the same meaning as in equations 2.1 and 2.2.

In order to mathematically eliminate the ionospheric delay from carrier-phase and pseudorange measurements an ionospheric-free combination of the two frequencies can be used. This combination takes advantage of the fact the ionosphere is a dispersive medium, and thus the magnitude of the delay is inversely proportional to the frequency squared, as:

$$I_i = \frac{40.3\, TEC}{f_i^2}, \quad (2.5)$$

where $I_i$ is the ionospheric delay on the frequency i in metric units, TEC is the total integrated electron content, and $f_i$ is the frequency of the signal, in hertz. The carrier and pseudorange ionospheric-free combinations can be formed as follows:

$$\Phi_{if} = \frac{f_1^2}{f_1^2 - f_2^2}\Phi_1 - \frac{f_2^2}{f_1^2 - f_2^2}\Phi_2, \quad (2.6)$$

and $$P_{if} = \frac{f_1^2}{f_1^2 - f_2^2}P_1 - \frac{f_2^2}{f_1^2 - f_2^2}P_2. \quad (2.7)$$

The observation equations for the iono-free combinations read:

$$\Phi_{if} = R + c(dT - dt) + T + \lambda_{if} N_{if} + hd_{r,if} - hd_{s,if} + pb_{r,if} - pb_{s,if} + m_{if} + e_{if} \quad (2.8)$$

and $$P_{if} = R + c(dT - dt) + T + HD_{r,if} - HD_{s,if} + M_{if} + E_{if} \quad (2.9)$$

The ionospheric delay terms are not present in the previous two equations, since they were eliminated in the iono-free combination operation. The use of this linear combination implies that respective wavelengths and ambiguities are also combined, resulting in:

$$\lambda_{if} = \frac{f_1^2}{f_1^2 - f_2^2}\lambda_1 - \frac{f_2^2}{f_1^2 - f_2^2}\lambda_2, \quad (2.10)$$

and $$N_{if} = \frac{f_1^2}{f_1^2 - f_2^2}N_1 - \frac{f_2^2}{f_1^2 - f_2^2}N_2, \quad (2.11)$$

It is easy to conclude that because the coefficients multiplying the ambiguities in the equation above are not integers, the resulting ionosphere-free ambiguity ($N_{if}$) is also not an integer, as opposed to ambiguities on L1 ($N_1$) and L2 ($N_2$).

The observation equations given by equations 2.8 and 2.9 can be simplified considering that the receiver's code hardware delay will be absorbed by the receiver clock parameter, as:

$$c \cdot dT' = c \cdot dT + HD_{r,if} \quad (2.12)$$

or similarly:

$$dT' = dT + \frac{HD_{r,if}}{c}, \quad (2.13)$$

since dT' and dT are defined in seconds, and $HD_{r,if}$ is defined in meters.

The receiver's code hardware delay gets absorbed by the clock parameter because even though carrier-phase measurements usually have more weight, they are ambiguous (they have an ambiguity term) and thus the clock datum in the PPP solution comes really from pseudorange observations. The satellites' code hardware delays ($HD_{s,if}$) can be accounted for by applying known differential code biases to the measurements. In some cases it is not necessary to correct pseudoranges for satellite code biases (see . . . ). In order to include these cases in a general formulation, one should make the hardware delay correction equal to. This procedure will be discussed in detail below. The corrected pseudorange reads:

$$P'_{if} = P_{if} + HD_{s,if} \quad (2.14)$$

The observation equations can then be rearranged as:

$$\Phi_{if} = R + c(dT' - dt) + T + \lambda_{if}N_{if} + hd_{r,if} - hd_{s,if} + pb_{r,if} - pb_{s,if} - HD_{r,if} + m_{if} + e_{if} \quad (2.15)$$

and $$P'_{if} = R + c(dT' - dt) + T + M_{if} + E_{if}. \quad (2.16)$$

As it is not assumed that code and carrier hardware delays are the same a code hardware delay term is now present in the carrier-phase observation equation.

Because the hardware delays and phase biases are terms reasonably stable over time, they are actually absorbed by the iono-free ambiguity parameter, according to:

$$\lambda_{if}N'_{if} = \lambda_{if}N_{if} + hd_{r,if} - hd_{s,if} + pb_{r,if} - pb_{s,if} + HD_{r,if} \quad (2.17)$$

or similarly:

$$N'_{if} = N_{if} + \frac{hd_{r,if} - hd_{s,if} + pb_{r,if} - pb_{s,if} + HD_{r,if}}{\lambda_{if}}, \quad (2.18)$$

since the ambiguity terms are being defined in cycles, while biases are being defined in meters.

Thus the carrier-phase observation equation becomes:

$$\Phi_{if} = R + c(dT' - dt) + T + \lambda_{if}N'_{if} + m_{if} + e_{if} \quad (2.19)$$

Therefore it is easy to conclude that the PPP float ambiguity parameter is not a pure ambiguity, but an iono-free combination of two integer (pure) ambiguities ($N_1$ and $N_2$) added to a collection of hardware delays and initial phase biases (converted to cycle units, as shown in equation 2.18).

As mentioned earlier, one of the advantages of Precise Point Positioning is the high accuracy which can be obtained with a single receiver. However, to get good results the observations need to be corrected for a variety of effects before they are used. Each of these corrections will be discussed later. We should then consider the corrected observations:

$$P'_{if} = P_{if} + C_{if} \quad (2.20)$$

and $$\Phi'_{if} = \Phi_{if} + c_{if} \quad (2.21)$$

where $P'_{if}$ and $\Phi'_{if}$ are the corrected pseudorange and carrier-phase measurements, respectively; and $C_{if}$ and $c_{if}$ are the pseudorange and carrier-phase corrections, respectively. The pseudorange correction twin includes the hardware delay as shown in equation 2.14, so equation 2.14 can be seen as a particular case of equation 2.20. The corrected carrier-phase observation equation reads:

$$\Phi'_{if} = R + c(dT' - dt) + T + \lambda_{if}N'_{if} + m_{if} + e_{if} \quad (2.22)$$

The difference between equations 2.22 and 2.19 is the fact in equation 2.22 the carrier-phase measurement ($\Phi'_{if}$) is a corrected observation.

1.3. Adjustment of Observations

For improved accuracy, the observations can be adjusted to determine the parameters pertinent to positioning. These parameters are the receiver coordinates, the receiver clock error, the zenith troposphere delay and the carrier-phase ambiguities. The equations of this section ignore the multipath ($M_{if}$ and $m_{if}$) and noise ($E_{if}$ and $e_{if}$) terms, assuming they are non-modeled parts of the positioning model.

If a-priori values for all parameters are known, the observation equations can be rewritten as below. If it is not possible to come up with approximate values for parameters such as receiver clock error and receiver position, zeros can be used instead. The ambiguities are preferably initialized with zeros, and NAD with the delay provided by a model such as UNB3m. Detailed of the UNB3m model are found in [Leandro, 2006b] The algorithm is preferably designed to handle zeros as a-priori information.

$$\Phi'_{if} = (R_0 + \delta R) + c((dT'_0 + \delta dT') - dt) + (T_0 + \delta T) + \lambda_{if}(N'_{if,0} + \delta N'_{if}), \quad (2.23)$$

and $$P'_{if} = (R_0 \delta R) + c(dT'_0 + \delta dT') - dt) + (T_0 + \delta T). \quad (2.24)$$

The subscript zero indicates the a-priori values being used, and the terms accompanied with deltas are the "errors" introduced when using those a-priori values, or, in other words, the difference between the real value and the a-priori value of each parameter. These "errors" are the updates to be computed, so the a-priori values can be corrected to approach the real values of each parameter. The equations above can be rewritten using the partial derivatives of each parameter with respect to the observation:

$$\Phi'_{if} = R_0 + \frac{\partial \Phi'_{if}}{\partial X_r} \delta X_r + \frac{\partial \Phi'_{if}}{\partial Y_r} \delta Y_r + \frac{\partial \Phi'_{if}}{\partial Z_r} \delta Z_r + c dT'_0 + \quad (2.25)$$
$$\frac{\partial \Phi'_{if}}{\partial dT'} \delta dT' - c dt + T_0 + \frac{\partial \Phi'_{if}}{\partial T_z} \delta T_z + \lambda_{if} N'_{if,0} + \frac{\partial \Phi'_{if}}{\partial N'_{if}} \delta N'_{if},$$

and $$P'_{if} = R_0 + \frac{\partial P'_{if}}{\partial X_r} \delta X_r + \frac{\partial P'_{if}}{\partial Y_r} \delta Y_r + \quad (2.26)$$
$$\frac{\partial P'_{if}}{\partial Z_r} \delta Z_r + c dT'_0 + \frac{\partial P'_{if}}{\partial dT'} \delta dT' - c dt + T_0 + \frac{\partial P'_{if}}{\partial T_z} \delta T_z,$$

where $X_r$, $Y_r$ and $Z_r$ stand for the receiver cartesian coordinates, and $T_z$ is the zenith neutral atmosphere delay. Now the parameters are actually the updates ($\delta X_r$, $\delta Y_r$, $\delta Z_r$, $\delta dT'$, and $\delta T_z$) that each parameter should receive to get closer to its real value. The equations can then be rearranged with the parameters on the left hand side and the rest of it on the right hand side:

$$\frac{\partial \Phi'_{if}}{\partial X_r} \delta X_r + \frac{\partial \Phi'_{if}}{\partial Y_r} \delta Y_r + \frac{\partial \Phi'_{if}}{\partial Z_r} \delta Z_r + \frac{\partial \Phi'_{if}}{\partial dT'} \delta dT' + \frac{\partial \Phi'_{if}}{\partial T_z} \delta T_z + \quad (2.27)$$
$$\frac{\partial \Phi'_{if}}{\partial N'_{if}} \delta N'_{if} = \Phi'_{if} - R_0 - c dT'_0 + c dt - T_0 - \lambda_{if} N'_{if,0},$$

and $$\frac{\partial P'_{if}}{\partial X_r} \delta X_r + \frac{\partial P'_{if}}{\partial Y_r} \delta Y_r + \frac{\partial P'_{if}}{\partial Z_r} \delta Z_r + \frac{\partial P'_{if}}{\partial dT'} \delta dT' + \frac{\partial P'_{if}}{\partial T_z} \delta T_z = \quad (2.28)$$
$$P'_{if} - R_0 - c dT'_0 + c dt - T_0.$$

The partial derivatives are evaluated as follows:

$$\frac{\partial \Phi'_{if}}{\partial X_r} = \frac{\partial P'_{if}}{\partial X_r} = -\frac{X^s - X_r}{R_0}, \quad (2.29)$$

$$\frac{\partial \Phi'_{if}}{\partial Y_r} = \frac{\partial P'_{if}}{\partial Y_r} = -\frac{Y^s - Y_r}{R_0}, \quad (2.30)$$

$$\frac{\partial \Phi'_{if}}{\partial Z_r} = \frac{\partial P'_{if}}{\partial Z_r} = -\frac{Z^s - Z_r}{R_0}, \quad (2.31)$$

where $X^s$, $Y^s$ and $Z^s$ stand for the satellites coordinates at the signal transmission time, $$\frac{\partial \Phi'_{if}}{\partial dT'} = \frac{\partial P'_{if}}{\partial dT'} = c, \quad (2.32)$$

$$\frac{\partial \Phi'_{if}}{\partial T_z} = \frac{\partial P'_{if}}{\partial T_z} = mf_{nh}, \quad (2.33)$$

and $$\frac{\partial \Phi'_{if}}{\partial N'_{if}} = \lambda_{if}, \quad (2.34)$$

where $mf_{nh}$ is the non-hydrostatic mapping function, such as the Niell [Niell, 1996] mapping function. The non-hydrostatic mapping function is preferably used because it is assumed that the a-priori zenith delay provided by the UNB3m model can account for most of the hydrostatic delay, and thus, most of the residual delay is actually of non-hydrostatic nature.

It is worthwhile to take a closer look in one of the elements mentioned above: the geometric range. Although it looks like a simple computation of vector length, there are some complicating factors associated with it which are discussed below.

To compute updates for the parameters, observations of several satellites over several epochs are used. These observations are put together in a least squares adjustment filter. There are several ways to perform the observations adjustment, only one of which is described here in the interest of brevity.

The parameter updates are preferably computed at every epoch of observation, according to:

$$\underline{\delta} = (\underline{A}^t \underline{P} \underline{A} + \underline{C}_x)^{-1} \underline{A}^t \underline{P} \underline{w}, \quad (2.35)$$

where $\underline{\delta}$ is the parameters update vector, $\underline{A}$ is the design matrix, $\underline{P}$ is the weight matrix, $\underline{C}_x$ is the parameters covariance matrix, and $\underline{w}$ is the misclosure vector. These elements are discussed in the following paragraphs.

The vector of updates consists of updates for coordinates (receiver position), residual neutral atmosphere delay, receiver clock and carrier-phase ambiguities of the satellites s1, s2, . . . , sn as follows:

$$\underline{\delta} = \begin{bmatrix} \delta X_r \\ \delta Y_r \\ \delta Z_r \\ \delta dT' \\ \delta T_z \\ \delta N'_{if,s1} \\ \vdots \\ \delta N'_{if,sn} \end{bmatrix}. \quad (2.36)$$

The design matrix is formed as follows:

$$A = \begin{bmatrix} \frac{\partial \Phi'_{if,s1}}{\partial X_r} & \frac{\partial \Phi'_{if,s1}}{\partial Y_r} & \frac{\partial \Phi'_{if,s1}}{\partial Z_r} & \frac{\partial \Phi'_{if,s1}}{\partial dT'} & \frac{\partial \Phi'_{if,s1}}{\partial T_z} & \frac{\partial \Phi'_{if,s1}}{\partial N_{if,s1}} & 0 & 0 & \cdots & 0 \\ \frac{\partial P'_{if,s1}}{\partial X_r} & \frac{\partial P'_{if,s1}}{\partial Y_r} & \frac{\partial P'_{if,s1}}{\partial Z_r} & \frac{\partial P'_{if,s1}}{\partial dT'} & \frac{\partial P'_{if,s1}}{\partial T_z} & 0 & 0 & 0 & \cdots & 0 \\ \frac{\partial \Phi'_{if,s2}}{\partial X_r} & \frac{\partial \Phi'_{if,s2}}{\partial Y_r} & \frac{\partial \Phi'_{if,s2}}{\partial Z_r} & \frac{\partial \Phi'_{if,s2}}{\partial dT'} & \frac{\partial \Phi'_{if,s2}}{\partial T_z} & 0 & \frac{\partial \Phi'_{if,s2}}{\partial N_{if,s2}} & 0 & \cdots & 0 \\ \frac{\partial P'_{if,s2}}{\partial X_r} & \frac{\partial P'_{if,s2}}{\partial Y_r} & \frac{\partial P'_{if,s2}}{\partial Z_r} & \frac{\partial P'_{if,s2}}{\partial dT'} & \frac{\partial P'_{if,s2}}{\partial T_z} & 0 & 0 & 0 & \cdots & 0 \\ \frac{\partial \Phi'_{if,s3}}{\partial X_r} & \frac{\partial \Phi'_{if,s3}}{\partial Y_r} & \frac{\partial \Phi'_{if,s3}}{\partial Z_r} & \frac{\partial \Phi'_{if,s3}}{\partial dT'} & \frac{\partial \Phi'_{if,s3}}{\partial T_z} & 0 & 0 & \frac{\partial \Phi'_{if,s3}}{\partial N_{if,s3}} & \cdots & 0 \\ \frac{\partial P'_{if,s3}}{\partial X_r} & \frac{\partial P'_{if,s3}}{\partial Y_r} & \frac{\partial P'_{if,s3}}{\partial Z_r} & \frac{\partial P'_{if,s3}}{\partial dT'} & \frac{\partial P'_{if,s3}}{\partial T_z} & 0 & 0 & 0 & \cdots & 0 \\ \vdots & \vdots & \vdots & \vdots & \vdots & \vdots & \vdots & \vdots & & \vdots \\ \frac{\partial \Phi'_{if,sn}}{\partial X_r} & \frac{\partial \Phi'_{if,sn}}{\partial Y_r} & \frac{\partial \Phi'_{if,sn}}{\partial Z_r} & \frac{\partial \Phi'_{if,sn}}{\partial dT'} & \frac{\partial \Phi'_{if,sn}}{\partial T_z} & 0 & 0 & 0 & \cdots & \frac{\partial \Phi'_{if,sn}}{\partial N_{if,sn}} \\ \frac{\partial P'_{if,sn}}{\partial X_r} & \frac{\partial P'_{if,sn}}{\partial Y_r} & \frac{\partial P'_{if,sn}}{\partial Z_r} & \frac{\partial P'_{if,sn}}{\partial dT'} & \frac{\partial P'_{if,sn}}{\partial T_z} & 0 & 0 & 0 & \cdots & 0 \end{bmatrix}, \quad (2.37)$$

where the partial derivatives are evaluated as previously shown. As it can be noticed in the equation above, the design matrix is formed with its rows ordered for observed satellites, with odd rows containing carrier-phase measurements partials, and even rows with pseudorange partials. The ordering used does not influence the results at all, and the only requirement with respect to it is that the ordering should be the same as in the weight matrix and misclosure vector. The weight matrix is formed using elevation angle dependent values, as:

$$P_{\Phi,s} = \frac{\sin(el)^2}{\sigma_\Phi^2}, \quad (2.38)$$

for carrier-phase, and $$P_{P,s} = \frac{\sin(el)^2}{\sigma_P^2}, \quad (2.39)$$

for pseudorange, where $\sigma_\Phi$ and $\sigma_P$ are the standard deviations at the zenith direction given for carrier-phase and pseudoranges, with standard values of 0.02 m and 2.00 m, respectively. The weight matrix therefore reads:

$$P = \begin{bmatrix} P_{\Phi,s1} & 0 & 0 & 0 & 0 & 0 & \cdots & 0 & 0 \\ 0 & P_{P,s1} & 0 & 0 & 0 & 0 & \cdots & 0 & 0 \\ 0 & 0 & P_{\Phi,s2} & 0 & 0 & 0 & \cdots & 0 & 0 \\ 0 & 0 & 0 & P_{P,s2} & 0 & 0 & \cdots & 0 & 0 \\ 0 & 0 & 0 & 0 & P_{\Phi,s3} & 0 & \cdots & 0 & 0 \\ 0 & 0 & 0 & 0 & 0 & P_{P,s3} & \cdots & 0 & 0 \\ \vdots & \vdots & \vdots & \vdots & \vdots & \vdots & \ddots & 0 & 0 \\ 0 & 0 & 0 & 0 & 0 & 0 & 0 & P_{\Phi,sn} & 0 \\ 0 & 0 & 0 & 0 & 0 & 0 & 0 & 0 & P_{P,sn} \end{bmatrix}. \quad (2.40)$$

As can be seen, no correlations are considered between any of the measurements, and therefore the weight matrix is a diagonal matrix. The misclosure vector is basically the difference between the observed carrier-phase or pseudorange and their modeled values, computed with the parameter values as known at the time of the update. Misclosure vector values are computed as follows:

$$w_\Phi = \Phi'_{if} - R_0 - cdT'_0 + cdt - T_0 - \lambda_{if} N'_{if,0}, \quad (2.41)$$

and $$w_P = P'_{if} - R_0 - cdT'_0 + cdt - T_0. \quad (2.42)$$

Following the same structure as used for design and weight matrices, the misclosure vector is formed as follows:

$$\underline{w} = \begin{bmatrix} w_{\Phi,s1} \\ w_{P,s1} \\ w_{\Phi,s2} \\ w_{P,s2} \\ w_{\Phi,s3} \\ w_{P,s3} \\ \vdots \\ w_{\Phi,sn} \\ w_{P,sn} \end{bmatrix}. \quad (2.43)$$

The parameters covariance matrix consists of the variances and covariances for position, receiver clock, neutral atmosphere delay, and ambiguities. The equation below shows an example of the upper triangle of a parameters covariance matrix. There is no need of showing the whole matrix, because it is symmetric.

$$\underline{C}_x = \begin{bmatrix} \sigma_X^2 & \sigma_{XY} & \sigma_{XZ} & \sigma_{XdT} & \sigma_{XT_z} & \sigma_{XN_{if,s1}} & \sigma_{XN_{if,s2}} & \cdots & \sigma_{XN_{if,sn}} \\ & \sigma_Y^2 & \sigma_{YZ} & \sigma_{YdT} & \sigma_{YT_z} & \sigma_{YN_{if,s1}} & \sigma_{YN_{if,s2}} & \cdots & \sigma_{YN_{if,sn}} \\ & & \sigma_Z^2 & \sigma_{ZdT} & \sigma_{ZT_z} & \sigma_{ZN_{if,s1}} & \sigma_{ZN_{if,s2}} & \cdots & \sigma_{ZN_{if,sn}} \\ & & & \sigma_{dT}^2 & \sigma_{dTT_z} & \sigma_{dTN_{if,s1}} & \sigma_{dTN_{if,s2}} & \cdots & \sigma_{dTN_{if,sn}} \\ & & & & \sigma_{T_z}^2 & \sigma_{T_zN_{if,s1}} & \sigma_{T_zN_{if,s2}} & \cdots & \sigma_{T_zN_{if,sn}} \\ & & & & & \sigma_{N_{if,s1}}^2 & \sigma_{N_{if,s1}N_{if,s2}} & \cdots & \sigma_{N_{if,s1}N_{if,sn}} \\ & & & & & & \sigma_{N_{if,s2}}^2 & \cdots & \sigma_{N_{if,s2}N_{if,sn}} \\ & & & & & & & \ddots & \vdots \\ & & & & & & & & \sigma_{N_{if,sn}}^2 \end{bmatrix}. \quad (2.44)$$

The next sub-sections discuss computation details. First, the procedure for the geometric range is shown, and later the corrections applied to carrier-phase and pseudoranges (as shown in equations 2.20 and 2.21).

The parameters covariance matrix consists of the variances and covariances for position, receiver clock, neutral atmosphere delay, and ambiguities. The equation below shows an example of the upper triangle of a parameters covariance matrix. There is no need of showing the whole matrix, because it is symmetric.

$$T_{t,GPS} = T_{r,nom} - \frac{P}{c} - dt, \quad (2.45)$$

where $T'_{t,GPS}$ is the transmission time in GPS time scale, $T_{r,nom}$ is the nominal reception time (the receiver time tags), P is the pseudorange measurement, c is the speed of light and dt is the satellite clock error. The pseudorange measurement to be used in this computation does not need to have any $$\underline{C}_x = \begin{bmatrix} \sigma_X^2 & \sigma_{XY} & \sigma_{XZ} & \sigma_{XdT} & \sigma_{XT_z} & \sigma_{XN_{if,s1}} & \sigma_{XN_{if,s2}} & \cdots & \sigma_{XN_{if,sn}} \\ & \sigma_Y^2 & \sigma_{YZ} & \sigma_{YdT} & \sigma_{YT_z} & \sigma_{YN_{if,s1}} & \sigma_{YN_{if,s2}} & \cdots & \sigma_{YN_{if,sn}} \\ & & \sigma_Z^2 & \sigma_{ZdT} & \sigma_{ZT_z} & \sigma_{ZN_{if,s1}} & \sigma_{ZN_{if,s2}} & \cdots & \sigma_{ZN_{if,sn}} \\ & & & \sigma_{dT}^2 & \sigma_{dTT_z} & \sigma_{dTN_{if,s1}} & \sigma_{dTN_{if,s2}} & \cdots & \sigma_{dTN_{if,sn}} \\ & & & & \sigma_{T_z}^2 & \sigma_{T_zN_{if,s1}} & \sigma_{T_zN_{if,s2}} & \cdots & \sigma_{T_zN_{if,sn}} \\ & & & & & \sigma_{N_{if,s1}}^2 & \sigma_{N_{if,s1}N_{if,s2}} & \cdots & \sigma_{N_{if,s1}N_{if,sn}} \\ & & & & & & \sigma_{N_{if,s2}}^2 & \cdots & \sigma_{N_{if,s2}N_{if,sn}} \\ & & & & & & & \ddots & \vdots \\ & & & & & & & & \sigma_{N_{if,sn}}^2 \end{bmatrix}. \quad (2.44)$$

In the next sub-sections, details regarding computations will be discussed. First, the procedure for the geometric range is shown, and later the corrections applied to carrier-phase and pseudoranges (as shown in equations 2.20 and 2.21).

1.3.1 Geometric Range Computation

Two fundamental quantities are needed for the geometric range computation: the receiver's coordinates and satellite's coordinates. The receiver coordinates come from the latest computed coordinates, which are used as a-priori values for the current position update. When running the filter for the first time, approximate coordinates can be used (such as coordinates from RINEX file header), or even a vector of zeros. Let us assume in this section that we have approximate coordinates for the receiver. The second important quantity is the satellite position. These coordinates can be determined using precise orbits, such as IGS (International GNSS Service) precise orbits. The coordinates of the satellite have to be determined for the time when the signal was transmitted—the transmission time. Since the time tags we have available at the receiver are the nominal reception time, we do not know before hand what time the signal was transmitted by the satellite ($T_{t,GPS}$). The pseudorange measurement can be used to determine it as follows:

correction applied, such as troposphere or ionosphere delay corrections, since the impact of these effects on the time of transmission is negligible. It implies that pseudorange measurements from any frequency can be used. It is important that the clock errors present in the pseudorange measurements be in accordance with the receiver time tag (which also has the same receiver clock error, and thus the receiver clock error gets eliminated in the computation above), so the pseudorange should not be corrected for receiver clock offset before being used for orbits determination. Because the measurement has also the effect of the satellite clock error dt, it has to be accounted for. Ideally, the satellite clock error should be also computed for the transmission time as computed above, however the variation of the computed value of the satellite clock when accounting for the clock error as in equation 2.45 is usually negligible, i.e.:

$$\frac{\partial dt}{\partial t} \cdot dt \cong 0, \quad (2.46)$$

so the approximate transmission time ($T'_{t,GPS}$) for satellite clock error computation purposes can be determined using only the pseudorange, as shown below:

$$T'_{t,GPS} = T_{r,nom} - \frac{P}{c}. \qquad (2.47)$$

The use of equation 2.47 avoids the use of iterations, and satellite clock and orbits can be computed in a straightforward procedure.

After satellite coordinates are determined, the range can be computed as:

$$R = \sqrt{(X^s - X_r)^2 + (Y^s - Y_r)^2 + (Z^s - Z_r)^2}. \qquad (2.48)$$

However, there is another effect which should be taken care of. Because the earth rotates during the travel time of the signal, the coordinate system (the earth-centered and earth-fixed cartesian coordinate system) also rotates, and the satellite coordinates should refer to this "rotated" coordinate system. To correct for this effect, the angle of rotation during the travel time is determined as:

$$\Omega = \dot{\Omega} \cdot \frac{R}{c}, \qquad (2.49)$$

where $\Omega$ is the rotation angle and $\dot{\Omega}$ is the angular velocity of the earth. The satellite coordinates can then be corrected by using a rotation matrix:

$$\begin{bmatrix} X^{s,r} \\ Y^{s,r} \\ Z^{s,r} \end{bmatrix} = R_3 \cdot \begin{bmatrix} X^s \\ Y^s \\ Z^s \end{bmatrix}, \qquad (2.50)$$

where the superscript r stands for "rotated", and $R_3$ is the rotation matrix along the Z axis:

$$R_3 = \begin{bmatrix} \cos(\Omega) & \sin(\Omega) & 0 \\ -\sin(\Omega) & \cos(\Omega) & 0 \\ 0 & 0 & 1 \end{bmatrix}. \qquad (2.51)$$

The geometric range can then be recomputed with the satellite rotated coordinates:

$$R = \sqrt{(X^{s,r} - X_r)^2 + (Y^{s,r} - Y_r)^2 + (Z^{s,r} - Z_r)^2}. \qquad (2.52)$$

This procedure (equations 2.35 to 2.39) might require iterations to achieve the correct geometric range.

1.4. Corrections

The next subsections discuss corrections to be applied to carrier-phase and pseudorange measurements for a complete (adequate) observation model in PPP. These enable cm-level accuracy with PPP:

Satellite antenna phase center offset and variation
Receiver antenna phase center offset and variation
Solid earth tides
Ocean tide loading
Differential code biases
Phase wind-up effect

1.4.1. Satellite Antenna Phase Center Offset and Variation

Corrections for satellite antenna phase center (APC) offset and variation discussed here assume that the satellite orbits being used for positioning are referred to the satellite center of mass, such as IGS orbits. This is not the case of the broadcast orbits, which do not need such a correction.

Satellite orbits refer to the satellite's center of mass, whereas the measurements refer to the antenna phase center. Therefore, it is necessary to take into consideration this difference. The correction can be divided in two parts: the offset and the variation. The offset is commonly represented by a constant three-dimensional vector fixed on the satellite body coordinate system, and thus the orientation of this vector depends on the satellite's orientation with respect to the earth. The variation part is an additional correction which depends on the nadir angle of the satellite-receiver vector. The offset and variation values can be retrieved from IGS antenna files (in ANTEX—ANTenna EXchange—format) which can be downloaded from the IGS web site, currently located at ftp://igscb.jpl.nasa.gov/pub/station/general/. The standard name of the file is igsYY_WWWW.atx, where YY represents the current IGS frame, and WWWW represents the GPS week when the file in question was generated. The format, as well as the standards used in this file can be found in Rothacher and Schmid [2006], where one can find the definition on how the satellite antenna phase center correction has to be applied (as in the following two equations):

$$PCP = CMP + PCO, \qquad (2.53)$$

where: PCP is the three-dimensional vector representing the satellite phase center position; CMP is the three-dimensional vector representing the satellite center of mass position, and PCO is the three-dimensional vector representing the satellite phase center offset.

$$R_{corrected} = R + PCV, \qquad (2.54)$$

where R is the geometric distance, and PCV is the phase center variation.

As opposed to a formerly used standard (called "relative calibration"), when the satellite antenna offsets had fixed values for all satellites of a same satellite block, in the current standard (called "absolute calibration") these values are actually determined for each particular spacecraft. The GPS spacecraft number "SVN" should not be confused with the pseudorandom noise "PRN" number. Different satellites can use the same PRN in different periods of time. Table 2.1 shows the GPS constellation history, since the launch of the first satellite until July of 2007 [U.S. Naval Observatory, 2007]. There are blanks for several satellites' PRN because these satellites are no longer in operation and therefore do not have an associated PRN.

TABLE 1

GPS satellite constellation history, as of July 2007:

| LAUNCH ORDER | PRN | SVN | LAUNCH DATE | FREQ STD | PLANE | US SPACE COMMAND** |
|---|---|---|---|---|---|---|
| *II-1 | | 14 | 14 FEB. 1989 | | | 19802 |
| *II-2 | | 13 | 10 JUN. 1989 | | | 20061 |
| *II-3 | | 16 | 18 AUG. 1989 | | | 20185 |
| *II-4 | | 19 | 21 OCT. 1989 | | | 20302 |

TABLE 1-continued

GPS satellite constellation history, as of July 2007:

| LAUNCH ORDER | PRN | SVN | LAUNCH DATE | FREQ STD | PLANE | US SPACE COMMAND** |
|---|---|---|---|---|---|---|
| *II-5 | | 17 | 11 DEC. 1989 | | | 20361 |
| *II-6 | | 18 | 24 JAN. 1990 | | | 20452 |
| *II-7 | | 20 | 26 MAR. 1990 | | | 20533 |
| *II-8 | | 21 | 02 AUG. 1990 | | | 20724 |
| *II-9 | | 15 | 01 OCT. 1990 | | | 20830 |
| IIA-10 | 32 | 23 | 26 NOV. 1990 | Rb | E5 | 20959 |
| IIA-11 | 24 | 24 | 04 JUL. 1991 | Cs | D5 | 21552 |
| IIA-12 | 25 | 25 | 23 FEB. 1992 | Rb | A5 | 21890 |
| *IIA-13 | | 28 | 10 APR. 1992 | | | 21930 |
| IIA-14 | 26 | 26 | 07 JUL. 1992 | Rb | F5 | 22014 |
| IIA-15 | 27 | 27 | 09 SEP. 1992 | Cs | A4 | 22108 |
| IIA-16 | 01 | 32 | 22 NOV. 1992 | Cs | F6 | 22231 |
| *IIA-17 | | 29 | 18 DEC. 1992 | | | 22275 |
| *IIA-18 | | 22 | 03 FEB. 1993 | | | 22446 |
| *IIA-19 | | 31 | 30 MAR. 1993 | | | 22581 |
| *IIA-20 | 07 | 37 | 13 MAY 1993 | | C5 | 22657 |
| IIA-21 | 09 | 39 | 26 JUN. 1993 | Cs | A1 | 22700 |
| IIA-22 | 05 | 35 | 30 AUG. 1993 | Rb | B5 | 22779 |
| IIA-23 | 04 | 34 | 26 OCT. 1993 | Rb | D4 | 22877 |
| IIA-24 | 06 | 36 | 10 MAR. 1994 | Rb | C1 | 23027 |
| IIA-25 | 03 | 33 | 28 MAR. 1996 | Cs | C2 | 23833 |
| IIA-26 | 10 | 40 | 16 JUL. 1996 | Rb | E3 | 23953 |
| IIA-27 | 30 | 30 | 12 SEP. 1996 | Cs | B2 | 24320 |
| IIA-28 | 08 | 38 | 06 NOV. 1997 | Cs | A3 | 25030 |
| ***IIR-1 | | 42 | 17 JAN. 1997 | | | |
| IIR-2 | 13 | 43 | 23 JUL. 1997 | Rb | F3 | 24876 |
| IIR-3 | 11 | 46 | 07 OCT. 1999 | Rb | D2 | 25933 |
| IIR-4 | 20 | 51 | 11 MAY 2000 | Rb | E1 | 26360 |
| IIR-5 | 28 | 44 | 16 JUL. 2000 | Rb | B3 | 26407 |
| IIR-6 | 14 | 41 | 10 NOV. 2000 | Rb | F1 | 26605 |
| IIR-7 | 18 | 54 | 30 JAN. 2001 | Rb | E4 | 26690 |
| IIR-8 | 16 | 56 | 29 JAN. 2003 | Rb | B1 | 27663 |
| IIR-9 | 21 | 45 | 31 MAR. 2003 | Rb | D3 | 27704 |
| IIR-10 | 22 | 47 | 21 DEC. 2003 | Rb | E2 | 28129 |
| IIR-11 | 19 | 59 | 20 MAR. 2004 | Rb | C3 | 28190 |
| IIR-12 | 23 | 60 | 23 JUN. 2004 | Rb | F4 | 28361 |
| IIR-13 | 02 | 61 | 06 NOV. 2004 | Rb | D1 | 28474 |
| IIR-14M | 17 | 53 | 26 SEP. 2005 | Rb | C4 | 28874 |
| IIR-15M | 31 | 52 | 25 SEP. 2006 | Rb | A2 | 29486 |
| IIR-16M | 12 | 58 | 17 NOV. 2006 | Rb | B4 | 29601 |
| IIR-17M | 15 | 55 | 17 OCT. 2007 | Rb | F2 | 32260 |
| IIR-18M | 29 | 57 | 20 DEC. 2007 | Rb | C6 | 32384 |

Because new satellites are launched and become part of the GPS constellation the file containing antenna information has to be constantly updated, (and that is also true for GLONASS and Galileo satellites). In an ideal scenario, one should always check if there is any update of the antenna file before processing GPS data in PPP mode.

Figure 2:
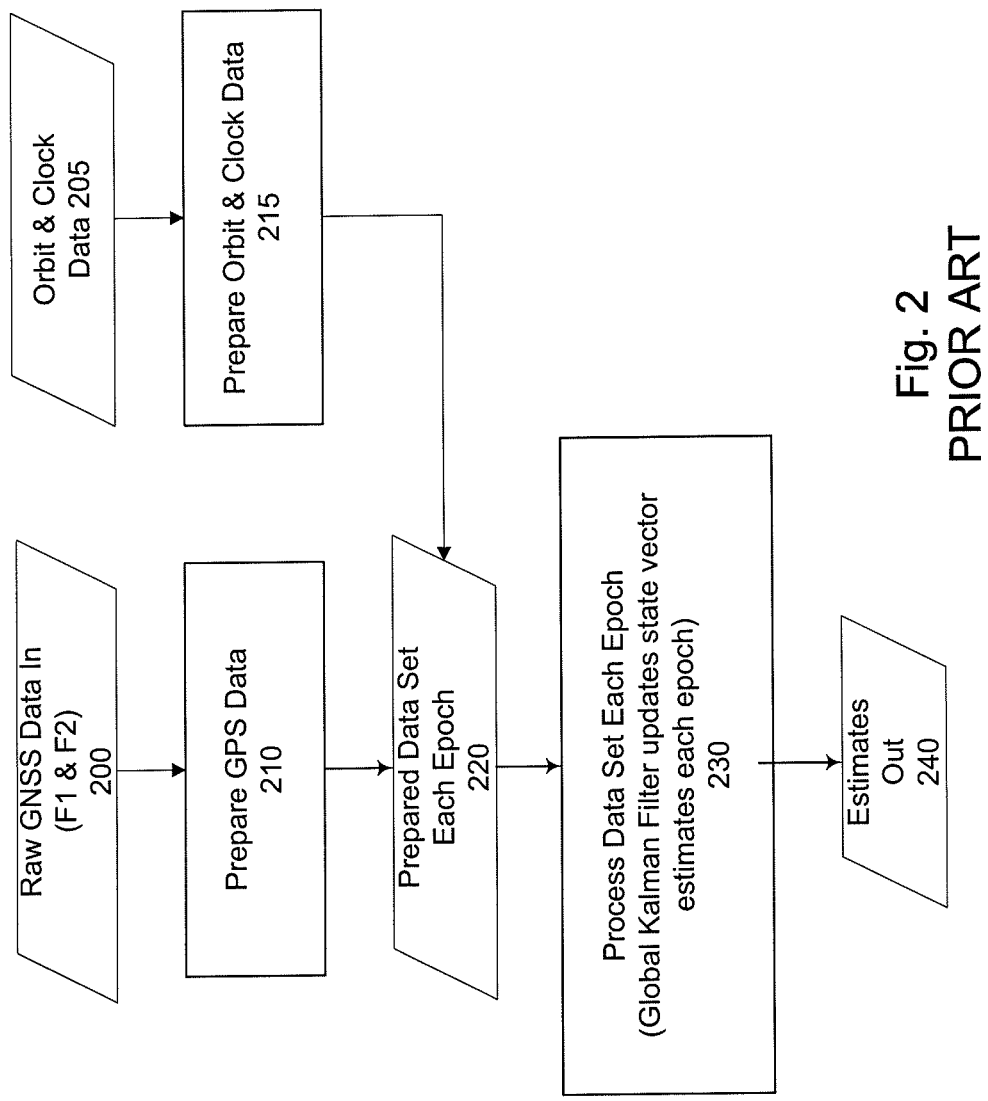
FIG. 2 schematically shows a typical prior-art processing method.
Figure 3:
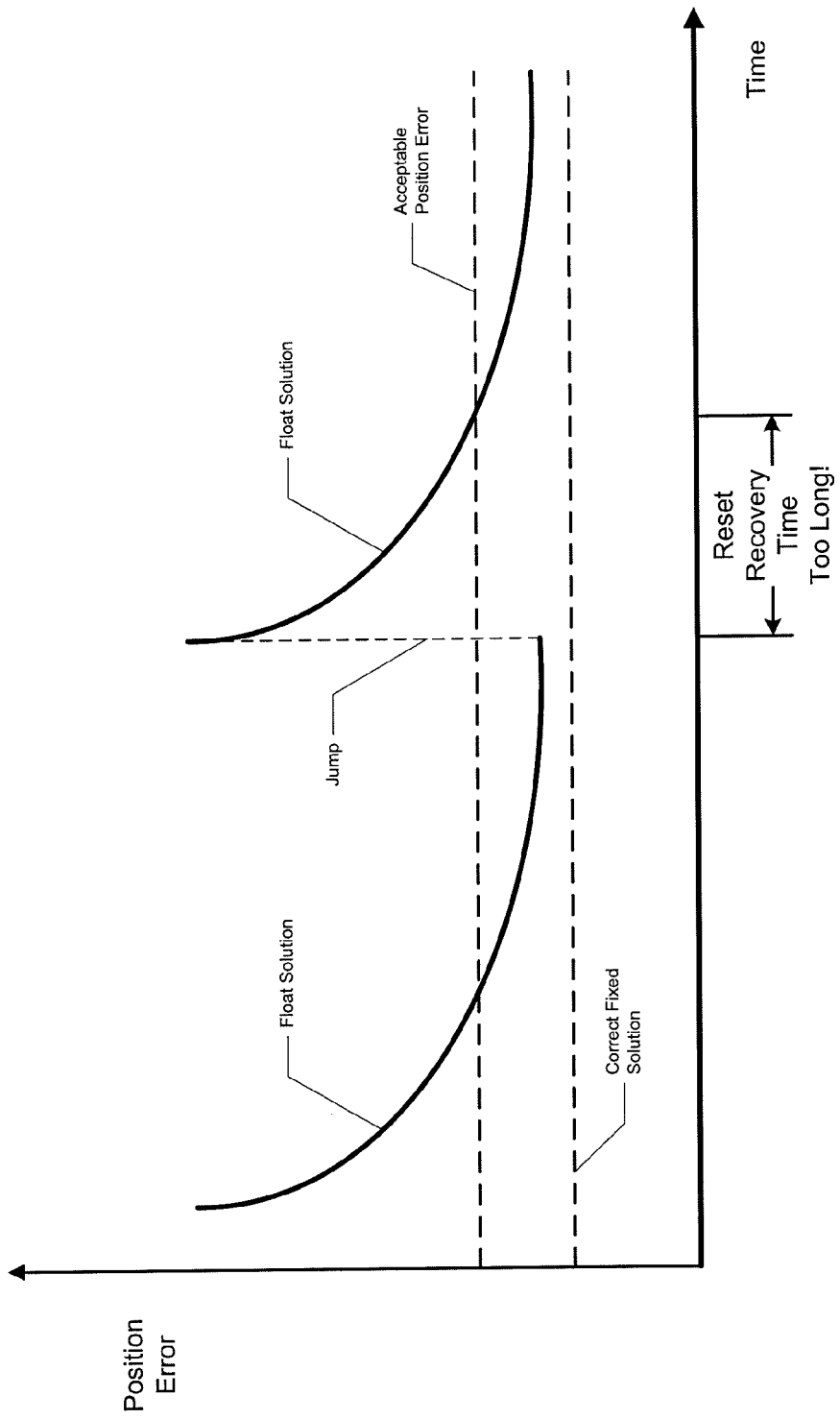
FIG. 3 schematically illustrates problems encountered with prior-art processing techniques.

As mentioned earlier, the satellite antenna offsets are represented as a three dimensional vector fixed to the satellite body coordinate system. The major component of this vector (component Z in the satellite's body coordinate system) is the component in the radial direction, i.e., which points to the earth's center of mass, and therefore the determination of this component's orientation is trivial. The orientation of the other two components depends on the position of the sun. The Y axis, which is the rotation axis of the solar panel, corresponds to the cross product of the Z axis with the vector from the satellite to the sun. The X axis completes the right-handed system [Rothacher and Schmid, 2006]. For illustration purposes, FIG. 2.1 shows the antenna offsets for the GPS satellites, as of July 2007. There is no plot for the Y component because it has value equal to zero for all satellites.

Concerning the phase center variation correction, the antenna file contains correction values distributed for several nadir angles. To determine the value to be used, one has to compute the nadir angle of the satellite-receiver vector at the time of the observation, and then interpolate (in this case, a linear interpolation is enough) the correction. It might be the case of having to extrapolate as well, depending on the nadir angles obtained for particular locations. The format of the file also comports variation for different azimuths, but, as of March 2008, the International GNSS Service has made available satellite APC corrections which depend on nadir angle only. The offsets and variations are made available with values for each frequency, even though in practice only the satellite APC iono-free combination has been determined. Thus as of March 2008 the values of the satellite APC offset and variation on L1 and L2 frequencies are simply a replication of the iono-free combination value. For detailed information on the format refer to Rothacher and Schmid [2006].

1.4.2. Receiver Antenna Phase Center Offset and Variation

This section discusses the correction due to the receiver antenna phase center offset and variation. Similar to the satellite APC information, the receiver-dependent offsets and variations can also be found in ANTEX files. The receiver APC offset correction also consists of a 3D offset vector, and variation corrections also have to be applied in the observation domain. They are given as:

$$PCP = ARP + PCO, \quad (2.55)$$

where: $\overline{PCP}$ is the three-dimensional vector representing the satellite phase center position; $\overline{ARP}$ is the three-dimensional vector representing the receiver antenna reference point position, and $\overline{PCO}$ is the three-dimensional vector representing the receiver phase center offset.

$$R_{corrected} = R + PCV, \quad (2.54)$$

where R is the geometric distance, and PCV is the phase center variation.

Figure 4A:
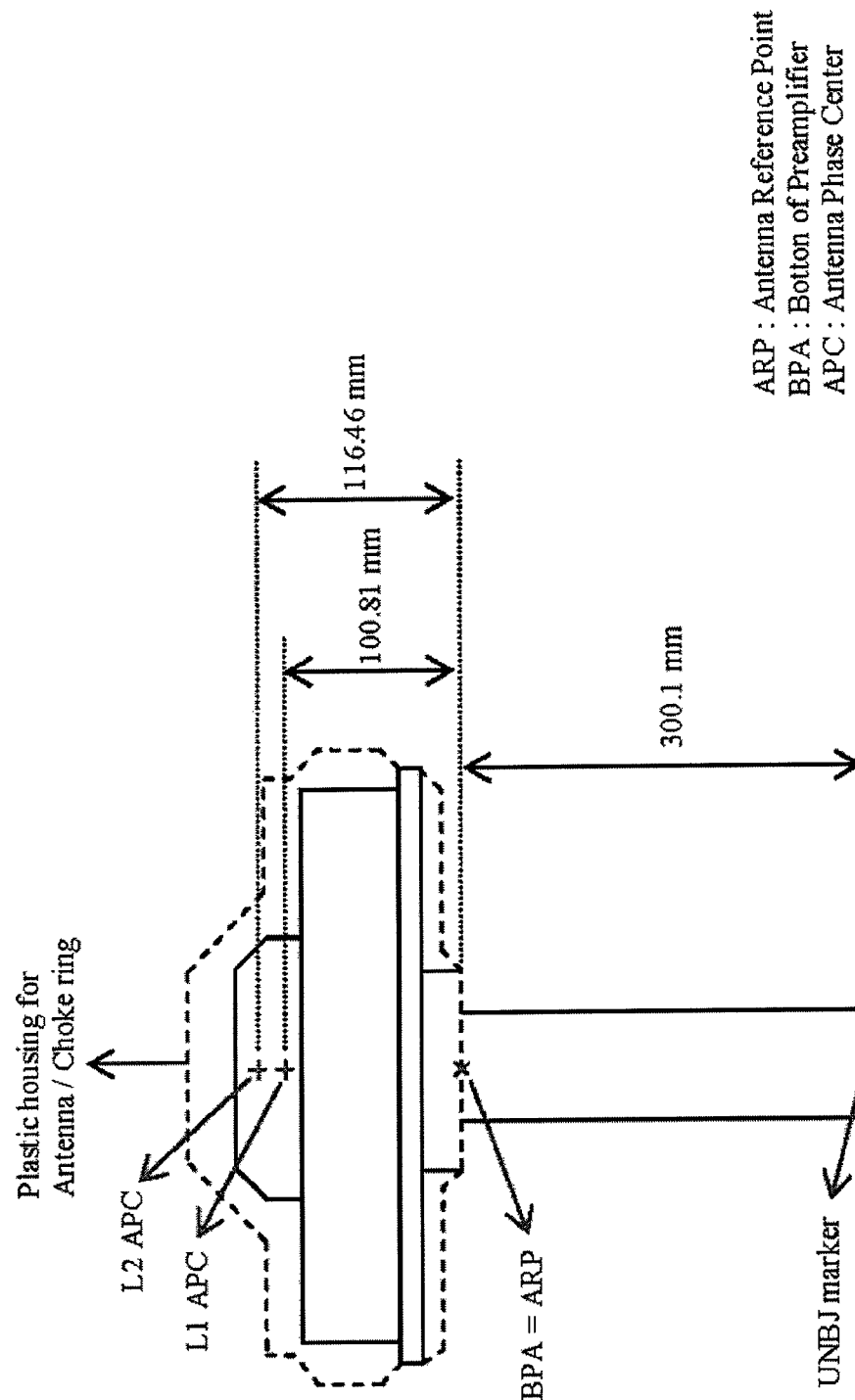
FIG. 4A schematically shows a prior-art receiver antenna.

Although the procedure is similar to the one used for satellites, receiver offsets are represented as a 3D vector with components in North, East and Up directions in the receiver's local geodetic coordinate system. FIG. 4A shows a diagram of the University of New Brunswick (UNBJ) station antenna (RegAnt choke-ring antenna); a similar diagram is found at http://igscb.jpl.nasa.gov/igscb/station/log/unbj_20060906.log. The antenna offsets in FIG. 4A were obtained from ANTEX file igs05_1421. The antenna reference point of this antenna is about 30 cm above the station marker (which is actually the top of the pole to which UNBJ antenna is fixed). This offset is not part of the antenna phase center offset, and is usually referred to as "antenna height". This value is particular for each antenna installation and it should be printed as one of the observation RINEX file header records (for instance "ANTENNA: DELTA H/E/N" record, which also supports North and East offsets—for more details about RINEX format one should refer to Gurtner and Estey [2006], or Gurtner and Estey [2007]). The receiver antenna phase center offset refers to the base of the antenna, the antenna reference point. In FIG. 4A, the L1 and L2 APCs are 100.81 and 116.46 mm above the ARP, respectively. These values come from the absolute antenna APC calibration, which in this specific case was determined by Geo++GmbH by means of a Robot calibration (more information concerning antenna calibration at Geo++can be found at http://gnpcvdb.geopp.de).

Figure 4B:
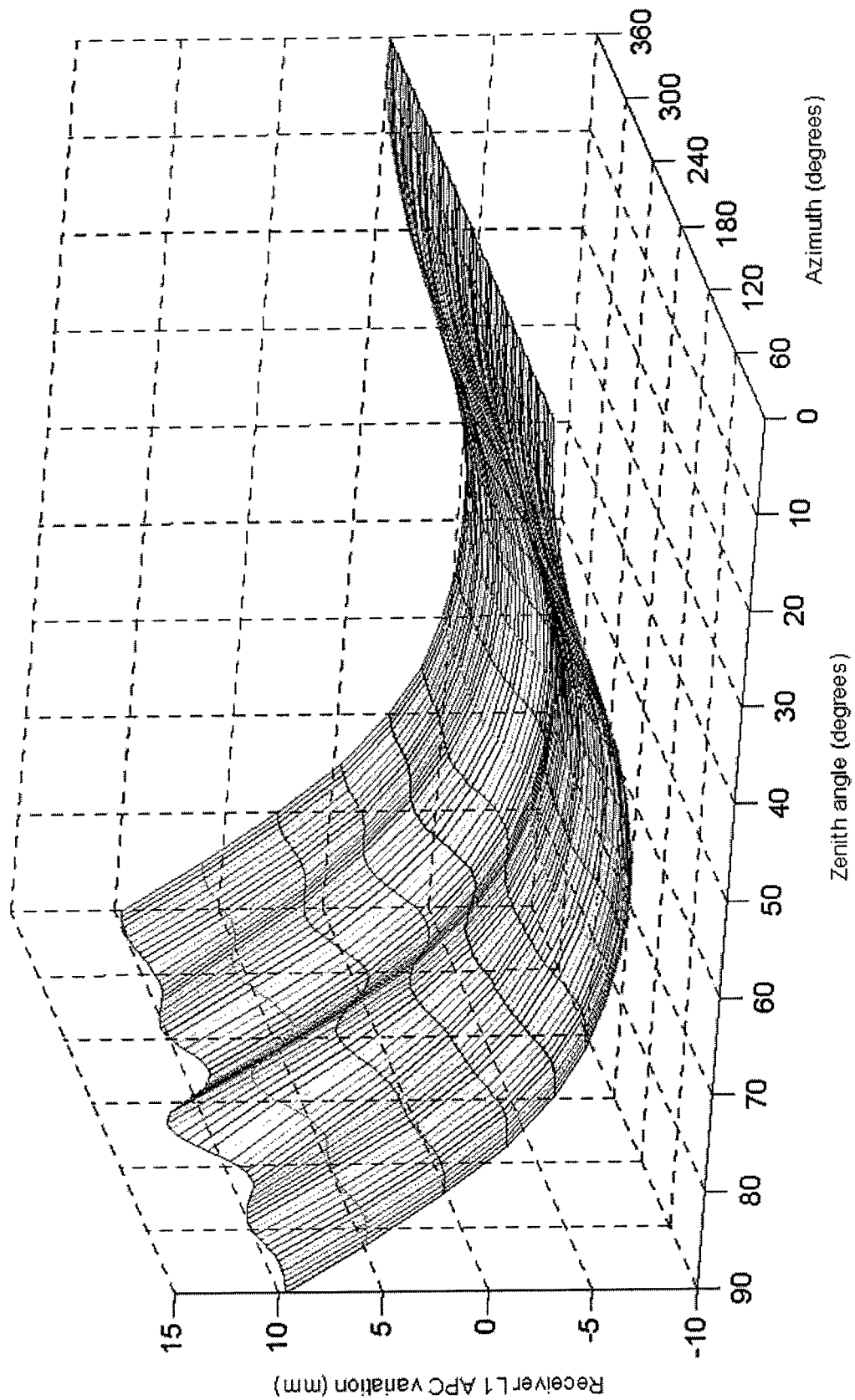
FIG. 4B shows the L1 frequency receiver antenna phase center variation for the receiver antenna of FIG. 4A.
Figure 4C:
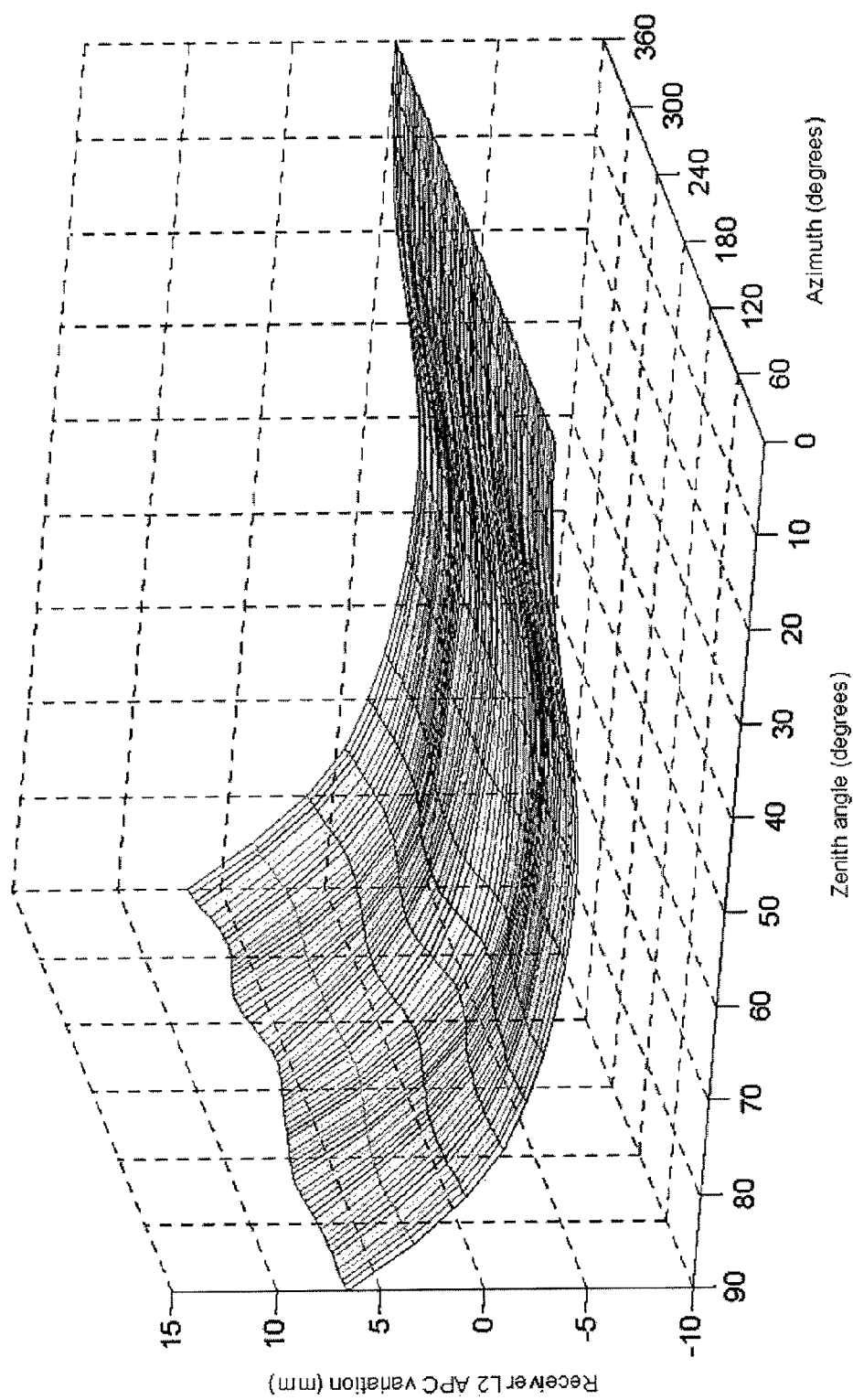
FIG. 4C shows the L2 frequency receiver antenna phase center variation for the receiver antenna of FIG. 4A.
Figure 4D:
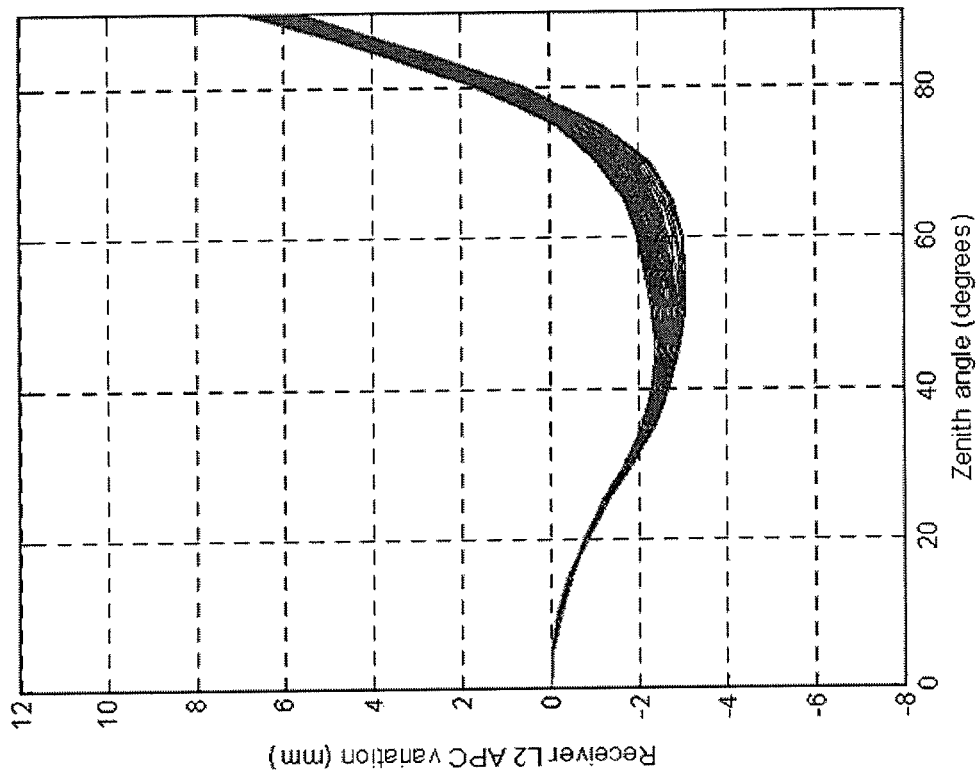
FIG. 4D shows the L1 and L2 antenna phase center variations for the antenna of FIG. 4A with respect to zenith angle.
Figure 4D:
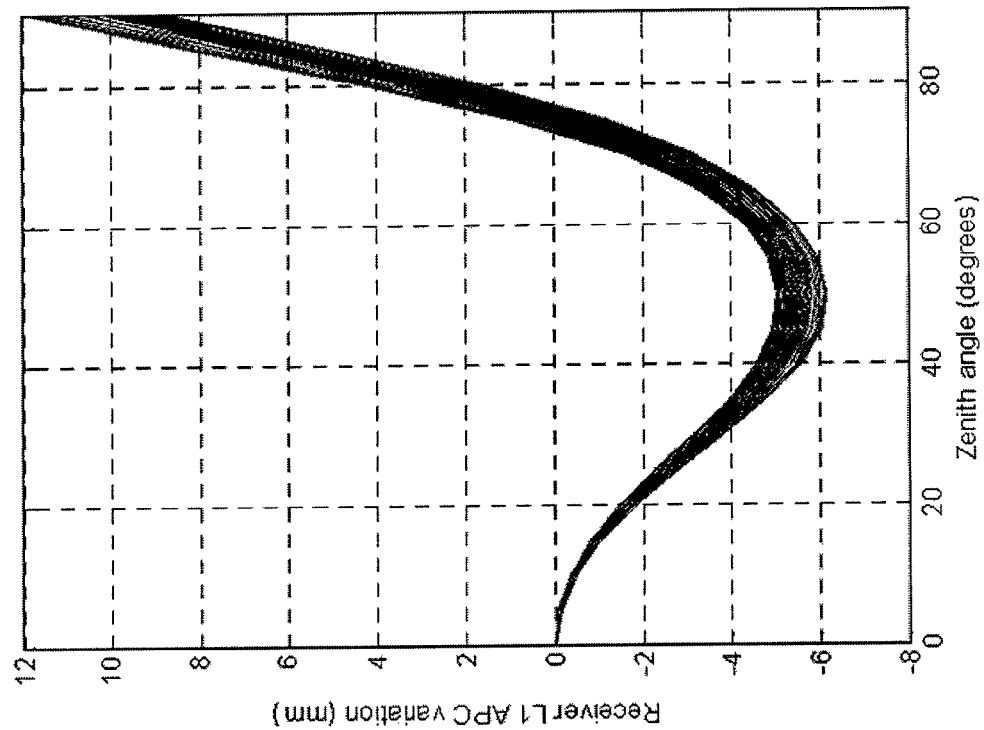

FIG. 4B shows the L1 frequency receiver antenna phase center variation for UNBJ's antenna, with respect to zenith angle and azimuth, in mm. FIG. 4C shows a similar plot for L2. These plots are also based on values obtained from IGS ANTEX file igs05_1421.atx. FIG. 4D also shows the L1 and L2 antenna phase center variations, but with respect to zenith angle only. As can be seen, the least variation is experienced at zenith direction, and maximum values of variation appear at lower elevation angles. Also, the variation is stronger for L1 than for L2 frequency for this antenna. Most importantly, the APC variation values are typically at sub-centimeter level for this antenna. This is also typically true for other antenna types (as can be seen from the ANTEX file).

1.4.3. Solid Earth Tide

Figure 4E:
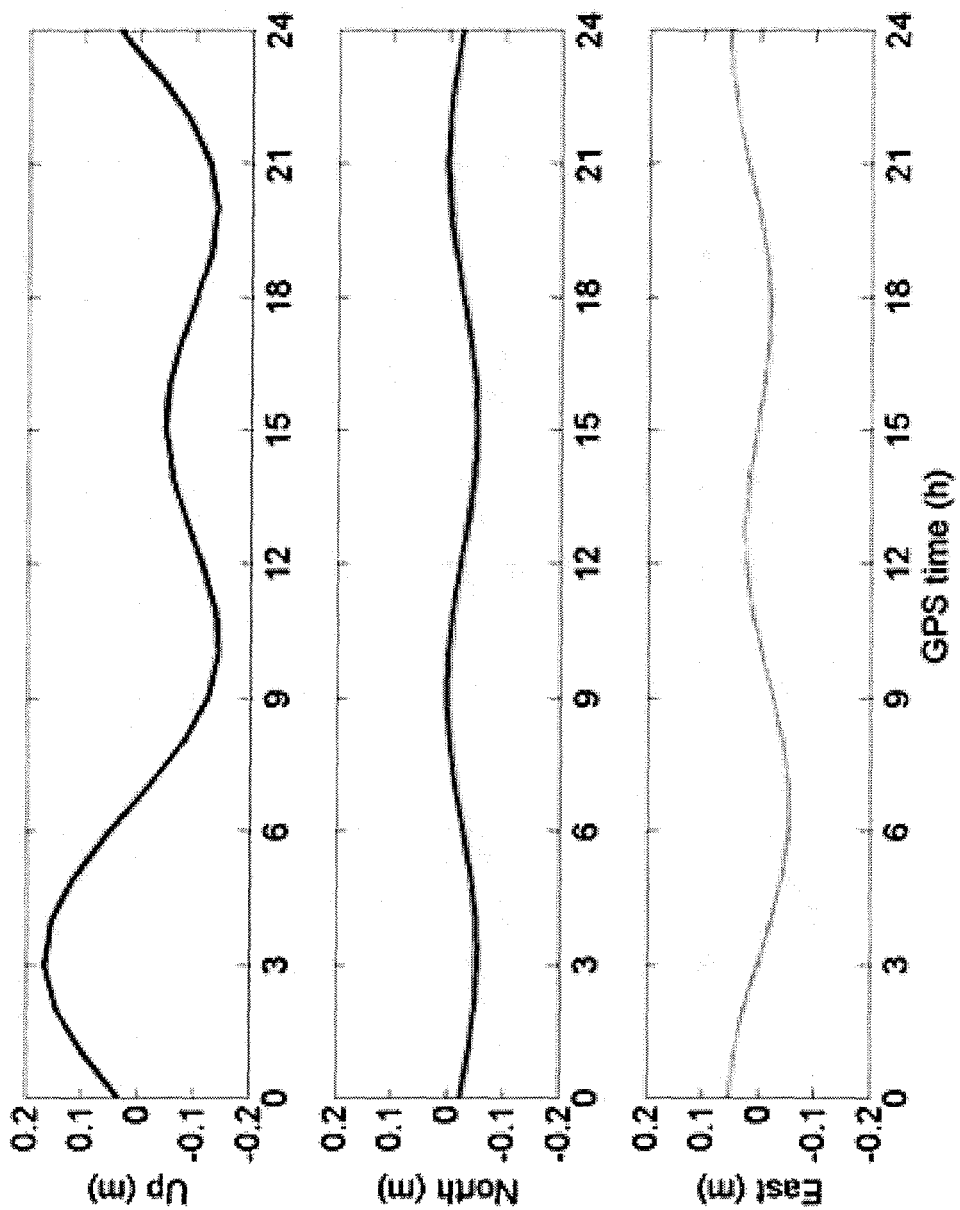
FIG. 4E shows the variation of station site displacement due to solid earth tide over one day for the receiver antenna of FIG. 4A.

To obtain coordinates accurate to cm level for a single receiver it is necessary to account for the site displacement due to the effects of solid earth tides. Since the earth is a body not totally rigid, its crust suffers the effect (i.e., deformation) of gravitational forces (mainly from sun and moon). These deformations, translated to displacements at individual points, can be modeled as being caused by tides of spherical harmonics [McCarthy and Petit, 2004]. The effect of solid earth tides can reach a few decimeters. Details on how these effects should be computed are found in the latest version of the IERS (International Earth Rotation and Reference Systems Service) conventions. For instance (as of March 2008) one could refer to McCarthy and Petit [2004]. FIG. 4E shows the variation of UNBJ station site displacement due to solid earth tide over one day (5 Mar. 2008).

1.4.4. Ocean Tide Loading

Similarly to the "solid" earth, ocean water masses also suffer the effect of gravitational forces, known as the ocean tides. Ocean tide loading (OTL) is the deformation of the earth due to the weight of the ocean tides. The water in the ocean tides moves back and forth and these mass redistributions cause periodic loading of the ocean bottom. Since the earth is not completely rigid, it deforms under this load. It can be observed at a station as variations in vertical and horizontal displacement, in gravity, tilt and in strain. Ocean tides are produced by the gravitational pull of the moon and sun and since their orbits have more than one periodicity due to eccentricity, evection and the lot, the ocean tides can be described as a sum of several ocean tides with each having their own period. The 11 periods, also called harmonics, with the largest amplitude are mostly used to compute the ocean tide loading [Ocean tide loading provider, 2008].

Procedures for computing ocean tide loading effects are found in McCarthy and Petit [2004]. The Ocean tide loading provider is an internet-based service which is maintained by Dr. Hans-Georg Scherneck at Onsala Space Observatory—Chalmers University of Technology, Sweden. This service is available at http://www.oso.chalmers.se/~loading/ and has been widely used by the GPS research community as means to obtain the necessary information to compute OTL displacements for particular stations, given by several models.

GPS packages such as GAMIT have implemented the code to compute the tidal constituents for a given site from a particular model (such as GOT00.2), as well as the displacements themselves [King, 2007].

1.4.5. Differential Code Biases

Also known as differential hardware delays, the differential biases can be applied in the observations to account for different delays experienced by the GPS signal depending on what frequency (combination) is used. Although carrier-phase measurements also suffer such kind of effect, it gets absorbed by the PPP float ambiguity parameter, as mentioned earlier. If one is attempting to fix ambiguities in PPP, the effect on phase should also be considered. Since the code measurements do not have an ambiguity parameter to be estimated, the biases for code observations are taken care of to reach ultimate accuracies.

1.4.6. Phase Wind-Up Effect

The observed carrier-phase measurement depends on the orientation of the antennas of both receiver and satellite, so account should be taken of the phase shift caused by this "mis-orientation." These phase shift values change over time as the satellite moves (and therefore changes its orientation with respect to the receiver). It also depends on the receiver antenna attitude, so, in order to fully account for that effect, the orientation of the receiver antenna must be known, which is sometimes not an easy task. A well-known description with details on how to account for that effect can be found in Wu et al. [1992]. The elements needed to account for the phase wind-up effect are the receiver coordinate system unit vectors, and the same for the satellite. A reasonable assumption for static positioning is that the receiver's orientation with respect to north direction does not change. This assumption becomes weaker for kinematic positioning, since it is not possible (or perhaps not even reasonable) to guarantee that orientation.

2. Improved Absolute Real-Time Kinematic Positioning

Absolute Real Time—Kinematic (ART-K) positioning is a technique in which absolute coordinates (referred to a global coordinate frame) are estimated for a moving GNSS receiver/antenna in real time. This is done by means of the use of very accurate satellite information, which is broadcast to the rover receiver via a communication channel such as internet, telephone, or satellite link. The estimation is typically done using a Kalman filter having a state vector with parameters for the receiver 3D coordinates, receiver clock, neutral atmosphere delay, and carrier-phase ambiguities. For each observation period, the state vector parameter estimates are updated and delivered to a positioning filter. A transition is carried out to account for the unmodeled variation of some of those parameters in the time interval between the updates.

This is particularly true for the receiver clock and for the receiver position parameters. Since it is difficult to predict the movement of the receiver between epoch updates, it is accounted for as a process noise in the Kalman filter transition, as:

$$C_{xyz}^{t1,0} = C_{xyz}^{t0} + C_{n(antenna\ movement)}, \quad (1)$$

where $C_{xyz}^{t1,0}$ is the position covariance matrix at time t1, right after the epoch update, $C_{xyz}^{t0}$ is the position covariance matrix at time t0, right before the epoch update, and $C_n$ is the process noise used for the receiver position. Since the receiver position can change several decimeters to meters in a period of seconds depending on the type of survey, it is hard to make a strong assumption about the noise amount which should be used in the filter transition. Because of that, relatively high values are typically used for the receiver coordinate process noise. This makes the convergence time of the solution much slower than if the receiver position were being estimated in static mode (stationary receiver).

Figure 5:
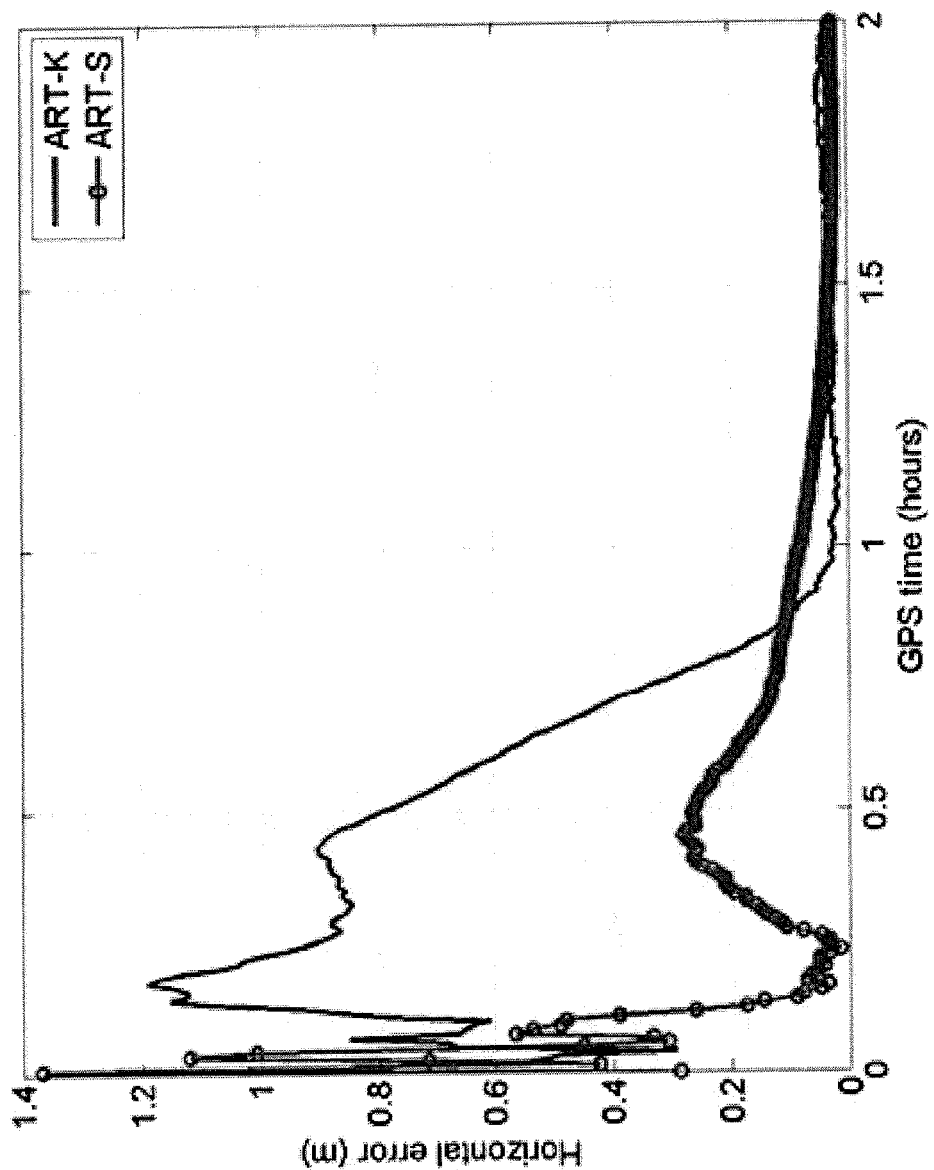
FIG. 5 shows a performance comparison between convergence in absolute real-time static (ART-S) and absolute real-time kinematic (ART-K) modes.

FIG. 5 shows a performance comparison between convergence in ART-Static (ART-S) and ART-K modes. Absolute kinematic RT positioning suffers the effect of longer convergence time when compared to static mode, due to the noise level which has to be input into the coordinate uncertainties given the lack of knowledge about the antenna behaviour between epoch updates.

One existing approach that can be used to minimize the amount of noise needed is using the station velocities in the transition step:

$$X_{xyz}^{t1,0} = X_{xyz}^{t0} + V_{xyz}^{t0} \cdot \Delta t, \quad (2)$$

where X represents the position state vector, and $V_{xyz}^{t0}$ the velocity vector at time t0. A weakness of this is that it cannot be guaranteed that $V_{xyz}^{t0}$ will be valid until the next update, and it is nearly impossible to do so with an uncertainty at the cm-level, since a dynamic behaviour for the rover antenna should be assumed.

Some embodiments of the invention use a Delta-Phase (DP) approach to aid the ART-K engine during the initialization time, in kinematic mode. The DP approach is based on differences in carrier phase between epochs and can provide quite accurate estimates of the receiver position change between two instants of time ($\partial X_{xyz}^{t0,t1}$). These estimates are then used in the ART-K engine transition, according to:

$$X_{xyz}^{t1,0} = X_{xyz}^{t0} + \partial X_{xyz}^{t0,t1}, \quad (3)$$

which allows the use of a much smaller noise level for the states transition, where:

$$C_{xyz}^{t1,0} = C_{xyz}^{t0} + C_{n(delta-phase)}. \quad (4)$$

The big difference between (4) and (1) is that while in (1) the noise level is used to account for the unknown antenna movement which can be at the meter level, in (4) this movement is already being accurately tracked with DP in the transition model. Therefore the noise matrix is only used to account for the DP uncertainty. Introducing DP information into the ART-K filter is a strong constraint, because epoch updates are strongly tied together.

Figure 6B:
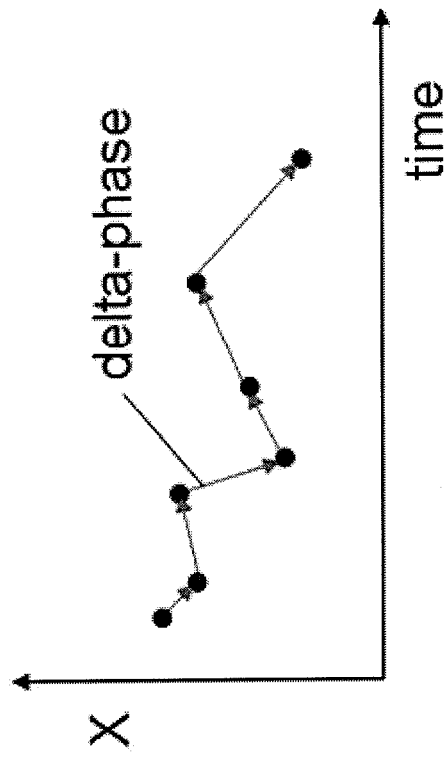
FIG. 6B shows an ART-K approach in accordance with embodiments of the invention using a delta-phase approach to tie the successive position updates together.
Figure 6A:
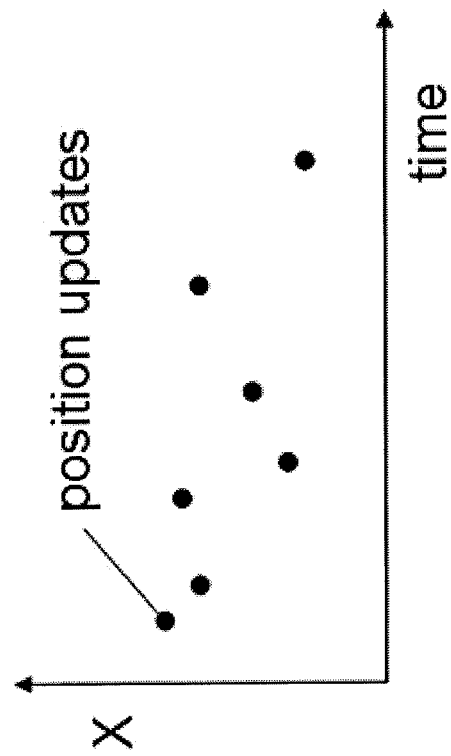
FIG. 6A shows the prior-art ART-K approach of independent position updates with each epoch.

FIG. 6A shows the conventional ART-K approach of independent position updates with each epoch, while FIG. 6B shows the ART-K approach using Delta Phase to tie the successive position updates together. As shown in FIG. 6A, the ART-K engine alone (without DP), estimates loose point positions over time. This is true because at the beginning of the positioning (which for ART engine might take several minutes) the phase ambiguities haven't yet converged thus are allowed to change over time, and the solution is strongly dependent on pseudorange measurements.

As shown in FIG. 6B, ART-K processing using the DP approach does not allow the carrier-phase ambiguities to change over time (in fact they are eliminated in the differencing process) and the accurate vectors linking epoch updates force the filter to estimate the optimal absolute position for the whole time series, rather than one optimal loose absolute position per epoch.

Figure 7A:
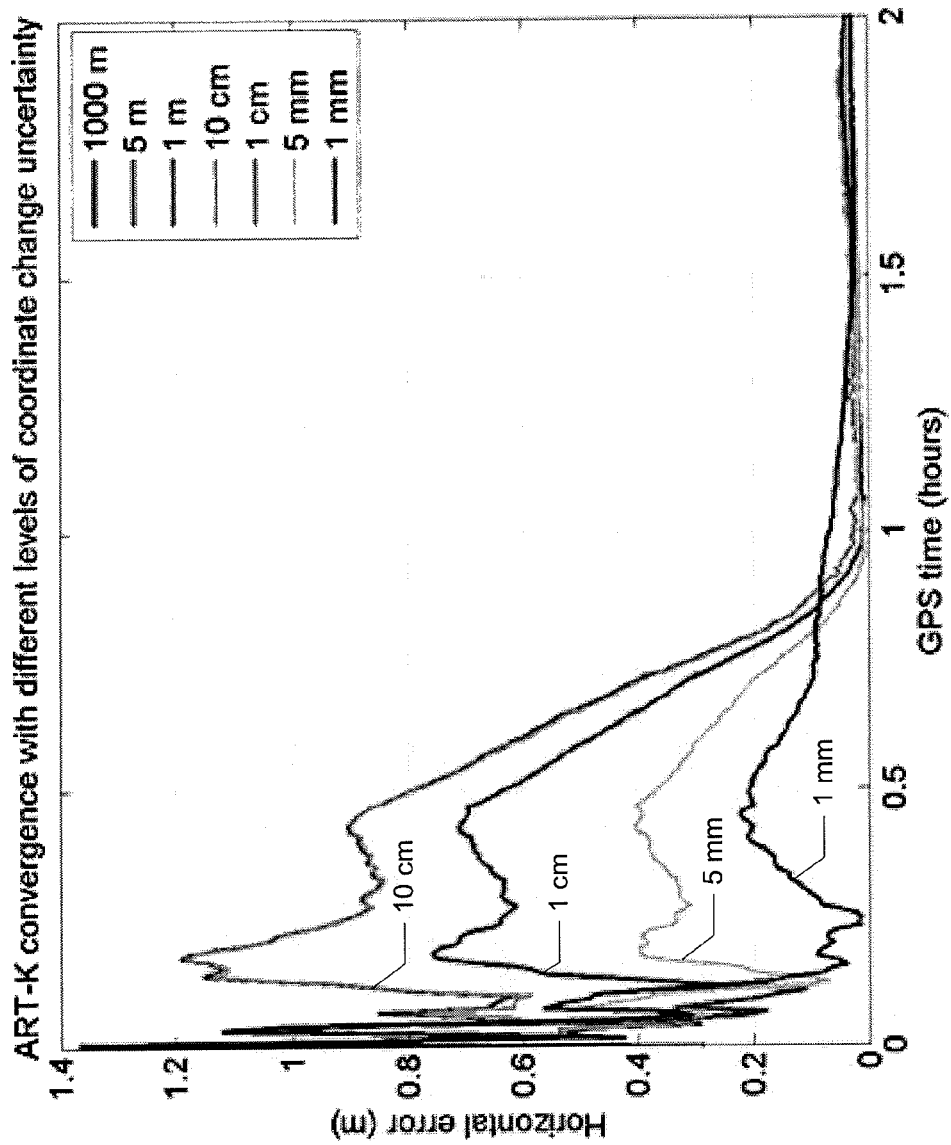
FIG. 7A shows the effect on horizontal position error convergence of transition noise level in an ART-K filter approach in accordance with embodiments of the invention.

FIG. 7A shows the effect on horizontal position error convergence of transition noise level in an ART-K filter. The noise level starts to cause differences only for transition noise values below 0.01 m²/sec (1-sigma). With DP it is possible to use values at the sub-cm level (in m/$\sqrt{\text{sec}}$), since the DP estimates are used only for inter-epoch transitions, which will usually be of a few seconds. Also, for this time difference range, the impact of non-perfect coordinates (which we expect to be at sub-meter level) used on the reference epoch for DP will have very little impact on the accuracy of the vector estimates.

Figure 7B:
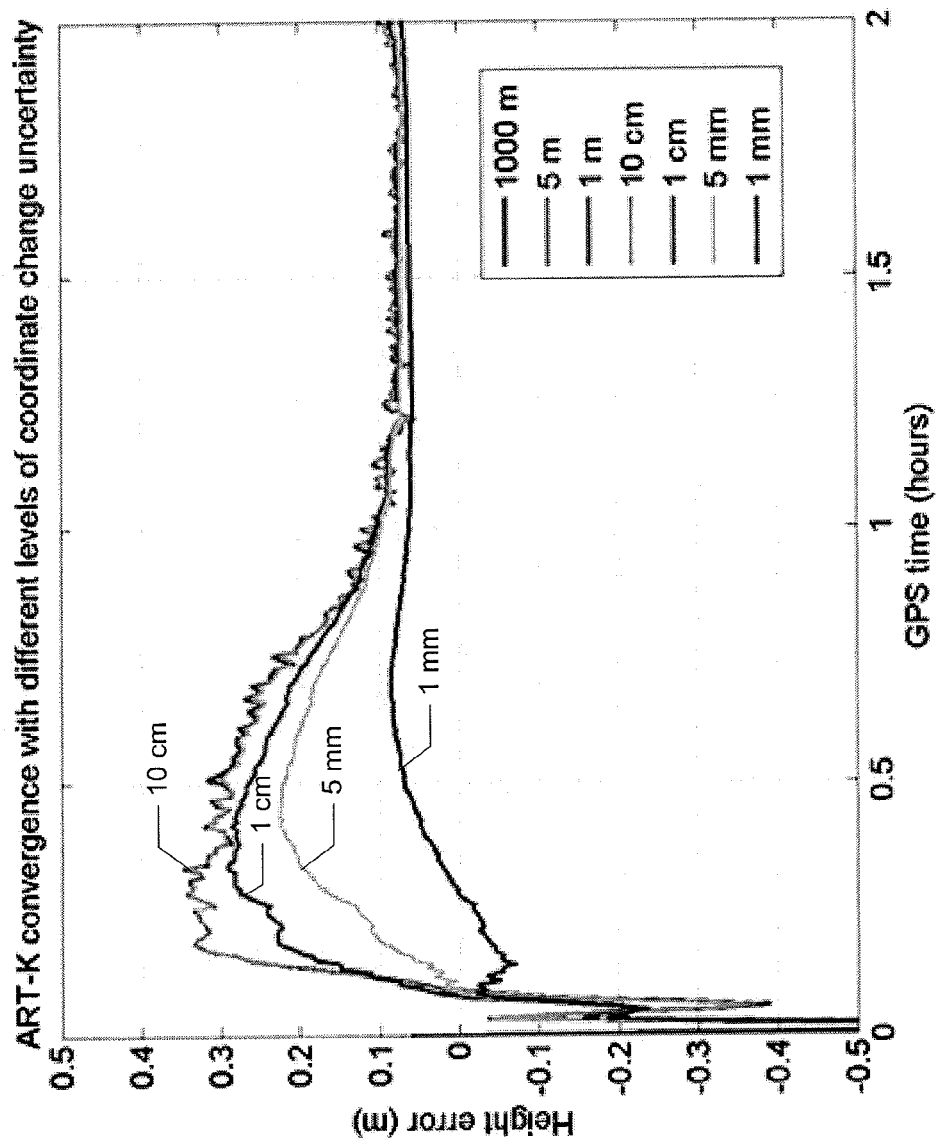
FIG. 7B shows the effect on vertical (height) position error convergence of transition noise level in an ART-K filter approach in accordance with embodiments of the invention.

FIG. 7B shows the effect on vertical (height) position error convergence of transition noise level in an ART-K filter. As seen in FIG. 7B, the time series is also smoother for lower process noise levels.

Figure 7C:
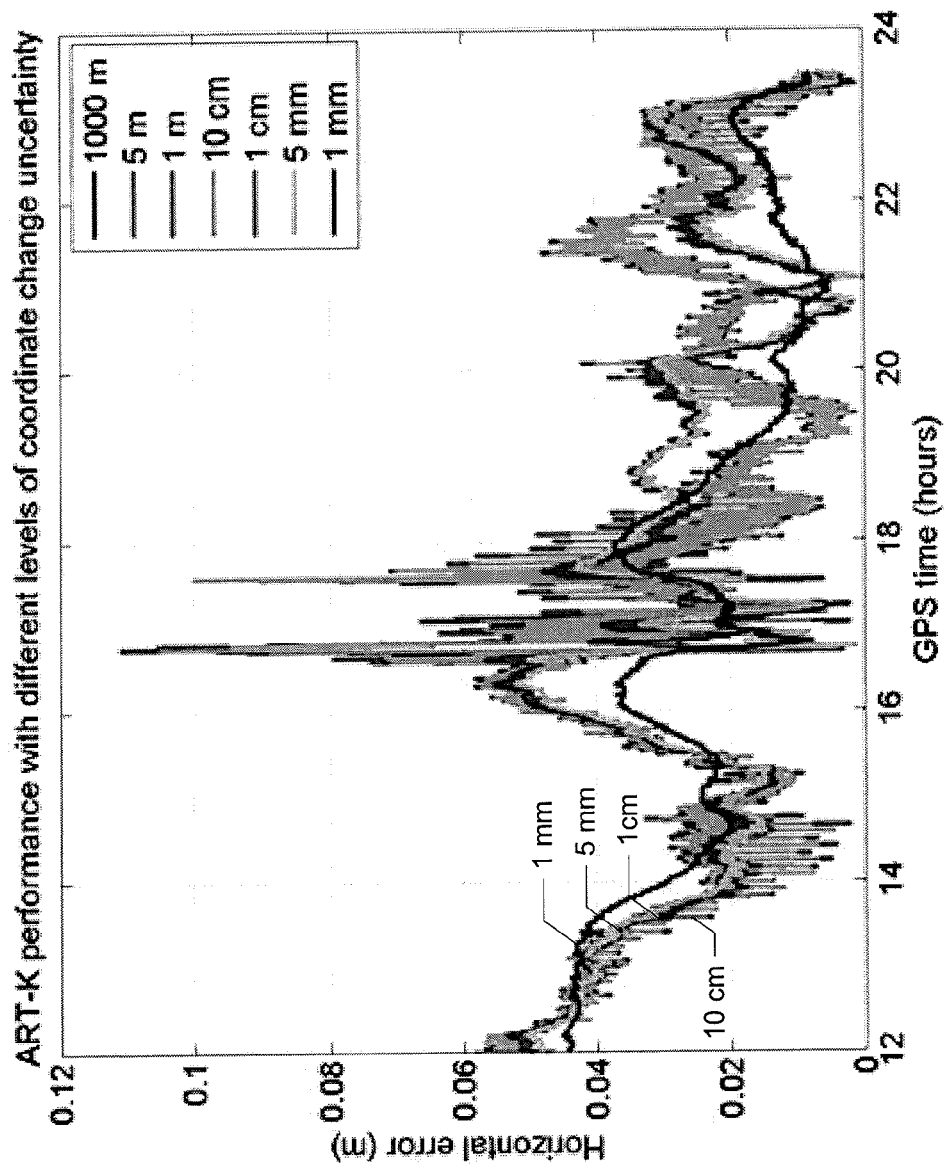
FIG. 7C shows the effect on horizontal position error convergence of transition noise level in an ART-K filter, over time periods when the solution has already converged approach in accordance with embodiments of the invention.

FIG. 7C shows the effect on horizontal position error convergence of transition noise level in an ART-K filter, over time periods when the solution has already converged. FIG. 7C also shows that the time series is smoother for lower process noise levels.

As can be seen, using Delta-Phase to aid an ART-K engine improves the solution convergence time. This may become even more important if it is desired to fix (or partially fix) ambiguities in a timely manner in an ART engine. Since the convergence time becomes smaller with more satellite and signals, this approach may enable a few-cm-level absolute accuracy in kinematic mode. Another benefit is the improved smoothness of the rover position in kinematic mode.

FIG. 8A illustrates a prior-art delta-phase technique used in real-time kinematic (differential) processing. During some epochs the process has observation data available from a rover receiver and from a reference receiver. For these epochs (such as epoch i) a synchronous RTK position can be determined. For epochs where reference station observation data is not available (such as epoch j), the delta-phase technique is used to determine a change in rover position from a prior epoch where a synchronous epoch was determined (such as epoch i). For example, synchronous positions $X_1$-$X_6$ are determined for respective epochs at times 1-6. A delta position is determined for epoch 7 vs. epoch 6, for epoch 8 vs. epoch 7 and for epoch 9 vs. epoch 8. A position for epoch 9 can be determined by combining the synchronized position determined for epoch 6 with the delta positions $d_{6-7}$, $d_{7-8}$ and $d_{8-9}$. The position deltas are determined as follows:

$$\Phi_1 = \rho_1 + c(dt_1 - dT_1) + \text{Trop}_1 - \text{Iono}_1 + \lambda N$$

$$\Phi_2 = \rho_2 + c(dt_2 - dT_2) + \text{Trop}_2 - \text{Iono}_2 + \lambda N$$

$$\Phi_2 - \Phi_1 = \rho_2 - \rho_1 + c(\delta dt - \delta dT) + \delta\text{Trop} - \delta\text{Iono}$$

Figure 8B:
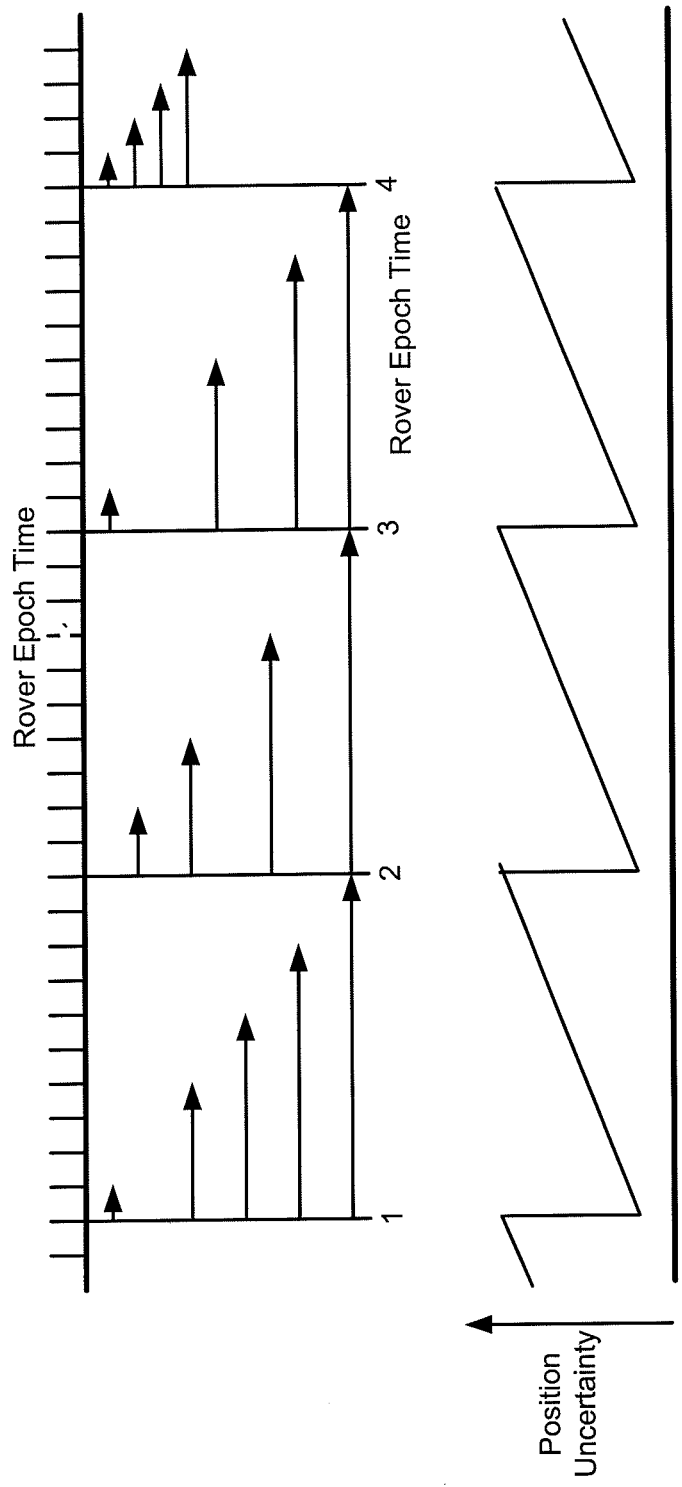
FIG. 8B illustrates a principle of operation of a prior-art real-time kinematic delta-position processing technique.

Where:
$$\rho_1 = \sqrt{(x_1{}^s - X_{r1})^2 + (y_1 - y_{r1})^2 + (z_1{}^s - z_{r1})^2}$$
$$\rho_2 = \sqrt{(x_2{}^s - x_{r2})^2 + (y_2{}^s - y_{r2})^2 + (z_2{}^s - z_{r2})^2}$$
$x_{r2} = x_{r1} + \Delta x$,
$y_{r2} = y_{r1} + \Delta y$,
$z_{r2} = z_{r1} + \Delta z$, FIG. 8B shows the effect on position uncertainty over time of the technique of FIG. 8A. Synchronous fixes at epoch times 1, 2, 3 and 4 provide minimum uncertainty due to the availability of reference station data. The delta-phase technique allows rover position updates between synchronous epochs, though with uncertainty increasing with time since the last synchronous epoch.

Figure 8C:
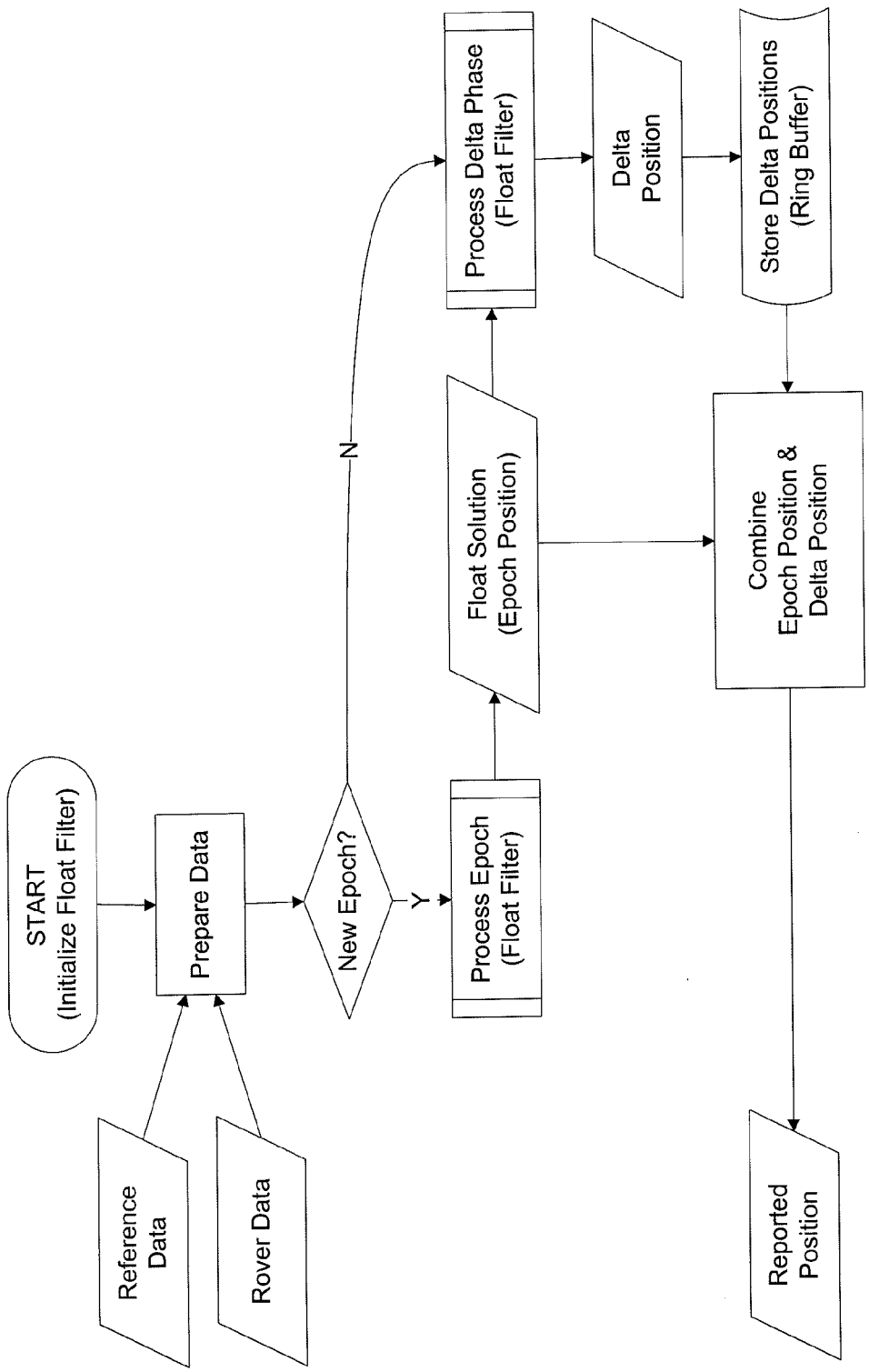
FIG. 8C schematically illustrates a prior-art real-time kinematic delta-position processing technique.

FIG. 8C schematically shows a prior-art delta-phase technique used in real-time kinematic (differential) processing. Reference data and rover data are prepared. If a new epoch of synchronous data is available, it is supplied to a float filter which processes the epoch of data to estimate a float solution which includes a receiver antenna position. If a new epoch of synchronous data (reference data matching the time at which the rover observations were taken) is not available, the delta phase process determines a delta position (change of estimated receiver antenna position) from the current rover data. The delta positions are stored and combined with the last synchronous-epoch position estimate to give a reported position estimate.

Figure 10:
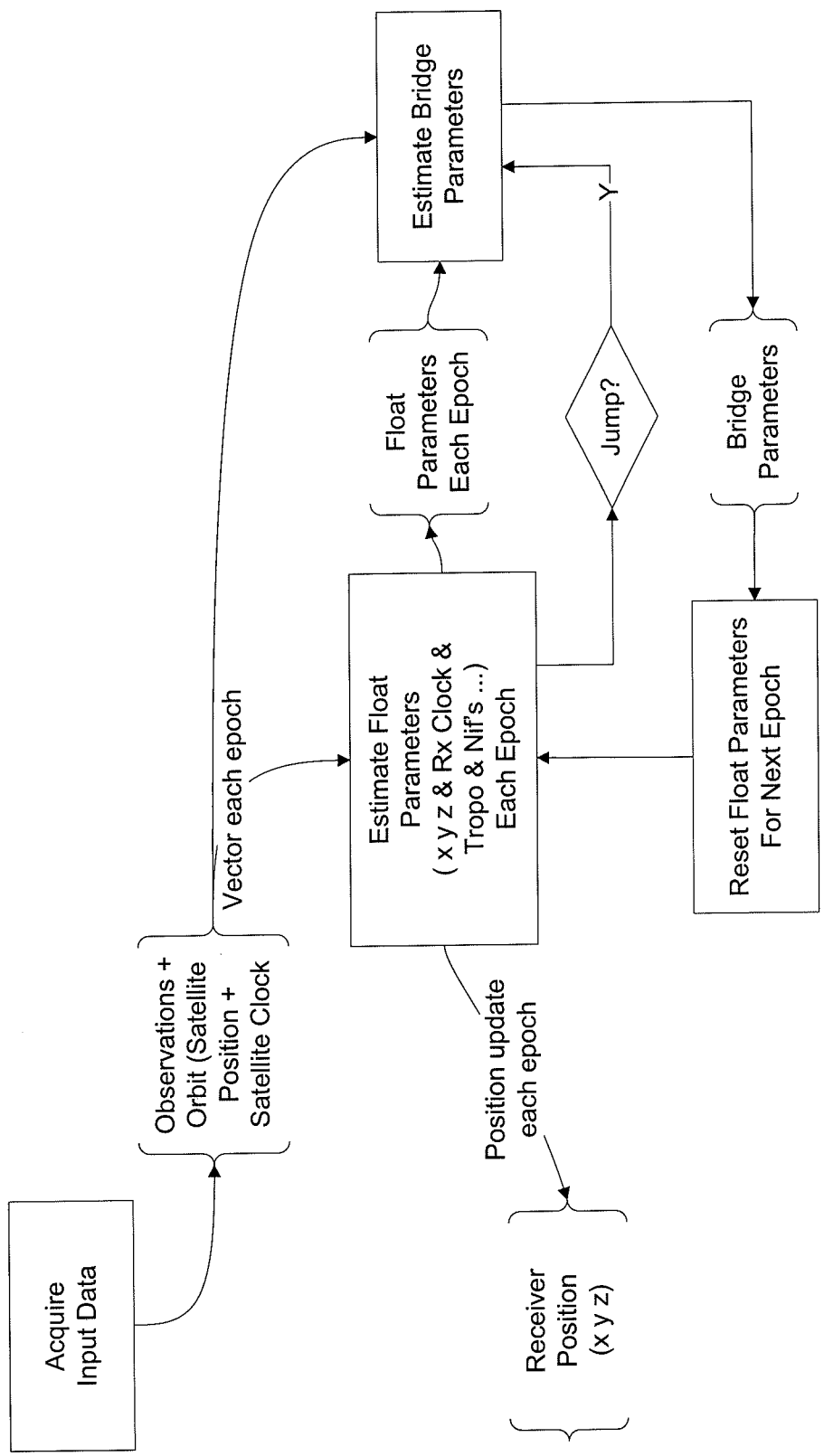
FIG. 10 schematically illustrates an ART-K technique for bridging outages in accordance with embodiments of the invention.

FIG. 10 schematically illustrates an ART-K technique for bridging outages in accordance with embodiments of the invention. Input data is acquired at step 1010 comprising GNSS observation data, satellite position data and satellite clock data. A vector of data is supplied at each epoch to a recursive filter (such as a least-squares filter or Kalman filter) which provides updated float estimates for a vector of states including receiver position (e.g., in an x, y, z coordinate system), receiver clock, troposphere, and ionospheric-free ambiguities (ambiguities of ionospheric-free combinations of the raw observations). The float estimates are compared each epoch with the prior epoch to detect a jump in one or more of the ambiguities. If a jump is detected, bridge parameters are obtained to reset the float parameters for the next epoch.

The bridge parameters are prepared from the vector of data and the float estimates of an epoch.

Figure 11:
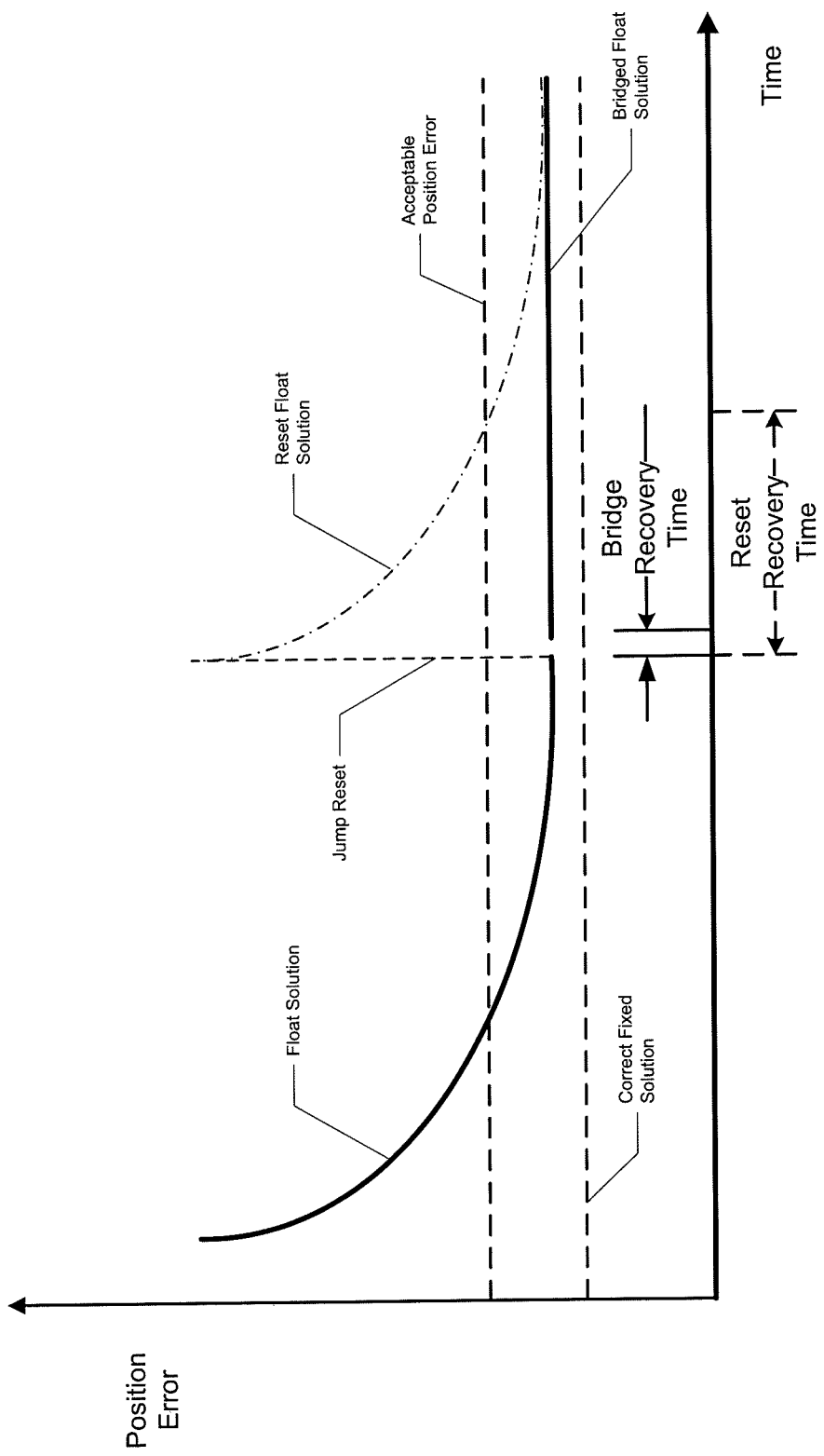
FIG. 11 schematically illustrates the effect of an ambiguity jump in an ART-K technique for bridging outages in accordance with embodiments of the invention.

FIG. 11 schematically illustrates the effect of an ambiguity jump in an ART-K technique for bridging outages in accordance with embodiments of the invention. When a jump is detected, the bridge parameters are used to reset the float solution estimates so that reconvergence of the float solution is not needed. Rather than incurring the penalty of a float solution reset and reconvergence as in the prior art, embodiments in accordance with the invention provide bridge parameters which avoid the need for and delay of reconvergence.

Figure 12:
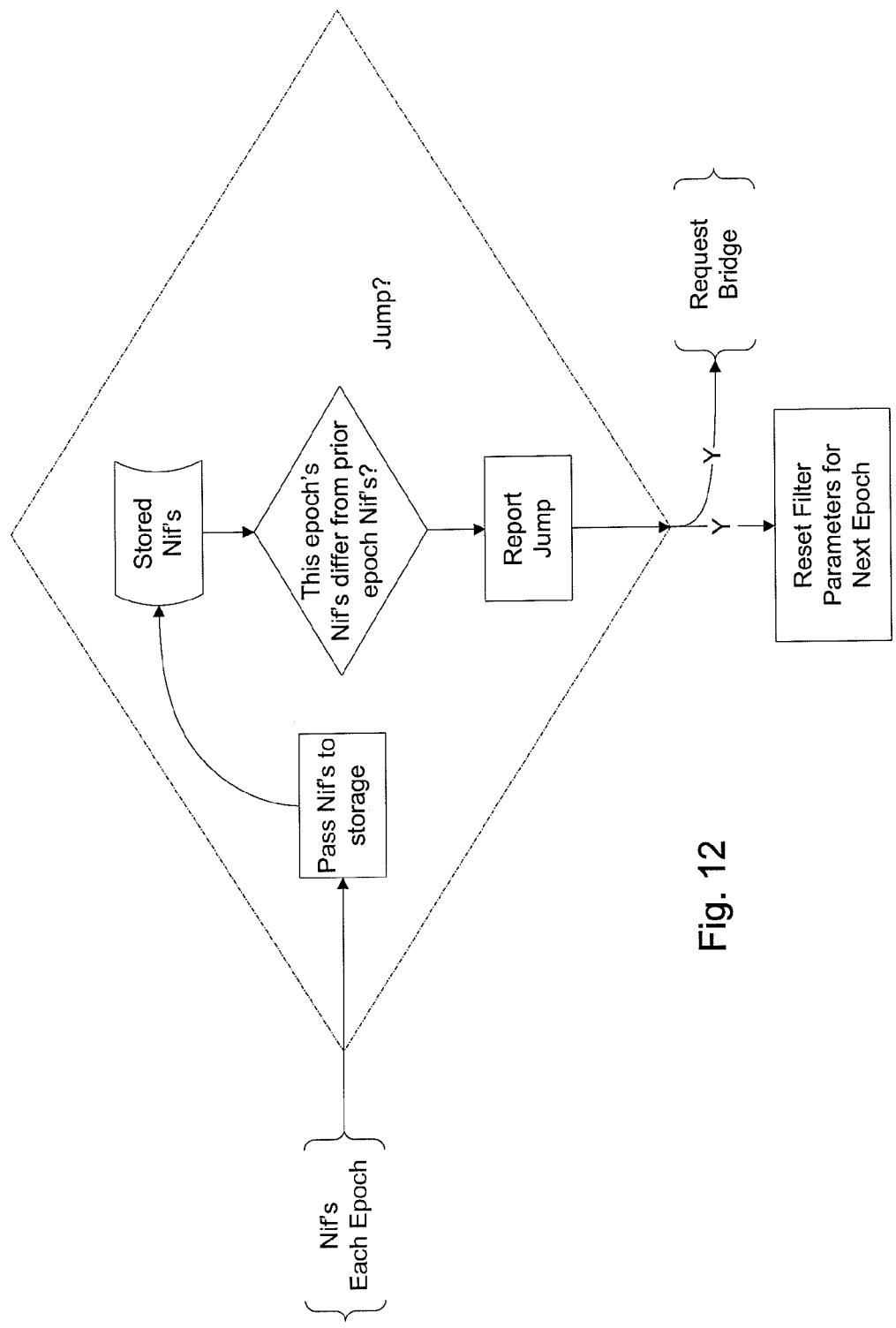
FIG. 12 schematically illustrates the operation of a jump detector in accordance with embodiments of the invention.

FIG. 12 schematically illustrates the operation of a jump detector in accordance with embodiments of the invention. The iono-free ambiguity estimates $N_{if}$ of the float solution are passed to storage each epoch. At each epoch, the current epoch's iono-free ambiguity estimates are compared with those of a prior epoch. If a difference is detected, a jump is reported and a request for bridge parameters is issued. The bridge parameters are used to reset the float filter paremters for the next epoch.

Figure 13A:
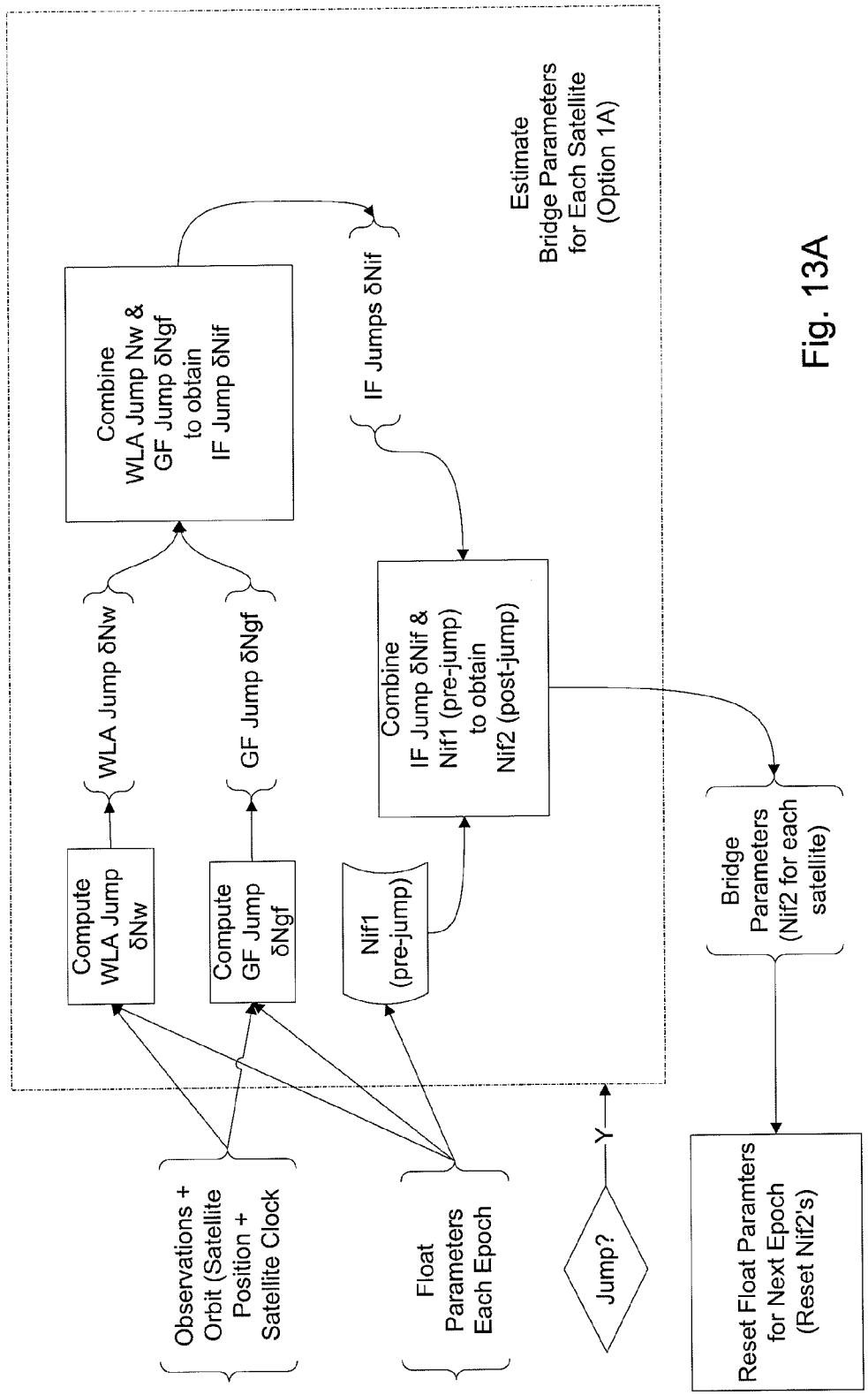
FIG. 13A schematically illustrates the operation of a first ART-K bridge estimator in accordance with embodiments of the invention.

FIG. 13A schematically illustrates the operation of a first ART-K bridge estimator in accordance with embodiments of the invention. The GNSS observation data, satellite position data and satellite clock data are used to compute a widelane ambiguity jump $\delta N_w$ and to compute a geometry-free jump $\delta N_{gf}$ for each satellite. The widelane ambiguity jump $\delta N_w$ and the geometry-free jump $\delta N_{gf}$ are combined to obtain an iono-free jump $\delta N_{if}$ for each satellite. The iono-free-jump $\delta N_{if}$ for each satellite is combined with the iono-free ambiguity estimate $N_{if1}$ of a pre jump epoch to obtain an updated iono-free ambiguity estimate $N_{if2}$ for the post-jump epoch. Bridge parameters in this example are the updated iono-free ambiguity estimates $N_{if2}$ which are used to reset the float parameters of the recursive filter for the next epoch.

Figure 13B:
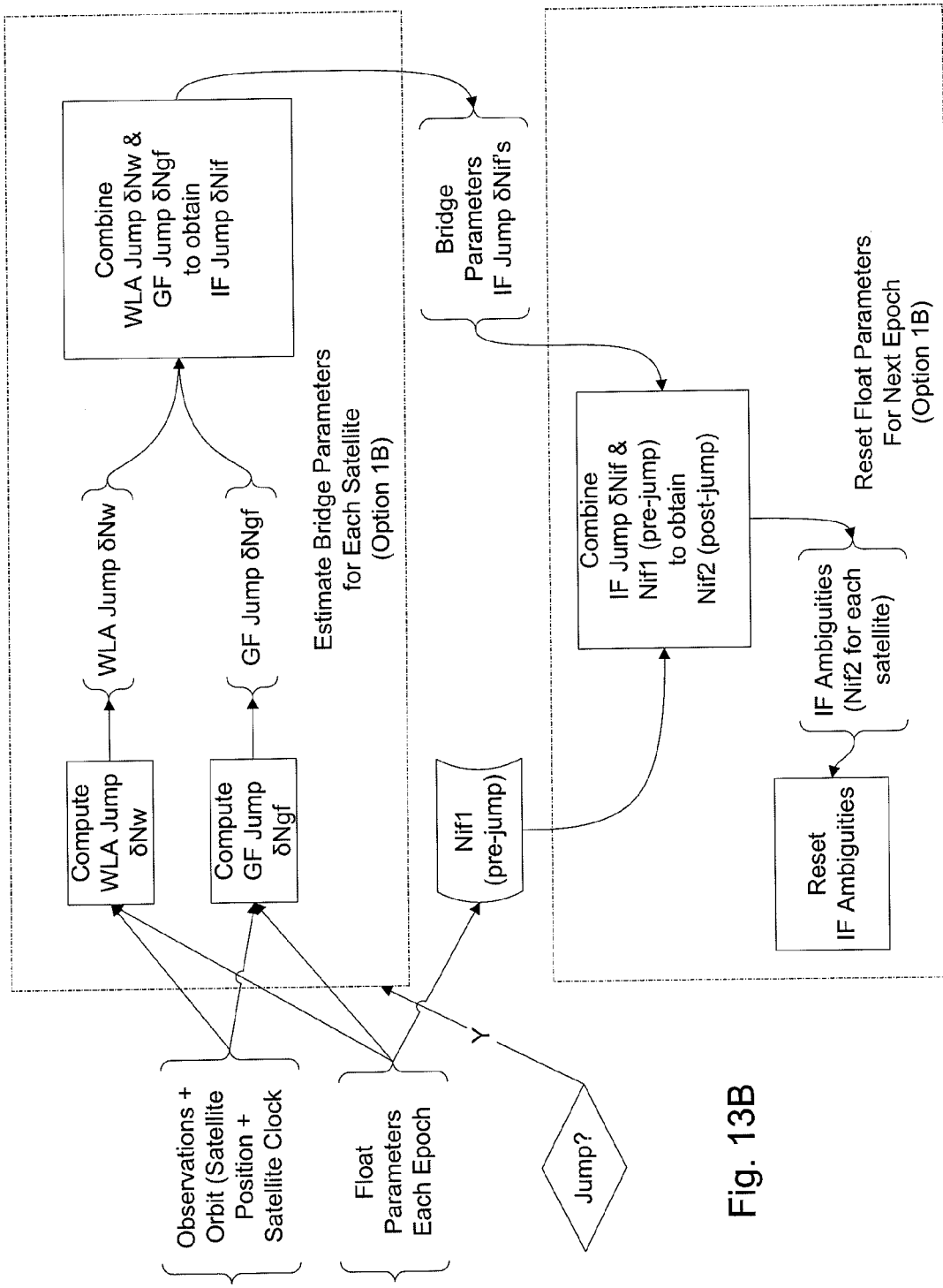
FIG. 13B schematically illustrates the operation of a second ART-K bridge estimator in accordance with embodiments of the invention.

FIG. 13B schematically illustrates the operation of a second ART-K bridge estimator in accordance with embodiments of the invention. The GNSS observation data, satellite position data and satellite clock data are used to compute a widelane ambiguity jump $\delta N_w$ and to compute a geometry-free jump $\delta N_{gf}$ for each satellite. The widelane ambiguity jump $\delta N_w$ and the geometry-free jump $\delta N_{gf}$ are combined to obtain an iono-free jump $\delta N_{if}$ for each satellite. In this example, the float parameters are reset by combining the iono-free-jump $\delta N_{if}$ for each satellite with the float filter's iono-free ambiguity estimate $N_{if1}$ of a pre jump epoch to obtain an updated iono-free ambiguity estimate $N_{if2}$ for the post-jump epoch. Bridge parameters in this example are the iono-free jumps $\delta N_{if}$.

FIG. 14A schematically illustrates the operation of a third ART-K bridge estimator in accordance with embodiments of the invention. The GNSS observation data, satellite position data and satellite clock data are used to compute a widelane ambiguity jump $\delta N_w$ for each satellite. The widelane ambiguity jump $\delta N_w$ is used to compute a receiver antenna position jump $\delta x$, $\delta y$, $\delta z$ and receiver clock jump $\delta t$. The receiver antenna position jump $\delta x$, $\delta y$, $\delta z$ and receiver clock jump $\delta t$ are combined with the pre-jump receiver position and clock (RPC) x1, y1, z1, t1 to obtain an updated receiver position and clock (RPC) x2, y2, z2, t2. The updated receiver position and clock (RPC) x2, y2, z2, t2 are used as bridge parameters to reset the float parameters of the recursive filter for the post-jump epoch.

Figure 14B:
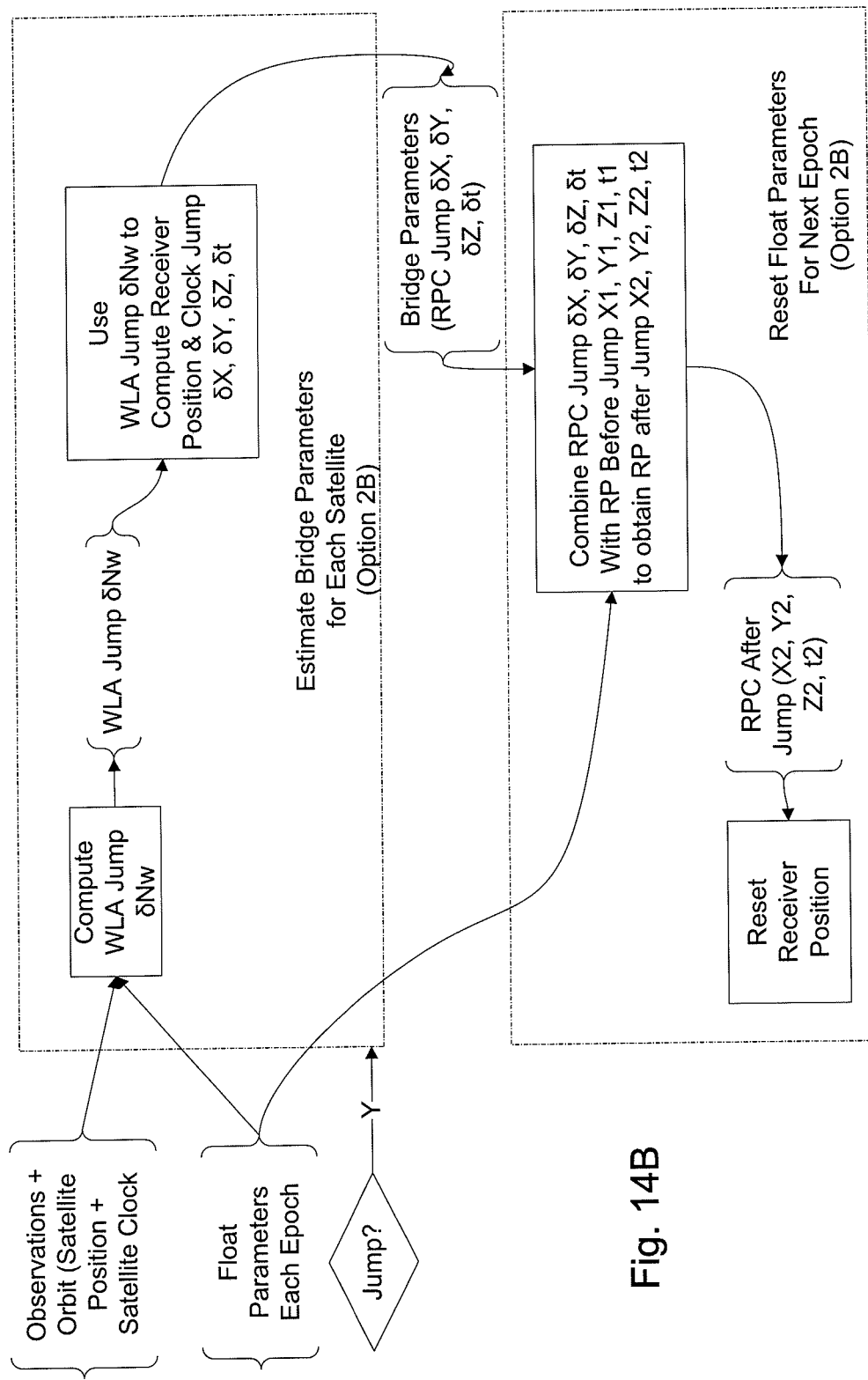
FIG. 14B schematically illustrates the operation of a fourth ART-K bridge estimator in accordance with embodiments of the invention.

FIG. 14B schematically illustrates the operation of a fourth ART-K bridge estimator in accordance with embodiments of the invention. The GNSS observation data, satellite position data and satellite clock data are used to compute a widelane ambiguity jump $\delta N_w$ for each satellite. The widelane ambiguity jump $\delta N_w$ is used to compute a receiver antenna position jump $\delta x$, $\delta y$, $\delta z$ and receiver clock jump $\delta t$. In this example, the float parameters are reset by combining the receiver antenna position jump $\delta x$, $\delta y$, $\delta z$ and receiver clock jump $\delta t$ with the pre jump receiver position and clock (RPC) x1, y1, z1, t1 to obtain an updated receiver position and clock (RPC) x2, y2, z2, t2. Bridge parameters in this example are the receiver antenna position jump $\delta x$, $\delta y$, $\delta z$ and receiver clock jump $\delta t$.

Figure 15:
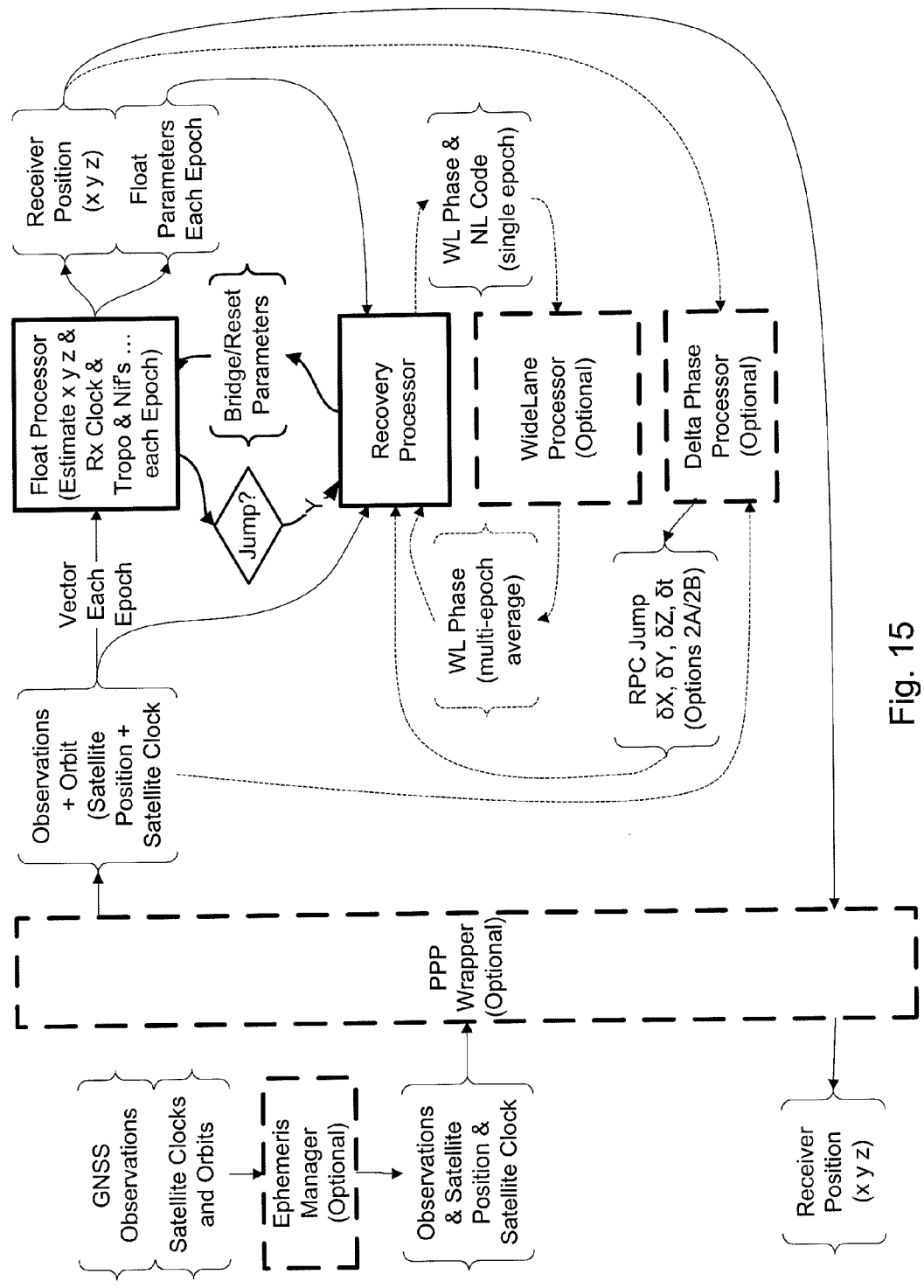
FIG. 15 schematically illustrates the architecture of an ART-K apparatus in accordance with embodiments of the invention.

FIG. 15 schematically illustrates the architecture of an ART-K apparatus in accordance with embodiments of the invention. GNSS observations and satellite clocks and orbits are optionally provided to an ephemeris manager. The optional ephemeris manager prepares a data set for each epoch having GNSS observations matched with satellite position data and satellite clock data. An optional precise-point positioning wrapper coordinates the flow of the data set for each epoch to a float processor. The float processor is a recursive filter (such as a least-squares filter or Kalman filter or other suitable filter) which updates the estimates of a state vector each epoch, the vector having states for receiver position (e.g., x, y, z), receiver clock (e.g., t), and iono-free ambiguities ($N_{if}$). The receiver position states are provided as an output to a user, e.g., via the optional precise-point-positioning wrapper. A jump detector compares the iono-free ambiguities ($N_{if}$) of an epoch with those of a prior epoch; if a difference (jump) is detected in at least one of the iono-free ambiguities ($N_{if}$) from one epoch to another epoch, the jump detector sends a request for bridge parameters to a recovery processor. The recovery processor used the data set and the estimated float parameters to generate the requested bridge parameters. In some embodiments, the recovery processor determines a widelane ambiguity per satellite. In some embodiments, the recovery processor determines a widelane (WL) phase ambiguity and a narrowlane (NL) code ambiguity per satellite, provides these to an optional widelane processor which uses them to determine a multi-epoch average widelane ambiguity per satellite, and receives from the widelane processor the multi-epoch average widelane ambiguities. In some embodiments, an optional delta phase processor determines from the float parameters a receiver antenna position and clock (RPC) jump $\delta x$, $\delta y$, $\delta z$, $\delta t$.

Figure 16:
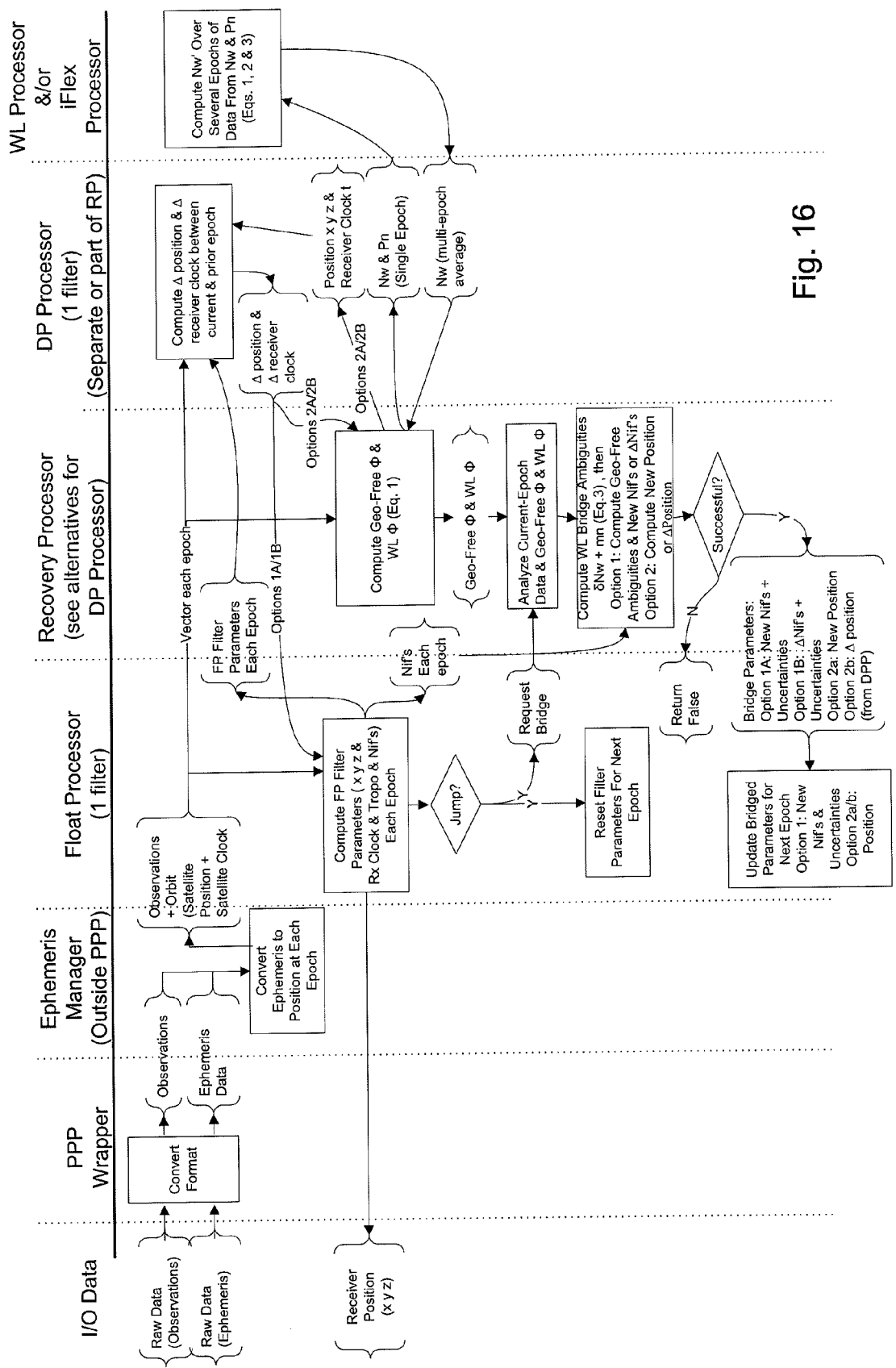
FIG. 16 schematically illustrates the operation of an ART-K apparatus in accordance with embodiments of the invention.

FIG. 16 schematically illustrates the operation of an ART-K apparatus in accordance with embodiments of the invention.

3. Combination of Aspects and Embodiments, and Further Considerations Applicable to the Above Any plurality of the above described aspects of the invention may be combined to form further aspects and embodiments, with the aim of providing additional benefits notably in terms of convergence speed, recovery from jumps and/or system usability.

Any of the above-described apparatuses and their embodiments may be integrated into a rover, a reference receiver or a network station, and/or the processing methods described can be carried out in a processor which is separate from and even remote from the receivers used to collect the observations (e.g., observation data collected by one or more receivers can be retrieved from storage for post-processing, or observations from multiple network reference stations can be transferred to a network processor for near-real-time processing to generate a correction data stream and/or virtual-reference-station messages which can be transmitted to one or more rovers). Therefore, the invention also relates to a rover, a reference receiver or a network station including any one of the above apparatuses.

In one embodiment, the receiver of the apparatus of any one of the above-described embodiments is separate from the filter and the processing element. Post-processing and network processing of the observations may notably be performed. That is, the constituent elements of the apparatus for processing of observations does not itself require a receiver. The receiver may be separate from and even owned/operated by a different entity than the entity which is performing the processing. For post-processing, the observations may be retrieved from a set of data which was previously collected and stored, and processed with reference-station data which was previously collected and stored; the processing is conducted for example in an office computer long after the data collection and is thus not real-time. For network processing, multiple reference-station receivers collect observations of the signals from multiple satellites, and this data is supplied to a network processor which may for example generate a correction data stream or which may for example generate a "virtual reference station" correction which is supplied to a rover so that the rover can perform differential processing. The data provided to the rover may be ambiguities determined in the network processor, which the rover may use to speed its position solution, or may be in the form of corrections which the rover applies to improve its position solution. The network is typically operated as a service to rover operators, while the network operator is typically a different entity than the rover operator. This applies to each of the above-described apparatuses and claims.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "falter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims. The following is a summary of some of the inventive concepts described herein.

(Accelerated Convergence)
1. 1. A method of determining position of a GNSS receiver antenna, comprising:
  a. acquiring input data for each of a plurality of epochs, the input data comprising observations at a GNSS receiver antenna of GNSS satellites, and clock and position information for each of the satellites, b. estimating float parameters of a state vector from the input data of each epoch, the float parameters comprising receiver antenna position, receiver clock, and at least one ambiguity per satellite,
c. estimating a change in position of the receiver antenna from one epoch to another epoch, and
d. updating the estimated receiver antenna position with the estimated change in position of the receiver antenna.

2. The method of 1, wherein estimating the float parameters comprises applying the input data to a recursive filter having a state transition noise matrix which accounts for uncertainty of the estimated change in position.

3. Apparatus for determining position of a GNSS receiver antenna, comprising:
   a. an element adapted to acquire input data for each of a plurality of epochs, the input data comprising observations at a GNSS receiver antenna of GNSS satellites, and clock and position information for each of the satellites,
   b. a recursive filter adapted to estimate float parameters of a state vector from the input data of each epoch, the float parameters comprising receiver antenna position, receiver clock, and at least one ambiguity per satellite,
   c. a delta-position element adapted to estimate a change in position of the receiver antenna from one epoch to another epoch, and
   d. a updating element adapted to update the estimated receiver antenna position with the estimated change in position of the receiver antenna.

4. The apparatus of 3, wherein the recursive filter comprises a state transition noise matrix which accounts for uncertainty of the estimated change in position.

5. A GNSS receiver including an apparatus according to one of 1-2.

6. A computer program comprising instructions configured, when executed on a computer processing unit, to carry out a method according to one of 3-4.

7. A computer-readable medium comprising a computer program according to 6.

(Bridging)

1. A method of determining position of a GNSS receiver antenna, comprising:
   a. acquiring input data for each of a plurality of epochs, the input data comprising observations at the GNSS receiver antenna of signals of GNSS satellites, and clock and position information for each of the satellites,
   b. estimating float parameters of a state vector from the input data of each epoch, the float parameters comprising receiver antenna position, receiver clock, and at least one ambiguity per satellite,
   c. detecting a jump in the at least one ambiguity of at least one satellite from one epoch to another epoch,
   d. estimating bridge parameters from the input data of at least one epoch and from the estimated float parameters, the bridge parameters comprising values sufficient to update the float parameters to compensate for the jump, and
   e. using the bridge parameters to update the float parameters.

2. The method of 1, wherein the observations comprise observations of signals of at least four GNSS satellites at least until initial values of the float parameters have been estimated.

3. The method of one of 1-2, wherein the observations comprise raw code and carrier observations for each of at least two frequencies per satellite.

4. The method of one of 1-3, wherein the observations comprise observations of satellites of at least one of the GPS, GLONASS, Galileo and Compass systems.

5. The method of one of 1-4, wherein the observations comprise GPS observations of L1 code, L2 code, L1 carrier and L2 carrier.

6. The method of one of 1-5, wherein the at least one ambiguity per satellite comprises at least one of an iono-free ambiguity per satellite, a separate ambiguity per frequency per satellite, and a widelane ambiguity and a narrowlane ambiguity per satellite.

7. The method of one of 1-6, wherein estimating parameters of a state vector comprises converting raw observations to Wide-Lane and Narrow-Lane observations.

8. The method of one of 1-7, wherein acquiring position information comprises obtaining at least one of broadcast ephemeris data and precision ephemeris data.

9. The method of one of 1-8, wherein acquiring position information comprises converting ephemeris data to satellite position and satellite clock for each epoch.

10. The method of one of 1-9, wherein the float parameters further comprise at least one of tropospheric delay, multipath, and unmodeled error.

11. The method of one of 1-10, wherein estimating parameters of a state vector comprises one of applying a least squares filter and applying a Kalman filter to the input data.

12. The method of one of 1-11, wherein the at least one estimated ambiguity for each satellite remains constant from epoch to epoch when satellites are continuously tracked, and wherein a jump in at least one estimated ambiguity of at least one satellite from one epoch to another epoch indicates loss of tracking of said at least one satellite.

13. The method of one of 1-12, wherein detecting a jump comprises comparing the estimated iono-free ambiguities of one epoch with the estimated iono-free ambiguities of a prior epoch.

14. The method of one of 1-13, wherein estimating bridge parameters comprises computing a wide-lane ambiguity jump $\delta N_w$ for at least one satellite.

15. The method of one of 1-13, wherein estimating bridge parameters comprises estimating a wide-lane ambiguity jump $\delta N_w$ for at least one satellite and an updated iono-free ambiguity for at least one satellite.

16. The method of 15, wherein estimating bridge parameters comprises estimating a geometry-free ambiguity jump $\delta N_{gf}$ for at least one satellite.

17. The method of 16, wherein estimating bridge parameters comprises computing a wide-lane ambiguity jump $\delta N_w$ for at least one satellite and combining the widelane ambiguity jump $\delta N_w$ for at least one satellite with a respective geometry-free ambiguity jump $\delta N_{gf}$ for at least one satellite to obtain an iono-free ambiguity jump $\delta Ni_f$ for at least one satellite.

18. The method of 17, wherein estimating bridge parameters comprises combining the iono-free ambiguity jump $\delta Ni_f$ for at least one satellite with a respective iono-free ambiguity $N_{if1}$ estimated from a pre jump epoch to obtain an updated iono-free ambiguity $Ni_{f2}$ for at least one satellite.

19. The method of one of 1-13, wherein estimating bridge parameters comprises estimating an updated receiver antenna position.

20. The method of 19, wherein estimating bridge parameters comprises computing a wide-lane ambiguity jump $\delta N_w$ for at least one satellite.
21. The method of 20, wherein estimating bridge parameters comprises determining from the wide-lane ambiguity jump $\delta N_w$ for at least one satellite a receiver antenna position jump ($\delta X$, $\delta Y$, $\delta Z$).
22. The method of 21, wherein estimating bridge parameters comprises combining the receiver antenna position jump ($\delta X$, $\delta Y$, $\delta Z$) with a pre jump receiver antenna position ($X_1$, $Y_1$, $Z_1$) to obtain an updated receiver antenna position ($X_2$, $Y_2$, $Z_2$).
23. The method of one of 1-22, wherein using the bridge parameters to update the float parameters comprises replacing at least one iono-free ambiguity $N_{if1}$ estimated from a pre jump epoch with a respective updated iono-free ambiguity $Ni_{f2}$ for at least one satellite.
24. The method of one of 1-23, wherein using the bridge parameters to update the float parameters comprises replacing a receiver antenna position ($X_1$, $Y_1$, $Z_1$) estimated from a pre jump epoch with an updated receiver antenna position ($X_2$, $Y_2$, $Z_2$).
25. The method of one of 1-24, wherein after using the bridge parameters to update the float parameters, the updated float parameters are used with input data for a subsequent epoch to estimate the float parameters for the subsequent epoch.
26. Apparatus for determining position of a GNSS receiver antenna, comprising:
   a. an engine to acquire input data for each of a plurality of epochs, the input data comprising observations at a GNSS receiver antenna of GNSS satellites, and clock and position information for each of the satellites,
   b. a recursive filter to estimate float parameters of a state vector from the input data of each epoch, the float parameters comprising receiver antenna position, receiver clock, and at least one ambiguity per satellite,
   c. a jump detector to detect a jump in the at least one ambiguity of at least one satellite from one epoch to another epoch,
   d. a bridge estimator to estimate bridge parameters from the input data of at least one epoch and from the estimated float parameters, the bridge parameters comprising values sufficient to update the float parameters to compensate for the jump, and
   e. a float parameter updater to update the float parameters using the bridge.
27. The apparatus of 26, wherein the observations comprise observations of at least four GNSS satellites at least until initial estimates of the float parameters have been estimated.
28. The apparatus of one of 26-27, wherein the observations comprise raw code and carrier observations for each of at least two frequencies per satellite.
29. The apparatus of one of 26-28, wherein the observations comprise observations of satellites of at least one of the GPS, GLONASS, Galileo and Compass systems.
30. The apparatus of one of 26-29, wherein the observations comprise GPS observations of L1 code, L2 code, L1 carrier and L2 carrier.
31. The apparatus of one of 26-30, wherein the at least one ambiguity per satellite comprises at least one of an iono-free ambiguity per satellite, a separate ambiguity per frequency per satellite, and a widelane ambiguity and a narrowlane ambiguity per satellite.
32. The apparatus of one of 26-31, further comprising a converter element to convert raw observations into Wide-Lane observations and Narrow-Lane observations.
33. The apparatus of one of 26-32, wherein the engine to acquire input data is adapted to acquire at least one of broadcast ephemeris data and precision ephemeris data.
34. The apparatus of one of 26-33, further comprising a converter element to convert ephemeris data into satellite position and satellite clock for each epoch.
35. The apparatus of one of 26-34, wherein the float parameters further comprise at least one of tropospheric delay, multipath, and unmodeled error.
36. The apparatus of one of 26-35, wherein the recursive filter comprises one of a least squares filter and a Kalman filter.
37. The apparatus of one of 26-36, wherein the at least one estimated ambiguity for each satellite remains constant from epoch to epoch when satellites are continuously tracked, and wherein a jump in at least one estimated ambiguity of at least one satellite from one epoch to another epoch indicates loss of tracking of said at least one satellite.
38. The apparatus of one of 26-37, wherein the jump detector is adapted to compare the estimated iono-free ambiguities of one epoch with the estimated iono-free ambiguities of a prior epoch.
39. The apparatus of one of 26-38, wherein the bridge estimator is adapted to compute a wide-lane ambiguity jump $\delta N_w$ for at least one satellite.
40. The apparatus of one of 26-39, wherein the bridge estimator is adapted to estimate a wide-lane ambiguity jump $\delta N_w$ for at least one satellite and an updated iono-free ambiguity for at least one satellite.
41. The apparatus of one of 26-40, wherein the bridge estimator is adapted to estimate a geometry-free ambiguity jump $\delta N_{gf}$ for at least one satellite.
42. The apparatus of one of 26-41, wherein the bridge estimator is adapted to compute a wide-lane ambiguity jump $\delta N_w$ for at least one satellite and to combine the widelane ambiguity jump $\delta N_w$ for at least one satellite with a respective geometry-free ambiguity jump $\delta N_{gf}$ for at least one satellite to obtain an iono-free ambiguity jump $\delta N i_f$ for at least one satellite.
43. The apparatus of one of 26-40, wherein the bridge estimator is adapted to combine the iono-free ambiguity jump $\delta N i_f$ for at least one satellite with a respective iono-free ambiguity $N_{if1}$ estimated from a pre-jump epoch to obtain an updated iono-free ambiguity $Ni_n$ for at least one satellite.
44. The apparatus of one of 26-40, wherein the bridge estimator is adapted to estimate an updated receiver antenna position.
45. The apparatus of 44, wherein the bridge estimator is adapted to compute a wide-lane ambiguity jump $\delta N_w$ for at least one satellite.
46. The apparatus of 45, wherein the bridge estimator is adapted to determine from the wide-lane ambiguity jump $\delta N_w$ for at least one satellite a receiver antenna position jump ($\delta X$, $\delta Y$, $\delta Z$).
47. The apparatus of 46, wherein the bridge estimator is adapted to combine the receiver antenna position jump ($\delta X$, $\delta Y$, $\delta Z$) with a pre jump receiver antenna position ($X_1$, $Y_1$, $Z_1$) to obtain an updated receiver antenna position ($X_2$, $Y_2$, $Z_2$).
48. The apparatus of one of 1-47, wherein the float parameter updater is adapted to replace at least one iono-free ambiguity $N_{if1}$ estimated from a pre jump epoch with a respective updated iono-free ambiguity $Ni_{f2}$ for at least one satellite.

49. The apparatus of one of 1-47, wherein the float parameter updater is adapted to replace a receiver antenna position $(X_1, Y_1, Z_1)$ estimated from a pre jump epoch with an updated receiver antenna position $(X_2, Y_2, Z_2)$.

50. The apparatus of one of 1-49, wherein the recursive filter uses the updated float parameters with input data for a subsequent epoch to estimate the float parameters for the subsequent epoch.

51. A GNSS receiver including an apparatus according to one of 26-50.

52. A computer program comprising instructions configured, when executed on a computer processing unit, to carry out a method according to one of 1-25.

53. A computer-readable medium comprising a computer program according to 52.

(Architecture)

1. Apparatus for determining position of a GNSS receiver antenna, comprising:
   a. a recursive filter adapted to estimate float parameters of a state vector from input data of each of a plurality of epochs, the input data comprising observations at a GNSS receiver antenna of GNSS satellites, and clock and position information for each of the satellites, and the float parameters comprising receiver antenna position, receiver clock, and at least one ambiguity per satellite,
   b. a jump detector to detect a jump in the at least one ambiguity of at least one satellite from one epoch to another epoch, and
   c. a bridge estimator adapted to estimate bridge parameters from the input data of at least one epoch and from the estimated float parameters, the bridge parameters comprising values sufficient to update the float parameters to compensate for the jump.

2. The apparatus of 1, further comprising an element adapted to acquire input data for each of a plurality of epochs, the input data comprising observations at a GNSS receiver antenna of GNSS satellites, and clock and position information for each of the satellites.

3. The apparatus of one of 1-2, further comprising an ephemeris manager adapted to receive orbit and clock data for the GNSS satellites and to prepare position and clock data for the GNSS satellites for each epoch from the received orbit and clock data.

4. The apparatus of one of 1-3, further comprising a delta-phase processor adapted to estimate a change in position of the receiver antenna from one epoch to another epoch and to provide the estimated change in position to the recovery processor.

5. The apparatus of one of 1-4, further comprising a widelane processor adapted to receive widelane phase and narrowlane code estimates of single epochs and to provide to the recovery processor a widelane phase estimate over multiple epochs.

6. A method of determining position of a GNSS receiver antenna, comprising:
   a. applying a recursive filter to estimate float parameters of a state vector from input data of each of a plurality of epochs, the input data comprising observations at a GNSS receiver antenna of GNSS satellites, and clock and position information for each of the satellites, and the float parameters comprising receiver antenna position, receiver clock, and at least one ambiguity per satellite,
   b. detecting a jump in the at least one ambiguity of at least one satellite from one epoch to another epoch, and
   c. applying a recovery processor to estimate bridge parameters from the input data of at least one epoch and from the estimated float parameters, the bridge parameters comprising values sufficient to update the float parameters to compensate for the jump.

7. The method of 6, further comprising acquiring input data for each of a plurality of epochs, the input data comprising observations at a GNSS receiver antenna of GNSS satellites, and clock and position information for each of the satellites.

8. The method of one of 6-7, further comprising receiving orbit and clock data for the GNSS satellites and applying an ephemeris manager to prepare position and clock data for the GNSS satellites for each epoch from the received orbit and clock data.

9. The method of one of 6-8, further comprising applying a delta-phase processor to estimate a change in position of the receiver antenna from one epoch to another epoch and to provide the estimated change in position to the recovery processor.

10. The method of one of 6-9, further comprising applying a widelane processor adapted to receive widelane phase and narrowlane code estimates of single epochs and to provide to the recovery processor a widelane phase estimate over multiple epochs.

11. A GNSS receiver including an apparatus according to one of 1-5.

12. A computer program comprising instructions configured, when executed on a computer processing unit, to carry out a method according to one of 6-10.

13. A computer-readable medium comprising a computer program according to 12.

What is claimed is:

1. A method of determining position of a GNSS receiver antenna, comprising:
   a. operating an engine to acquire input data for each of a plurality of epochs, the input data comprising observations at the GNSS receiver antenna of signals of GNSS satellites, and clock and position information for each of the satellites,
   b. operating a recursive filter to estimate float parameters of a state vector from the input data of each epoch, the float parameters comprising receiver antenna position, receiver clock, and at least one ambiguity per satellite,
   c. operating a jump detector to detect a jump in the at least one ambiguity of at least one satellite from one epoch to another epoch,
   d. operating a bridge estimator to estimate bridge parameters from the input data of at least one epoch and from the estimated float parameters, the bridge parameters comprising values sufficient to update the float parameters to compensate for the jump, and
   e. using the bridge parameters to update the float parameters.

2. The method of claim 1, wherein the observations comprise observations of signals of at least four GNSS satellites at least until initial values of the float parameters have been estimated.

3. The method of claim 1, wherein the observations comprise raw code and carrier observations for each of at least two frequencies per satellite.

4. The method of claim 1, wherein the observations comprise observations of satellites of at least one of the GPS, GLONASS, Galileo and Compass systems.

5. The method of claim 1, wherein the observations comprise GPS observations of L1 code, L2 code, L1 carrier and L2 carrier.

6. The method of claim 1, wherein the at least one ambiguity per satellite comprises at least one of an iono-free ambiguity per satellite, a separate ambiguity per frequency per satellite, and a widelane ambiguity and a narrowlane ambiguity per satellite.

7. The method of claim 1, wherein raw observations are converted to Wide-Lane and Narrow-Lane observations.

8. The method of claim 1, wherein the input data comprises at least one of broadcast ephemeris data and precision ephemeris data.

9. The method of claim 1, wherein ephemeris data are converted to satellite position and satellite clock for each epoch.

10. The method of claim 1, wherein the float parameters further comprise at least one of tropospheric delay, multipath, and unmodeled error.

11. The method of claim 1, wherein the recursive filter comprises one of a least squares filter and a Kalman filter.

12. The method of claim 1, wherein the at least one estimated ambiguity for each satellite remains constant from epoch to epoch when satellites are continuously tracked, and wherein a jump in at least one estimated ambiguity of at least one satellite from one epoch to another epoch indicates loss of tracking of said at least one satellite.

13. The method of claim 1, wherein the jump detector compares the estimated iono-free ambiguities of one epoch with the estimated iono-free ambiguities of a prior epoch.

14. The method of claim 1, wherein the bridge estimator computes a wide-lane ambiguity jump $\delta N_w$ for at least one satellite.

15. The method of claim 1, wherein the bridge estimator estimates a wide-lane ambiguity jump $\delta N_w$ for at least one satellite and an updated iono-free ambiguity for at least one satellite.

16. The method of claim 15, wherein the bridge estimator estimates a geometry-free ambiguity jump $\delta N_{gf}$ for at least one satellite.

17. The method of claim 16, wherein the bridge estimator estimates a wide-lane ambiguity jump $\delta N_w$ for at least one satellite and combines the widelane ambiguity jump $\delta N_w$ for at least one satellite with a respective geometry-free ambiguity jump $\delta N_{gf}$ for at least one satellite to obtain an iono-free ambiguity jump $\delta Ni_f$ for at least one satellite.

18. The method of claim 17, wherein the bridge estimator combines the iono-free ambiguity jump $\delta Ni_f$ for at least one satellite with a respective iono-free ambiguity $N_{if1}$ estimated from a pre-jump epoch to obtain an updated iono-free ambiguity $Ni_{f2}$ for at least one satellite.

19. The method of claim 1, wherein the bridge estimator estimates an updated receiver antenna position.

20. The method of claim 19, wherein the bridge estimator estimates a wide-lane ambiguity jump $\delta N_w$ for at least one satellite.

21. The method of claim 20, wherein the bridge estimator determines from the wide-lane ambiguity jump $\delta N_w$ for at least one satellite a receiver antenna position jump ($\delta X$, $\delta Y$, $\delta Z$).

22. The method of claim 21, wherein the bridge estimator combines the receiver antenna position jump ($\delta X$, $\delta Y$, $\delta Z$) with a pre-jump receiver antenna position ($X_1$, $Y_1$, $Z_1$) to obtain an updated receiver antenna position ($X_2$, $Y_2$, $Z_2$).

23. The method of claim 1, wherein using the bridge parameters to update the float parameters comprises replacing at least one iono-free ambiguity $N_{if1}$ estimated from a pre-jump epoch with a respective updated iono-free ambiguity $Ni_{f2}$ for at least one satellite.

24. The method of claim 1, wherein using the bridge parameters to update the float parameters comprises replacing a receiver antenna position ($X_1$, $Y_1$, $Z_1$) estimated from a pre-jump epoch with an updated receiver antenna position ($X_2$, $Y_2$, $Z_2$).

25. The method of claim 1, wherein after using the bridge parameters to update the float parameters, the recursive filter uses the updated float parameters with input data for a subsequent epoch to estimate the float parameters for the subsequent epoch.

26. Apparatus for determining position of a GNSS receiver antenna, comprising:
an engine to acquire input data for each of a plurality of epochs, the input data comprising observations at a GNSS receiver antenna of GNSS satellites, and clock and position information for each of the satellites,
a recursive filter to estimate float parameters of a state vector from the input data of each epoch, the float parameters comprising receiver antenna position, receiver clock, and at least one ambiguity per satellite,
a jump detector to detect a jump in the at least one ambiguity of at least one satellite from one epoch to another epoch,
a bridge estimator to estimate bridge parameters from the input data of at least one epoch and from the estimated float parameters, the bridge parameters comprising values sufficient to update the float parameters to compensate for the jump, and
a float parameter updater to update the float parameters using the bridge.

27. The apparatus of claim 26, wherein the observations comprise observations of at least four GNSS satellites at least until initial estimates of the float parameters have been estimated.

28. The apparatus of claim 26, wherein the observations comprise raw code and carrier observations for each of at least two frequencies per satellite.

29. The apparatus of claim 26, wherein the observations comprise observations of satellites of at least one of the GPS, GLONASS, Galileo and Compass systems.

30. The apparatus of claim 26, wherein the observations comprise GPS observations of L1 code, L2 code, L1 carrier and L2 carrier.

31. The apparatus of claim 26, wherein the at least one ambiguity per satellite comprises at least one of an iono-free ambiguity per satellite, a eparate ambiguity per frequency per satellite, and a widelane ambiguity and a narrowlane ambiguity per satellite.

32. The apparatus of claim 26, further comprising a converter element to convert raw observations into Wide-Lane observations and Narrow-Lane observations.

33. The apparatus of claim 26, wherein the engine to acquire input data is adapted to acquire at least one of broadcast ephemeris data and precision ephemeris data.

34. The apparatus of claim 26, further comprising a converter element to convert ephemeris data into satellite position and satellite clock for each epoch.

35. The apparatus of claim 26, wherein the float parameters further comprise at least one of tropospheric delay, multipath, and unmodeled error.

36. The apparatus of claim 26, wherein the recursive filter comprises one of a least squares filter and a Kalman filter.

37. The apparatus of claim 26, wherein the at least one estimated ambiguity for each satellite remains constant from epoch to epoch when satellites are continuously tracked, and wherein a jump in at least one estimated ambiguity of at least one satellite from one epoch to another epoch indicates loss of tracking of said at least one satellite.

38. The apparatus of one of claims 26-37 claim 26, wherein the jump detector is adapted to compare the estimated iono-free ambiguities of one epoch with the estimated iono-free ambiguities of a prior epoch.

39. The apparatus of claim 26, wherein the bridge estimator is adapted to compute a wide-lane ambiguity jump $\delta N_w$ for at least one satellite.

40. The apparatus of claim 26, wherein the bridge estimator is adapted to estimate a wide-lane ambiguity jump $\delta N_w$ for at least one satellite and an updated iono-free ambiguity for at least one satellite.

41. The apparatus of claim 26, wherein the bridge estimator is adapted to estimate a geometry-free ambiguity jump $\delta N_{gf}$ for at least one satellite.

42. The apparatus of claim 26, wherein the bridge estimator is adapted to compute a wide-lane ambiguity jump $\delta N_w$ for at least one satellite and to ombine the widelane ambiguity jump $\delta N_w$ for at least one satellite with a respective geometry-free ambiguity jump $\delta N_{gf}$ for at least one satellite to obtain an iono-free ambiguity jump $\delta Ni_f$ for at least one satellite.

43. The apparatus of claim 26, wherein the bridge estimator is adapted to combine the iono-free ambiguity jump $\delta Ni_f$ for at least one satellite with a respective iono-free ambiguity $N_{if1}$ estimated from a pre-jump epoch to obtain an updated iono-free ambiguity $Ni_{f2}$ for at least one satellite.

44. The apparatus of claim 26, wherein the bridge estimator is adapted to estimate an updated receiver antenna position.

45. The apparatus of claim 44, wherein the bridge estimator is adapted to compute a wide-lane ambiguity jump $\delta N_w$ for at least one satellite.

46. The apparatus of claim 45, wherein the bridge estimator is adapted to determine from the wide-lane ambiguity jump $\delta N_w$ for at least one satellite a receiver antenna position jump ($\delta X$, $\delta Y$, $\delta Z$).

47. The apparatus of claim 46, wherein the bridge estimator is adapted to combine the receiver antenna position jump ($\delta X$, $\delta Y$, $\delta Z$) with a pre-jump receiver antenna position ($X_1$, $Y_1$, $Z_1$) to obtain an updated receiver antenna position ($X_2$, $Y_2$, $Z_2$).

48. The apparatus of claim 26, wherein the float parameter updater is adapted to replace at least one iono-free ambiguity $N_{if1}$ estimated from a pre-jump epoch with a respective updated iono-free ambiguity $Ni_{f2}$ for at least one satellite.

49. The apparatus of claim 26, wherein the float parameter updater is adapted to replace a receiver antenna position ($X_1$, $Y_1$, $Z_1$) estimated from a pre-jump epoch with an updated receiver antenna position ($X_2$, $Y_2$, $Z_2$).

50. The apparatus of claim 26, wherein the recursive filter uses the updated float parameters with input data for a subsequent epoch to estimate the float parameters for the subsequent epoch.

51. A GNSS receiver including an apparatus according to claim 26.

52. A non-transitory computer-readable medium embodying a computer program comprising instructions configured, when executed on a computer processing unit, to carry out a method according to claim 1.

* * * * *